US011782689B1

(12) United States Patent
Costello et al.

(10) Patent No.: US 11,782,689 B1
(45) Date of Patent: Oct. 10, 2023

(54) SYSTEM, METHOD, AND CHOREOGRAPHIC FRAMEWORK FOR THE DESIGN, DEVELOPMENT, DEPLOYMENT, AND MANAGEMENT OF DISTRIBUTED SOFTWARE AND COMPUTING SYSTEMS

(71) Applicant: Spectrum Comm Inc., Newport News, VA (US)

(72) Inventors: Christopher Shaun Costello, Yorktown, VA (US); Donn Scott Sickles, Carrollton, VA (US); Ryan Edward Souther, Williamsburg, VA (US); Terry Franklin Byrum, Suffolk, VA (US)

(73) Assignee: Spectrum Comm Inc., Newport News, VA (US)

( * ) Notice: Subject to any disclaimer, the term of this patent is extended or adjusted under 35 U.S.C. 154(b) by 0 days.

(21) Appl. No.: 18/129,154

(22) Filed: Mar. 31, 2023

Related U.S. Application Data

(60) Provisional application No. 63/325,711, filed on Mar. 31, 2022.

(51) Int. Cl.
| | |
|---|---|
| *G06F 15/173* | (2006.01) |
| *G06F 9/445* | (2018.01) |
| *G06F 15/16* | (2006.01) |
| *G06F 9/455* | (2018.01) |
| *G06F 8/60* | (2018.01) |
| *H04L 41/122* | (2022.01) |
| *G06F 9/54* | (2006.01) |

(52) U.S. Cl.
CPC .............. *G06F 8/60* (2013.01); *G06F 9/542* (2013.01); *H04L 41/122* (2022.05)

(58) Field of Classification Search
CPC ..... G06Q 20/02; H04L 9/3297; H04L 9/3247; H04L 9/0637; H04L 9/3236; H04L 41/122; H04L 67/51; G06F 8/60; G06F 9/542; G06F 8/31; G06F 8/20
See application file for complete search history.

(56) References Cited

U.S. PATENT DOCUMENTS

| | | | |
|---|---|---|---|
| 7,533,168 B1 * | 5/2009 | Pabla | G06F 9/5072 709/224 |
| 2018/0046446 A1 * | 2/2018 | Turovsky | G06F 9/455 |
| 2022/0107802 A1 * | 4/2022 | Rao | G06F 16/907 |

\* cited by examiner

*Primary Examiner* — Thuy Dao
(74) *Attorney, Agent, or Firm* — Williams Mullen; Thomas F. Bergert

(57) ABSTRACT

Embodiments of the present disclosure provide a system, method and framework that facilitate and simplify computing solutions requirements or description breakdown into user-driven, autonomous system of decentralized distributed intents fulfilled by shapes (software and software stack) organized and implemented as essential, minimized capabilities effortlessly extended, assembled, swapped, and reorganized; simplifying and accelerating prototyping, development, packaging, deployment, and maintenance of a solution's lifecycle, e.g., an Artificial Intelligence system. Embodiments of the system, framework, and method provide the infrastructure for defining intents and shapes, support green computing and continuous updates, and eliminate endless incremental technology refreshes with minimum operational impact to a deployed solution. Inherent to the system, framework, method is a dramatic reduction in cybersecurity vulnerabilities and attack surfaces among other benefits.

19 Claims, 24 Drawing Sheets

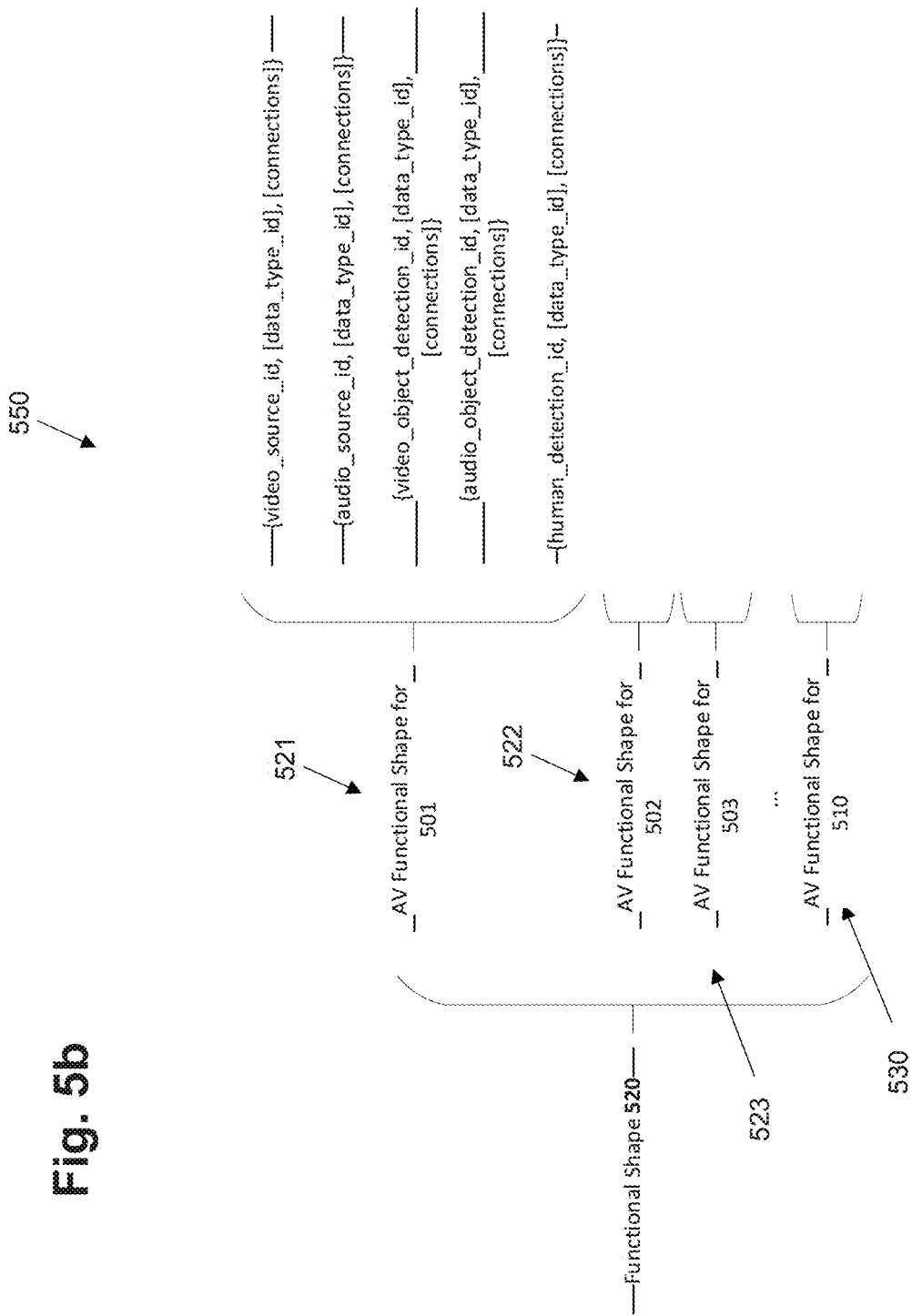

SYSTEM, METHOD, AND CHOREOGRAPHIC FRAMEWORK FOR THE DESIGN, DEVELOPMENT, DEPLOYMENT, AND MANAGEMENT OF DISTRIBUTED SOFTWARE AND COMPUTING SYSTEMS

CROSS-REFERENCE TO RELATED APPLICATIONS

This application claims the benefit of U.S. provisional patent application No. 63/325,711, filed Mar. 31, 2022, the disclosure of which is hereby incorporated herein by reference in its entirety.

TECHNICAL FIELD

The present disclosure pertains to software development and architecture, and more particularly to a system, method and framework for design, development, deployment, and decentralized management of distributed software and computing systems.

BACKGROUND AND SUMMARY

Software has become an integral part of various industries and businesses, leading to complex software needs for both function and management. Traditional methods of modeling, deploying, and executing software have relied on monolithic applications or containerized microservices. Monolithic applications are designed and built as a single, self-contained unit and have a tightly coupled architecture, making it difficult to separate different components. Additionally, they have several disadvantages, such as difficulties with scaling and maintaining the application as it grows larger and more complex, limitations in terms of flexibility and modularity, and longer development cycles. In contrast, microservice-based architectures have become more popular due to their greater flexibility, scalability, and modularity, making them better suited for modern software development.

Microservice-based architectures traditionally rely on centralized management, control, and automation for development and deployments, such as software orchestration. Software orchestration automates the deployment, scaling, and management of complex software systems, ensuring that different software components, services, and infrastructure work together seamlessly to deliver the desired functionality. This process is widely used in cloud computing, where it enables organizations to deploy and manage their applications and services in a more agile, efficient, and scalable manner. Popular tools for software orchestration include Kubernetes, Docker Swarm™, Apache Mesos™, and Amazon ECS™, which provide a high level of automation, flexibility, and control over the deployment and management of complex software systems.

Cloud computing offers Infrastructure as a Service (IaaS), Platform as a Service (PaaS), and Software as a Service (SaaS) models. IaaS provides access to virtualized computing resources, such as servers, storage, and networking, which can be provisioned and managed via an API or web-based interface, making it a popular choice for organizations that want more control over their cloud infrastructure. PaaS simplifies application development and deployment, allowing developers to build and deploy applications without worrying about the underlying infrastructure. SaaS is a well-established market, with a wide range of applications available for businesses and consumers alike, providing access to applications via a web browser or mobile app for various tasks, such as accounting, CRM, project management, and collaboration. The cloud computing market continues to grow rapidly, with organizations of all sizes adopting cloud-based solutions to reduce costs, improve scalability, and increase agility.

Designing and developing complex, distributed software require various disciplines, techniques, and methods, such as computer programming, computer science, distributed computing, data flow, data science, data handling, artificial intelligence (AI), and many other related fields. These often use unique computer languages, algorithms, and even particular data science, AI, machine learning, deep learning platforms. Software design complexity is increased when siloed libraries, toolkits, and/or existing frameworks and platforms do not fully integrate.

Traditional development follows a software development lifecycle where requirements are turned into a design and prototype then developed into software implementation, tested, and deployed on infrastructure, and finally updated based on execution feedback, which is continuously iterated during the solution's lifecycle. DevOps is an established and widely adopted approach to software development and information technology (IT) operations. DevOps continuously iterates through a plan, code, build, test, release, deploy, operate, and monitor lifecycle of practices, tools, methods, and philosophy to automate and integrate between the software development (Dev) and information technology operations (Ops). It has become a crucial aspect of modern software engineering, enabling organizations to develop and deploy software applications at a faster pace and with higher quality. DevOps emphasizes collaboration and communication between development and operations teams, as well as the use of automation and continuous integration and deployment practices.

Embodiments of the present disclosure improve upon past efforts as described above. Embodiments of the present disclosure provide all the necessary software ingredients to construct, deploy, execute, test, and improve simple to complex systems across distributed infrastructure. Embodiments of the present disclosure provide a novel and improved perspective on modeling, deploying, and executing software solutions as loosely connected data driven functions working together to produce results traditionally accomplished through monolithic applications or containerized microservices. Additionally, embodiments of the present disclosure decentralize management of loosely connected distributed systems by pushing support responsibility to the individual compute elements executing the data-driven functions.

BRIEF DESCRIPTION OF THE DRAWINGS

Descriptions of various embodiments in accordance with the present disclosure with reference to the drawings as follows:

FIG. 5b is an exemplary diagram representing the functional shape geometry for a framework deployed on a security node (e.g., camera with video and audio) with additional computing capability for video and audio detection inference in accordance with embodiments of the present disclosure.

DETAILED DESCRIPTION OF EMBODIMENTS

Figure 1:
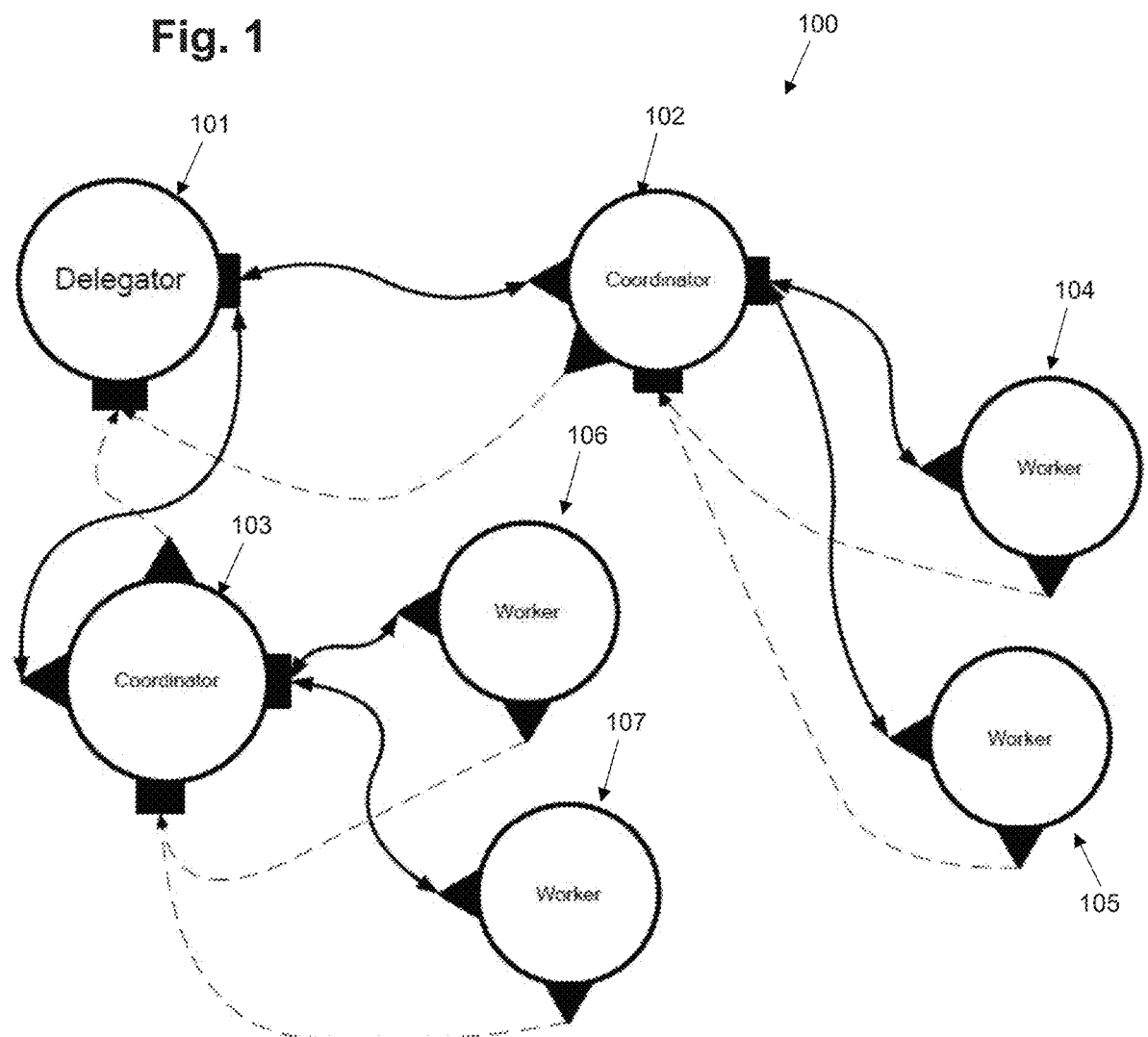
FIG. 1 is a graph diagram of a foundational space in accordance with the present disclosure.

The presently disclosed subject matter now will be described more fully hereinafter with reference to the accompanying drawings, in which some, but not all embodiments of the presently disclosed subject matter are shown. Like numbers refer to like elements throughout.

The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the descriptions herein and the associated drawings. Therefore, it is to be understood that the presently disclosed subject matter is not to be limited to the specific embodiments disclosed and that modifications and other embodiments are intended to be included within the scope of the appended claims.

Example embodiments such as disclosed herein can incorporate a processor and an associated memory storing instructions that, when executed by the processor, cause the processor to perform operations as described herein. It will be appreciated that reference to "a", "an" or other indefinite article in the present disclosure encompasses one or more than one of the described element. Further, it will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The embodiments set forth herein represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of the present disclosure facilitate development and deployment of complex software solutions using fundamental building blocks that can extend to nearly any application. The term "framework" as disclosed herein encompasses a thorough application of the novel approaches. By the very nature of extensible software concepts, the application of the present disclosure is not limited to any specific solution, method, product, and/or system referenced within this document.

For purposes of the present disclosure, the following terms are defined herein:
   autonomous—in this context, means functioning and self-organizing independently of human action, though possibly under human supervision or with human intervention and/or associated with choreography and/or orchestration. Autonomous can include any function that does not require explicit instruction from a user, and happens automatically due to criteria being fulfilled, such as changes in information or environment. Autonomous can also refer to human-requested or software-requested or based on emergent actions, but the human does not intervene to assemble, or manage assembly or ongoing operations associated with orchestration. An implementation based on choreography or orchestration does not preclude the other.

In one instantiation of autonomy according to the present disclosure, consider the following connected, collaborative vertices:
   (a) worker—individually performing/delivering high-level functional capability and built upon an inherited framework software stack and state-engine managing lower-level capability (elastically, resilient, load-balancing) and, potentially, organized into a cooperating collection assembled to deliver a macro, greater, capability.
   (b) coordinator—caring of all workers grouped in the collection. In one instantiation, a coordinator internally initializes and groups workers into a collection's shape based on one or more intents and manages the communication and data gateway, in-flow, and out-flow of the collection, externally the coordinators advertise, exposing the overall behavior or functionality, i.e. the black-box capability, beyond the local collection. In another instantiation, to provide solutions resiliency, if the coordinator terminates, a worker in the collection will start another coordinator and reestablish connectivity across the collection and with the (new) coordinator, e.g., sharing computational resources, among workers.
   (c) delegator—management of peer-to-peer communications protocol, list of connections across the hypergraph solution, management/monitoring of all local coordinators, communication between coordinators, and management/decision made between delegators. In one instantiation, if a coordinator terminates, a delegator will start another coordinator, which will in turn re-establish connectivity across the collection essentially picking up where the terminated coordinator left off, e.g., sharing computational resources, among workers as well as other capabilities in these Concepts. In another instantiation, if the delegator terminates, a coordinator will start another delegator and re-establish connectivity with the other coordinators.

In another instantiation of autonomy according to the present disclosure, the solution automatically senses to expand behaviors based on newly sensed data or intent, e.g., new understanding of the data or other external stimuli. For example, a video blob detector, initially detecting people, will spin-up new object (e.g., coordinator and collections, or worker) detectors (models) as it realizes a type of object, i.e., an unknown blob, is detected in the data-stream or changed based on environmental factors (day to night) or movement (mobile solution).

In another instantiation of autonomy according to the present disclosure, an analyst requests additional resources, like new video feeds, and a deployed delegator scans its computing environment for available resources (video feeds, processing pipelines, models, computing power, etc.) and then automatically assembles from the available resources and intents without spinning new instances.

In another instantiation of autonomy according to the present disclosure, a new intent may be copied or duplicated from an existing intent or shape. These may be deployed as is or serve as a template for large deployments where individual delegators may adjust local intents and/or shapes based on available resources (e.g., specific hardware or software availability). This may include adaptation to specific dataflow by sensing the data and selecting, adding, or otherwise adjusting inferencing and/or decision algorithms.

In another instantiation of autonomy according to the present disclosure, a video process intent might recognize that people or objects are in a video stream and automatically load a people/face detection and an object detection module (e.g., collection).

In another instantiation of autonomy according to the present disclosure, an inferencing intent may sense it lacks the required computational resources to process data and perform load balancing and autonomously regulate by adjusting fidelity, e.g., reduce sampling, drop data, or skip data, or initiate/request external resource availability; and, if available, initiate a depletion of the intents and shapes necessary to continue processing.

In another instantiation of autonomy according to the present disclosure, a solution receives a fraudulent request and by its ethical programming (policies) and/or data governance performs no action and/or reports/advertises the infraction.
   choreography—an ability to self-organize and execute according to a specific intent. This extends to deployments and ongoing operations with or without orchestration and includes the ability to survey resources and/or publish the availability of resources. These operations assist human interactions as part of the autonomous behaviors.

In one instantiation of choreography according to the present disclosure, a human or software/hardware-based actor initiates an event or initiates an intent, and a solution autonomously deploys and begins operation by self-assembly including sensing the environment, selecting workers, and assembling into collections and, without human intervention, assembles a solution by forwarding the intent to delegators that assemble coordinators and all workers necessary to execute the intent.

In another instantiation of choreography according to the present disclosure, a human initiates an intent to an instance or solution. Based on pre-conceived intents (i.e., blueprints) or existing shapes, a delegator will attempt to set up (e.g., via creation or recruitment) the resources and vertices needed to perform the choreography to fulfill that request and manage and monitor them overtime.

In another instantiation of choreography according to the present disclosure, software initiates an intent or duplicates a shape. In another, the emergence dictates an intent and/or shape.

collection—a grouping of one or more vertices operating in a space for a specific intent. For example, worker(s) i.e., vertex (or vertices) operating in functional space that "act" as a whole, a black-box, and an opaque object to every vertex outside the grouping.

coordinator—a computing resource that manages a collection or a set of cooperative workers executing intent(s) sitting at the edge of the collection. coordinators handle the external communication of the collection and the relationship to the delegator(s). An extended coordinator in physical space creates shapes of functional space to execute an intent.

delegator—a connected vertex operating in physical space providing discoverable information about the infrastructure node and the capabilities of collections. There is typically one delegator operating on the node (bare metal, operating system, virtual, container, or similar) gathering information about node resources. Delegators also handle external communications for one or more coordinators and their associated collections.

data—bits of data, as input data, which is processed via algorithms running on one or more workers. These bits represent some piece of information that can be collected, stored, and analyzed. Data can be in various formats such as text, numbers, images, audio, or video. Data can be structured or unstructured and can come from a wide range of sources including sensors, databases, messages, results of processing, and more.

distributed computing—computing distributed across a network or cloud of different computers and edge devices.

event—generalized response or need in the software/data/solution for ongoing operations.

Typically, events are message-driven (i.e. request/reply) versus directed commands (see orchestration and choreography).

feature or vertex feature—generalized term for higher-level capabilities, interfaces, and functions needed to deliver or execute intent(s). Also used to distinguish layers within the functional space (i.e., activities beyond the foundational space).

foundation—generalized term referring to the foundational space.

foundational space—software code that contains the (foundational) behaviors including messaging and organization of a deployment that is built on top of to create a solution(s). More specifically, foundational space is made of all the support assets needed to build the functional space, functional behaviors. This Foundational space provides organization, messaging, choreography, logging, and other basic functions for management of framework on the node and supports the fulfillment of intent in functional space. foundational space can also be referred to herein generally as the foundation.

foundational behavior—are ubiquitous across a solution, the foundational behaviors of a vertex are inherited by all vertices in a specific solution, this includes when new behaviors are introduced. Behaviors include but are not limited to key areas are in state-engine and communication messaging including resilience, elasticity, load-balancing, discovery, migration, etc. Foundational behaviors are generally homogeneous throughout every vertex and are always backwards compatible.

functional behavior—a minimized function that is a capability and extension of, and/or built upon, inherited foundational behavior. Every vertex (e.g., in one instantiation a delegator, coordinator, and worker) has one or more functional behaviors. A functional behavior could describe smallest possible intent or shape. Also used to describe the (functional) behavior of a collection of workers, or coordinator, or delegator, or intent(s), or shape(s).

In one instantiation of functional behavior, a worker through method overloading post deployment could dynamically makes changes to the worker including the state-engines where an evolved copy (new version) will start and the workload will migrate to the new state-engine and once complete the old state-engine will "die"; and, the worker's minimized functionality may evolve, in response to data changes.

In another instantiation of functional behavior, delegators can replicate coordinators, shapes, throughout a solution for broad deployments, including propagating evolved capabilities. Based on an expanded collections' intent, a request may be sent by the delegators to request that all available collections begin looking for the new object class.

functional space—code that contains the functional behaviors, new capabilities, functions, features, etc. built upon the foundational space or foundation. functional space includes the functional behavior of workers in the collection(s).

inheritance—a capability, often a class, where attributes and methods are inherited from another class.

intent—the purpose (or intention) of a vertex or collection; intentions are contextually bounded, compute resource groups supporting solving a problem (or part of one) that are defined by a representational structure for deployment. More specifically, intent drives shape directly in functional space and indirectly in physical space. Intent encapsulates the purpose of the solution's resources sourcing, processing, and storing data. Each vertex in the solution plays a role (sourcing data, inferring metadata, processing data or metadata, storing data, sharing data, and correlating and analyzing data, etc.) to fulfill the intent. More generally, intent structure in framework is the response to some (user) need or requirement, an exploratory request, or solution description. Intent structures become ubiquitous and sharable reducing the time spent developing new (or repeated) capabilities. [see also shape].

In one instantiation, a worker's intent is to find angry faces using inference functional behavior; where model sentiment analysis is a collection's intent (i.e., requires more than one worker, including multiple inferencing workers that are combined to solve a complex problem).

In another instantiation, intents are bounded to collection's behaviors as a sum of the parts and may include dynamic morphologies based on processing and data or events over a period. For example, intent that includes processing of certain imagery data, where the objects observed change due to environmental factors may impact a shift in the intent: going from analyzing micro-climates through changes in land use to analyzing rescue situations for tornado victims in the same areas.

In typical instantiations, intents are pre-defined based upon testing, expert knowledge, or experience with the compute environment. intents, however, can include uncertainty that support more dynamic morphologies of the initial deployed shape. intents also may have event-driven morphology components that apply their own dynamic morphologies to the shape.

Figure 2:
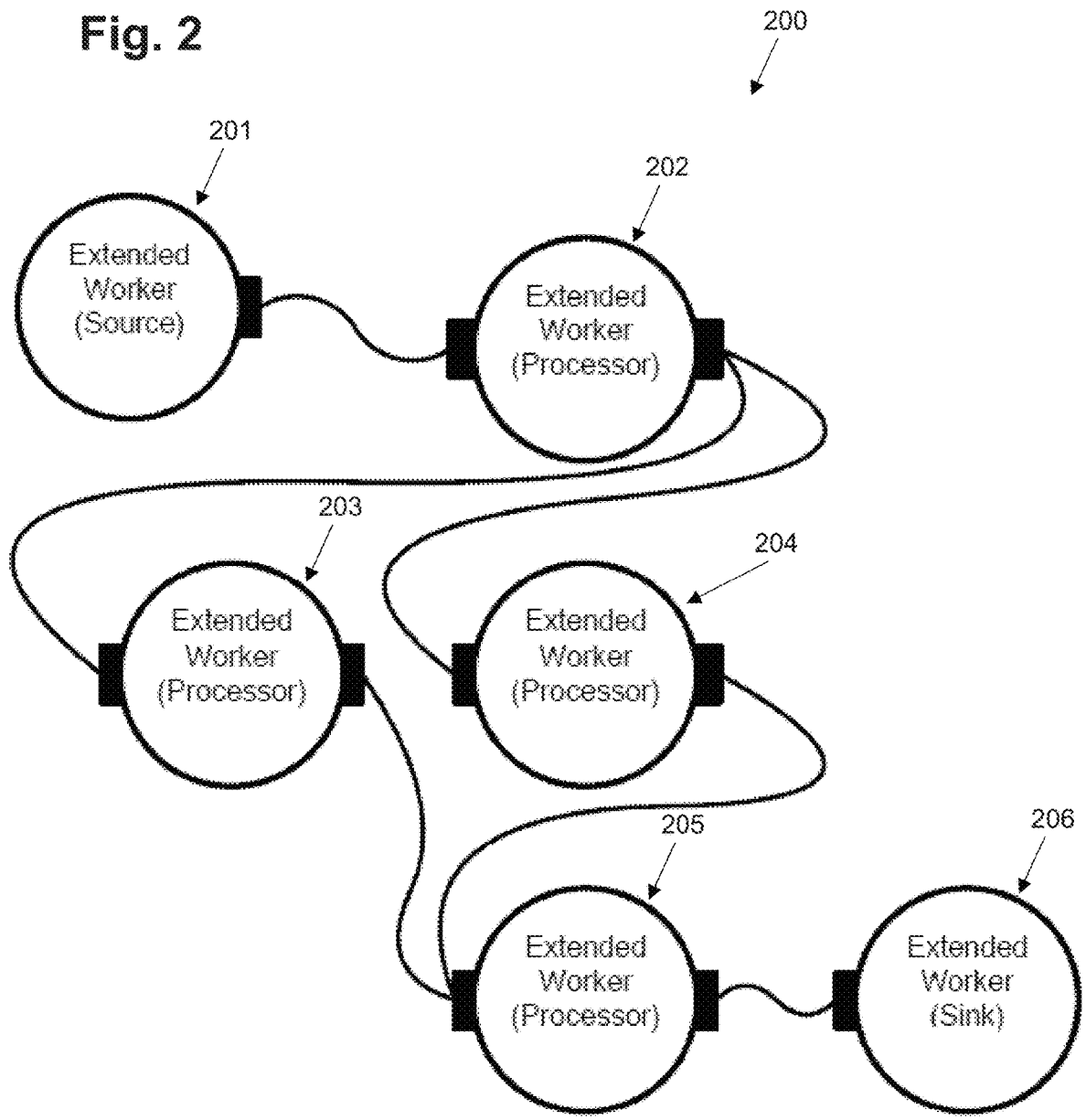
FIG. 2 is a graph diagram of a functional space representing connected vertices working as a collective with a bounded intention in accordance with embodiments of the present disclosure.

In another instantiation, a digital-object may also propagate throughout the infrastructure; and there may be multiple "Digital-You(s)", versions implemented as extended vertices represented as dynamic deployable shapes, throughout the infrastructure overtime as other intents require the digital object or some part of one-a lazy asynchronized data-based convergence.

kernel—the essential center of computer operating system and is the core that provides basic services to all the parts of the operating system. In practicality, this is the minimal possible environment required for a vertex to operate and may imply the removal of all unnecessary components, libraries, and features not necessary; thereby dramatically reducing potential cybersecurity vulnerabilities by reducing the number of possible attack surfaces. This further implies a significant reduction in vertices footprint, i.e., total bytes required for deployment, which facilities coding closely related to functional provability due to a dramatic reduction in overall complexity.

kit—a grouping of related shapes that are organized into families of functionality used to jumpstart projects. A kit may include one or more skeleton templates that are essentially ready-made shapes that perform an intent. A kit does not need to be deployed in the same the manner it was created. A simple example, a kit from FIG. 2 is created in a solution with multiple real-time audio feeds that can be queried real-time by multiple analysts. This same kit could be deployed on a single computer linked to a static audio file for testing purposes. The single computer solution would be limited by the local resources (processing power, memory, etc.), but still used for testing the resources needs.

message—a bit of data, which is sent by a sender to a recipient, for example.

In one instantiation, messages can be simple Request and Reply Messages—initiate, stop, start, or stop threads.

In another instantiation, messages can invoke key functions:
(a) restart, reload existing worker and restart,
(b) reload existing worker with updated code and restart,
(c) reload existing worker with alternate (new) worker and restart,
(d) add new worker to pipeline and connect into flow,
(e) each without breaking the pipeline, i.e., these actions have no operational impact on the pipeline.

In another instantiation, messages can relate to extended functionality relatable to Extended State-Engine functionality.

minimized or minimal functionality—the idea of building extended workers with the smallest number of feasible function modules for a single capability instead of bundling multiple functions into a larger monolithic worker.

microservice—an architectural style that structures an application as a collection of services as opposed to a single more complex service. See container and kernel for related.

model or AI model—an algorithm built from a data set which arrives at a decision without human interference.

namespace—traditional computer science definition: a logical grouping of identifiers, in this case, to identify a delegator.

node—the physical, virtual, bare metal, embedded, cloud provisioned, or other "hardware infrastructure" implementation available to accept intent as part of framework infrastructure executing at a minimum a delegator vertex.

orchestration—describes managed deployments and answers the question: "Who initiated an intent?" and "How to execute the intent?" Orchestration requires direct involvement with maintenance and monitoring the interactions. Orchestration requires specified flows and directed actions to execute intent. Related to choreography in such that orchestration controls and manages the solution where choreography maintains flexibility in how the intent is executed.

physical space—code that manages the work across spaces, both foundational and functional. physical space includes extended coordinators and delegators.

pipeline—is an assembling of connected vertices or collections linked together to perform a function greater than the sum of its parts. An exemplary embodiment of a pipeline is a directed hypergraph starting at a source vertex and terminating at a sink vertex having one or more paths traversing intermediate vertices starting at source and ending at sink.

In one instantiation, consider the single function, linear video processing pipeline in FIG. 9, described hereinafter, where data is passed via messages to the next phase of processing.

In another instantiation, starting with the pipeline in FIG. 9, once a video frame is extracted it moves (the data fans out) into several sub-pipelines where various models process specific data and perform other operations required by other workers. The pipeline is no longer linear nor even tree-looking (though a tree-like pipeline can appear in certain deployments), but a hypergraph with a sensor on one end, many vertices and branching in the middle, a fan-in stage, and a Web based user interface (UI) for output, for example.

shape—an abstraction of one or more intents consisting of one or more vertices. A deployment unit consisting of the data flow relationship between vertices and the functions of vertices. shape is related to autonomous and self-organizing choreography for intent deployment. In simplest form, a shape describes the interaction and connectedness of a set or group of vertices relative to a specific space [see physical space, functional space, and foundational space]. Shape in the physical space is well defined, such that it contains a certain number of vertices and bi-directional edges connecting the vertices. This shape provides efficient information sharing of events across all vertices using an eventual consistency protocol. shape in foundational space is well defined, such that is contains vertices and edges, where some are bidirectional, and some are directed. One example is the form of a hub with spokes. shape in functional space is not well defined and is understood to be fluid by design. The general shape can be described as a flow from source to sink with possible branches. The trivial shape contains two vertices (source and sink) and one directed edge. The minimal productive shape generally contains three vertices with two directed edges. This pattern continues for simple shapes in functional space that follow a single path from source to processing to sink. Generally, as vertices dynamically re-configure based on events, shape changes or morphs with new vertices and/or edge connections supporting the re-configuration actions. In most physical space instantiations, the shape change includes a bisecting temporal edge in response to the event. Similarly in functional space, the event adds a new vertex or edge. In foundational space, the event increases or decreases the vertices and, therefore, the edges attached to the hub (coordinator or delegator).

software factory—a structured collection of related software assets that aids in producing computer software applications or software components according to specific, externally defined end-user requirements through an assembly process. A software factory applies manufacturing techniques and principles to software development to mimic the benefits of traditional manufacturing. Software factories are generally involved with outsourced software creation.

state-engine—describes the interaction from state-to-state. All states are covered, non-terminating engine loop and can enter same state and will continue from last execution, if stateless between re-entrance within the execution method. All state and action execution methods are stateless. All solutions have a foundational state-engine (as part of the foundation), and this state-engine can be extended to handle higher-level state processing.

vertex—is the abstraction that defines all computational components regardless of the function. Often a vertex associates with the minimal functional unit of code. In various instantiations: a vertex is understood by its function, e.g., a video inference, an audio reader, etc. vertex is a kernel, i.e., core control software modules, comprised of lightweight extensible functions: state-engine, request and reply, message bus, data bus, interfaces, security, and so forth used to facilitate rapid assimilation of new capabilities, functions, or interfaces (i.e., features) into the framework. Vertex is used to generalize the framework and method of behaviors applied to the graph theory perspective and terminology.

worker—A vertex within a collection with a specific functional behavior; modular unit of a framework that typically performs processing of some sort and works within a collection of peer workers to accomplish some intent or portion of an intent.

Embodiments of the present disclosure provide all the necessary software ingredients to construct, deploy, execute, test, and improve simple to complex systems across distributed infrastructure. Embodiments of the present disclosure provide a novel and improved perspective on modeling, deploying, and executing software solutions as loosely connected data driven functions working together to produce results traditionally accomplished through monolithic applications or containerized microservices. Additionally, embodiments of the present disclosure decentralize management of loosely connected distributed systems by pushing support responsibility to the individual compute elements executing the data-driven functions. This approach removes the distinctions between Infrastructure-as-a-Service (IaaS), Platform-as-a-Service (PaaS), and Software-as-a-Service (SaaS) from the user perspective. IaaS provides on-demand access to physical and virtual servers, storage, and networking resources and is often described in terms of backend Information Technology (IT) infrastructure ready to be used by users' applications. PaaS provides on-demand access to complete platforms with the operating system, software, tools and frameworks for developing, executing, and managing applications. SaaS provides on-demand access to ready-made application software without having to provision infrastructure or platforms. The tradeoffs between flexibility, control, and ease of management are the driving factors when using IaaS, PaaS, and SaaS, and often organizations leverage a combination of these to model, develop, deploy, and use complex system solutions.

Provisioning and supporting IaaS requires in-house or out-sourced IT expertise but provides greater flexibility concerning what the development and execution platforms are. Provisioning PaaS reduces the burden of building and maintaining platforms for development and execution if available platforms contain the necessary software and performance characteristics. Provisioning SaaS further reduces and may eliminate the burden of development when the available software components support the organizational requirements. Embodiments of the system, method and framework according to the present disclosure can eliminate the need for in-house or out-sourced IT expertise to provision and maintain cloud-based infrastructure and platforms for development, management, and support of complex systems because it combines IaaS and PaaS with SaaS into a framework focused on development of systems to solve complex problems. It further reduces needed in-house IT expertise for on premises provision and maintenance of infrastructure and platforms supporting development and management of systems solving complex problems thus, organizations may reinvest the human and financial resources toward solving complex problems rather than managing infrastructure.

Consistent with the novelties disclosed herein, embodiments of the present disclosure include new ways to manage, communicate, and deploy loosely coupled, complex systems across distributed decentralized architecture. Embodiments as described herein include new protocols, trust, and levels of autonomy within the components of the framework that are not necessary in traditional monolithic or centralized orchestration-based system deployments. With continued advances in communication technology that provide innumerable interconnection and interaction possibilities of heterogeneous systems and applications, embodiments of the present disclosure provide a new paradigm to surmount the limitations of prior art in managing, deploying, configuring, monitoring, and trusting execution of these emerging possibilities.

In various embodiments, software components support provisioning on cloud-based infrastructure or platforms, as well as for on-premises hardware including servers, workstations, and edge devices. These software components can be referred to generally as vertices, where each vertex is made up of two major loosely connected layers, foundational and functional. The foundational layer provides the necessary software support a vertex needs to manage its computational environment. The functional layer provides the necessary software support to execute the functional purpose within the computational environment in the vertex. Each layer employs an asynchronous event-driven finite state engine (AEFSE) executing independently of each other yet loosely coupled through a message pipe. In this way, the two layers can communicate and interact as needed while reacting to events within their respective environments.

The AEFSE enables asynchronous, event-driven execution within the foundational and functional layers of a vertex, allowing it to act upon or ignore events based on its deployed event handlers. The foundational and functional layers both operate independently with state engines managing responses to events. Each state contains an event handler that responds to events independently, and both the foundational state engine and the functional state engine handle events passed to each other when appropriate. Embodiments of the present disclosure support both externally and internally generated events, allowing vertices to change state based on their events as a form of decision-making policy.

Figure 4:
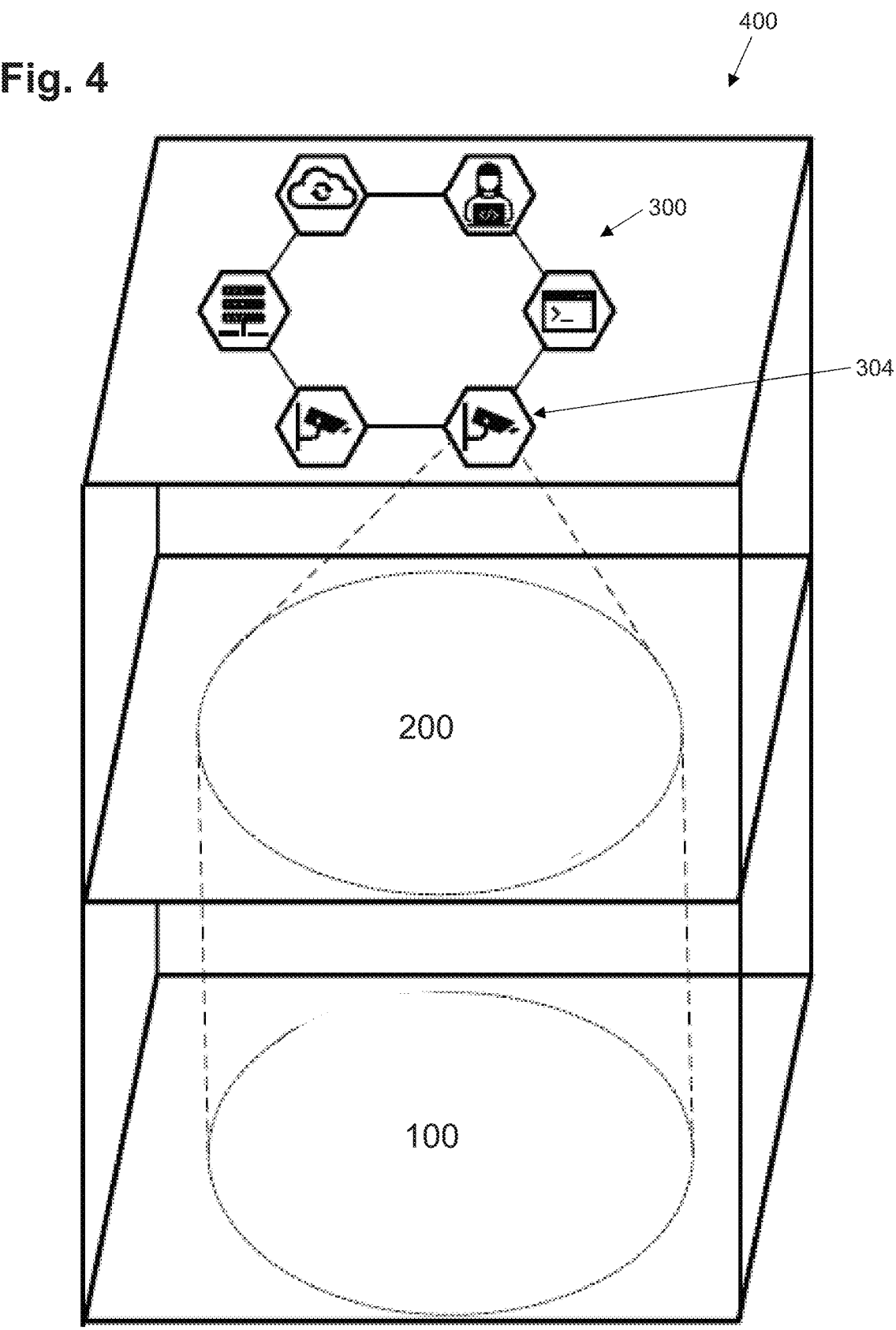
FIG. 4 is a conceptual view of a framework in accordance with embodiments of the present disclosure, detailing interrelation and interactive nature of the physical, functional, and foundational space.

The foundational and functional layers also define the execution spaces within which a vertex operates, foundational space, for example as shown at 100 in FIGS. 1 and 4, and functional space, for example as shown at 200 in FIGS. 2 and 4. Embodiments of the present disclosure deliberately construct a framework reducing complex solutions into collections of interconnected vertices where each vertex executes a small portion of the solution. Vertices are not meant to stand alone but rather are meant to work together aggregating solution actions into self-organizing, self-managing collections. The support capabilities of the vertices in the collection deliberately interconnect the foundational layers and exchange health, status, capability, and management messages. This collection of foundational layers is known as foundational space (e.g., 100 in FIG. 1, described further elsewhere herein). The foundational space can be considered the foundation upon which all solutions are built. The computational capabilities of each vertex in the collection self-organizes into data driven, interconnected functional layer execution environments flowing data from source to processing to sink completing the complex solution. The collection of functional layers is known as functional space (e.g., 200 in FIG. 2 described further elsewhere herein).

In various embodiments as disclosed herein, three vertex types operate together for distribution of both management and execution of complex solutions across decentralized distributed infrastructure. These types are known as delegator, coordinator, and worker. Delegator vertices communicate primarily with coordinator vertices in foundational space. worker vertices communicate primarily with coordinator vertices in foundational space. Worker vertices make up a collection to support functional space execution of the complex solution and provide health status and infrastructure and platform support in foundational space. Delegator vertices provide decentralized discovery processing across the framework infrastructure through the functional space, while managing one or more coordinators in foundational space. Coordinator vertices manage functional space communication connections supporting data flow processing by the complex solution. Each coordinator vertex also supports a collection of workers exposing the health and state of each worker in the collection in foundational space.

Figure 3:
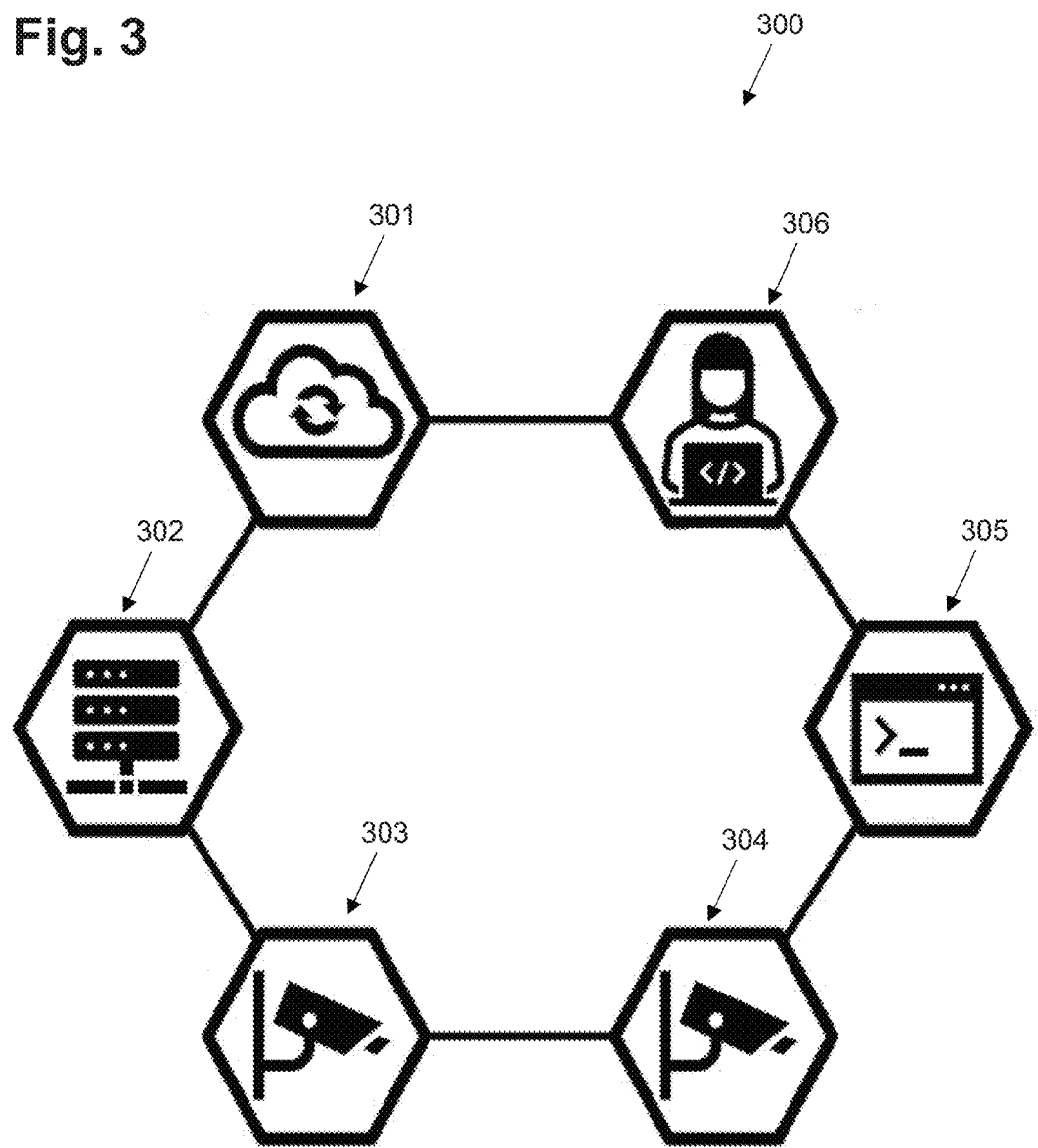
FIG. 3 is a graph diagram of a physical space of delegators representing physically connected vertices, i.e., machines loaded with a framework in accordance with embodiments of the present disclosure that are connected and communicating and can cooperate through delegators.

FIG. 3 depicts a graphical representation 300 of an embodiment of the framework in accordance with the present disclosure from the physical space perspective. The physical space is a description of the physical or virtual hardware infrastructure available for complex solution deployment. As shown in FIG. 3, a cloud-based delegator 301, a server-based delegator 302, edge device-based delegators 303, 304, virtual machine-based delegator 305 and a workstation-based delegator 306 are provided. Each delegator 301-306 can be considered a node, and each node represents physical or virtual hardware with an executing delegator vertex that communicates with other delegator vertices within the space. Additionally, the delegator vertex will handoff (delegate) some support aspects when needed to the contextually appropriate node local coordinator vertices. Within this space, the delegator vertex leverages node local coordinator vertices to adjudicate and coordinate access to data, processing, results, analysis, etc. from its collection of workers.

Physical space may be instantiated as a bidirectional circuit, where individual nodes (e.g., 301-306 in FIG. 3) know minimally about their two nearest neighbors. In this instantiation, event information propagates in opposite directions initiated by the node handling the event. Events in this space include but are not limited to node mutation and graph mutation. A node operates in the physical space simply by being deployed with a delegator vertex.

FIG. 2 depicts a simplified graph 200 representing a framework in accordance with the present disclosure from the functional space perspective where worker vertices, including source worker vertex 201, processing worker vertices 202, 203, 204, 205 and sink worker vertex 206, communicate with each other in an orderly dance, processing data and publishing results fulfilling their collective purpose. In such embodiments, delegator and coordinator vertices may only provide support roles and operate essentially outside this space.

The functional space may usually be instantiated as a directed hypergraph, where information and processing flow along a directed path. In this instantiation, there can be automatic shape mutations supporting load balancing, surge processing, sensor mutations, etc. that may manifest as increased fan-out or fan-in on one or more worker vertices. In one instantiation such as shown in FIG. 2, the source worker vertex 201 feeds data to a processing worker vertex 202 that then provides results to parallel processing worker vertices 203 and 204 such as for comparison or compilation provided by the next worker vertex 205. The results of the pipeline end at the sink worker vertex 206.

It will be appreciated that worker vertices in accordance with the present disclosure support three types of function components: data source, data processor, data sink. When the complex solution is decomposed into deployable tasks, it is into one or more source, processor, and sink tasks. The source, processor, and sink tasks deploy onto worker vertices in functional space across the framework infrastructure in accordance with the present disclosure infrastructure. The task instantiation on the worker vertices along with their communication paths make up the functional shape geometry of the solution in functional space. The supporting solution management layers operate in foundational space utilizing a uniform foundational shape geometry made up of delegator, coordinator, and worker vertices' foundational layers. For purposes of the present disclosure, geometry can be considered as the current abstraction of interconnected vertices, where the resulting structures represent pairwise relationships between vertices. This definition leverages mathematical graph theory as practical representations of both the computational environment provided by functional space and the management environment provided by foundational space.

Worker vertices, in this space, have a lifespan based upon their usefulness to fulfilling or responding to the purpose of the system and will elastically mutate appropriately. For example, as load asymptotically diminishes toward nil, worker vertices will enter diminished resource usage and eventually will release their functions.

FIG. 1 depicts a graph 100 representing an embodiment of a framework in accordance with the present disclosure deployed to a node from the foundational space perspective, where the foundational layers of delegator, coordinator, and worker vertices provide the foundational connections to maintain and manage the functional and physical spaces. As can be seen, graph 100 represents a singular infrastructure node showing the hierarchical breakdown of a delegator vertex 101 and two separate collections, where each collection is managed by a coordinator vertex 102, 103 and contains one or more worker vertices 104-105 and 106-107, respectively, in accordance with embodiments of the present disclosure. This space is usually instantiated as a hybrid hypergraph, where some edges are directed, and others are bidirectional. The edges supporting request/reply interactions are bidirectional, while the edges supporting Monitoring (Health and Status) are unidirectional. In FIG. 1, bidirectionality is indicated in solid lines and unidirectionality is indicated in dashed lines with an arrow depicting direction. As shown in FIG. 1, delegator 101 is in communication with coordinators 102, 103. Coordinator 102 is in communication with workers 104, 105 and coordinator 103 is in communication with workers 106, 107.

FIG. 4 is a graphical representation 400 of the interrelational and hierarchical nature of the three framework spaces 100, 200, 300 in FIGS. 1 through 3 that work concurrently. For example, message processing by delegator vertices' functional layers operating within the physical space 300 may only impact events in the foundational space 100 and, if deemed appropriate in this space, may further impact events in the functional space 200 (e.g., to accommodate new functions). These space hopping events are limited to a finite set and any events not in the set are silently ignored.

In addition, embodiments of the present disclosure include software components that support modeling, developing, deploying, executing, managing, and testing complex solutions. Modeling complex solutions is a process of breaking down the problem into manageable pieces. Developing the complex solution into a functional whole is the process of defining a task for each modeled piece as data source, data processor, and data sink worker vertices and representing the whole as a functional shape geometry. Deploying the tasks across infrastructure and connecting them into a solution involves deploying the functional shape. The resulting system is available to execute its purpose processing data in functional space while managing itself and informing users of its state and when issues arise that it does not handle in foundational space. The improvements associated with the approaches to modeling, deploying, and executing software solutions as self-managing, loosely connected, data driven functions working together to produce results as described herein, while decentralizing management of loosely connected distributed systems requires new perspectives and software tools as described and illustrated in the present disclosure.

Intent is a component of embodiments of the present disclosure for deploying complex systems and includes the structure, description, and breakdown of intent. System deployment starts with an intent, or the user perspective of a need or requirement, for a software solution. shapes are manifested from that intent during deployment and those shapes become reusable components. shapes are the decomposed parts of the solution (or intent) represented in a structure defining loosely coupled vertices (sub-components of software) fulfilling the intent and the associated relationship and communication between those vertices. Intent is agnostic to human interaction and provides expansion by aggregating intent structures. Additionally, intents become ubiquitous and sharable through their representative structure, thus improving the time spent developing new capabilities. In most instantiations, intents are pre-defined, but not required to be, based upon testing, expert knowledge, or experience with the compute environment. Intents can also include uncertainty that supports more dynamic morphologies of the resulting shape after initial deployment of the representative structure. Further, intents have event-driven morphology components that apply their own dynamic changes to the resulting shape that can then be captured as new representative intent structures. choreography describes the execution and manifestation of the shapes resulting from the deployment of intent and the inherent autonomous nature of the relationships between foundation and functional Layers within the vertices making up the shape.

Within the framework in accordance with embodiments of the present disclosure, aspects of the foundation and functional behaviors autonomously configure the vertex (software components) supporting the executing shape of the intent. These aspects are left to the vertex to work out in both the foundation and the functional spaces and is known as autonomy. A vertex uses framework autonomy to construct its notion of the environment upon which it executes according to its individual intent. Autonomy within a vertex determines "how" to handle external requests that specifies "what" must be done with the request or data. It is an extension of choreography focused on the vertex fulfilling a request and is not commanded, constrained, or controlled by any external source. To fulfill the intent, framework autonomy initiates one or more coordinator vertices (or groups) deploying cascading portions of the intents to local worker vertices. Then, each worker vertex autonomously configures itself based on its portion of the deployed intent. Each vertex registers their configuration and capability to inform and support the initial establishment of a shape to represent and fulfill the complete intent. Therefore, embodiments of the framework maintain a working relationship between intent, choreography, autonomy, and shape.

Another advantage of the relationship between intent, choreography, autonomy, and shape in accordance with the present disclosure is the facilitation of Emergence. Emergence is an effect that comes from triggers across relationships between autonomy, events, environment, intent, and shape. Because groups of vertices (or collections) autonomously execute intents, adapting to internal and external events, new patterns naturally emerge and can be captured for study and application in other environments. Emergence may also come from a discovered need by a user. In one instantiation for AI, the collection is processing raw data to normalize it for analysis, feature detection, additional processing, and presentation by other collections. This intent is like data extraction and transformation of the common Extract, Transform, Load (ETL) pipeline. The difference is that the executing shape fulfilling the intent autonomously handles data errors and makes modifications by starting new worker vertices and stitching them into the shape to handle these error events. Thus, the more irregular the data fields are the more worker vertex handlers that emerge. Eventually, one may expect that the shape grows large enough to create bottlenecks. In this case, the worker vertices sensing the bottlenecks may instantiate load balancing clones and stitch them into the shape. If this does not relieve the constraints, then those vertices sensing the issues may request user intervention to evaluate and re-work the shape accordingly.

Clearly, the expectation that the deployed framework components may recommend and even attempt to manage and improve its shape through applying various morphologies is very real and possible. Emergence also includes the ability of the worker (or collection) to suggest function changes in response to data or environment changes in a general sense. In one instantiation, the collection processing a certain data family has had an update applied based on security recommendations. The collection applies a morphology to itself that separates out the source worker vertex into a wrapper collection to attempt to provide inspection of the data before processing it and requests a new collection to handle error events. Once the new collection is initialized and the resulting shape is stable, error events that occur in this inspection are collected and processed to analyze impact and recommend applications to deal with the data changes. Ultimately, these recommendations can be captured as an intent representation structure and used to generate functional components that can be tested alongside the stable collection and provide knowledge of the comparison.

EXAMPLES

An example framework in accordance with the present disclosure can be used for Artificial Intelligence (AI). AI problems are useful applications of embodiments of the present disclosure due to their specific complexity and deployment needs combined with the ubiquitous industry adoption. AI solutions are complex and even simple architectures, when deployed, need to consider business rules and policies, data capture and data preparation, model training, model testing, model selection and transition to production, outputs to user interfaces, output monitoring, evaluation and feedback. More complex AI may combine multiple architectures or may stack models within a given workflow. Embodiments of the present disclosure can simplify the management, execution, investigation, discovery, etc. of using and realizing the potentials of these complex solutions.

Figure 5A:
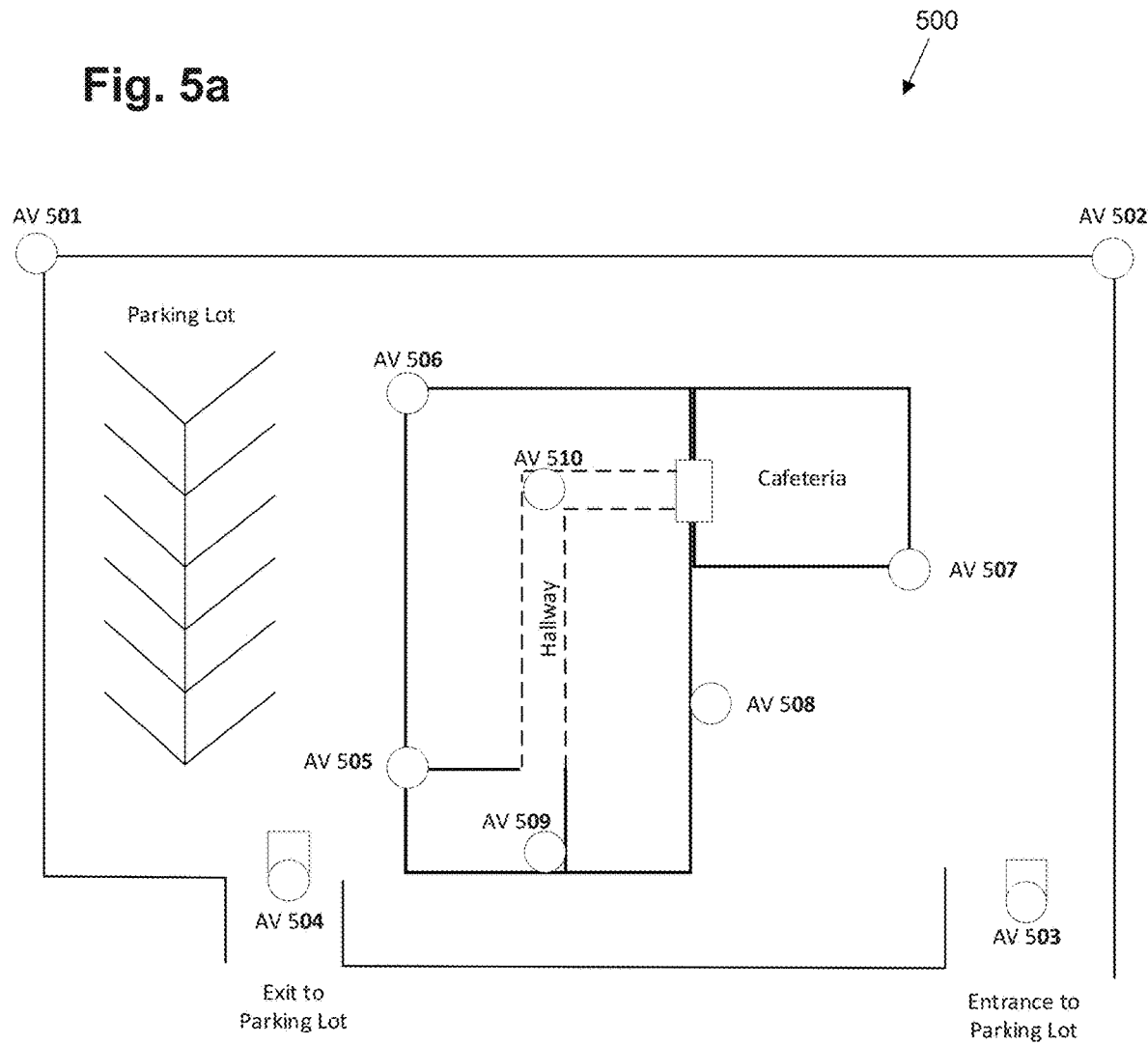
FIG. 5a is a graphical diagram representing a distributed complex system for a physical installation of security systems in accordance with embodiments of the present disclosure.

FIG. 5a depicts a graphical diagram 500 of an example physical installation to illustrate embodiments of the present disclosure. An organization selling security services to homeowners, commercial companies, and industrial installations may employ one or more embodiments of the present disclosure as a system provisioned on a combination of cloud-based and on-premises physical and virtual processing, storage, and sensor hardware. A new client purchases services to install and monitor camera and audio feeds at all ingress/egress points, all hallways within the premises, the parking lot, and the cafeteria. The services should categorize objects and people into subcategories of known and unknown groups. The solution should also track unknown individuals while within the sensors' ranges, infer relationships based on behavior, and guard all individuals' privacy. Additionally, the solution should identify known and unknown license plates while tracking vehicles in and out of the parking lot, delivery areas, and other vehicle access points. Other object identification capabilities are included to attempt to infer and alert security personnel of suspicious behavior. FIG. 5a shows the on-premises edge devices (e.g., audio-visual (AV) devices 501-510) and installation layout.

The modeling process starts with one or more company representatives (i.e., a user) breaking down the requirements into tasks, which is the first step in defining intent from requirements. The requirements as stated become:
 1. Install video and audio feeds at all access points
 2. Install video and audio feeds in all hallways within the premises
 3. Install video and audio feeds in the parking lot
 4. Install video and audio feeds in the cafeteria
 5. Collect the video and audio feed data
 6. Use the video and audio feed data to infer objects and people
 7. Categorize the objects into known and unknown groups
 8. Categorize the people into known and unknown groups
 9. Use the video and audio feed data to track unknown individuals while within range of the premises
 10. Infer relationships of unknown individuals with both known and other unknown individuals from behavior
 11. Protect privacy of individuals
 12. Identify known and unknown vehicles and license plates of vehicles entering and exiting the premises
 13. Infer and alert suspicious behavior
 14. Store the sensor, inference output, analysis output, and decision-making output for auditing and liability Requirements 1 through 4 identify installation of sensors and their configuration including unique parameters such as location, resolution, operating range, etc. that the resulting system will use when executing. Requirements 5 through 14 provide the basis for the modeling, development, execution, and test cycle of the complex solution. Management of the deployment is distributed to each task and includes interfaces for users to interact with the complex solution. Embodiments of the present disclosure use all three basic models to identify task instantiation for deployment and execution: data source tasks, data processor tasks, data sink tasks. The collection of the audio/video edge devices data becomes data source tasks within the solution. The inference, analysis, and decision-making requirements become processor tasks, and the storage requirements become sink tasks. The development process iteratively identifies functional components that support each task, the connection layout of the data flowing through the tasks, and the configuration parameters needed by each task. The resulting functional shape geometry structure representing the developed solution may then be deployed across the infrastructure and execute on the data provided by the source tasks.

Each Audio/Visual (AV) unit or node 501-510 in FIG. 5a contains a video sensor, an audio sensor, a multicore neural processing unit (NPU), and a dual core central processing unit (CPU). Developing requirements 5 and 6 above into a functional shape geometry to deploy on this infrastructure involves defining the tasks as worker vertices and the interconnections representing the data flow relationships. Users select video source task, audio source task, video object detection classification task, audio object detection classification task, and human detection task to represent the functional shape geometry of each AV unit. FIG. 5b is a diagram 550 demonstrating the representation defining the functional shape geometry used for deployment on the infrastructure of FIG. 5a. AV 501 receives functional shape structure 521, AV 502 receives functional shape structure 522, AV 503 receives functional shape structure 523, and so forth ending with AV 510 receives functional shape structure

530. The contents of the functional shape structure can include at a minimum the functional space task identifier, one or more data types that the task will handle, and one or more interconnections to which the task will deliver data. The representation functional shape 520 provides the initial deployment of the solution for requirements 5 and 6. Because the worker vertices self-organize and self-manage their resources, the functional shape may change to accommodate events including additional processing, changes in data types, comparative processing, etc., thus, coordinator vertices will maintain the functional shape representation to remain consistent with the evolved geometry.

Embodiments of the present disclosure introduce a paradigm shift for distributed management and deployment of complex software solutions from centralized orchestration to decentralized choreography. Embodiments of the present disclosure push autonomous computation and management functions to distributed physical or virtual platforms or systems to support creating, running, and modifying complex distributed software applications. Approaches as described herein are materially different from the traditional method of orchestration.

Historically, orchestration in the context of distributed systems is the management and deployment of processes and tasks running across an infrastructure of compute nodes. Typically, orchestration is a deployment and management layer laid on top of provisioned infrastructure, where the majority of processing nodes with compute abilities (called workers) execute packaged applications. The workers are managed by one or more master nodes governing the entire workflow of the distributed system. Orchestration typically involves the following steps:

(a) Task Definition: define the tasks that need to be executed in the distributed system. These may be simple shell scripts or packages of complex applications with many steps.

(b) Task Scheduling: orchestration schedules tasks in such a way that as soon as the dependencies between them are complete, resources become available, and the workflow is optimized via some chosen algorithm (i.e., critical path method) they can be dispatched.

(c) Task Dispatching: the orchestrator dispatches the task to the appropriate available nodes via a central master node or coordinator.

(d) Task Execution: the tasks execute on the compute nodes according to the schedule and report status of their execution back to the central master node or coordinator.

(e) Task Monitoring. the coordinator monitors the status of the nodes and their tasks and may take appropriate action in the case of disruption or failure. This may include rescheduling the task, or even rolling back the entire workflow.

(f) Task Completion: when all tasks are complete, the master node ends the orchestration process and collect the results.

This traditional approach has several drawbacks. Assigning the management of task definition, scheduling, dispatching, monitoring, and completion to a central location introduces several drawbacks and challenges with scalability, stability, flexibility, complexity, and resource utilization.

Regarding scalability, the central master node can become a bottleneck as the size of the distributed system grows, leading to scalability issues stemming from the centralized management of task definition, scheduling, dispatching, monitoring, and completion. Central coordination becomes overwhelmed as nodes are added and management requirements increase.

Regarding stability, the central master node and/or deployment becomes a single point of failure that can impact the entire workflow if any errors occur, and recovery becomes difficult if this centralized management point is lost.

Regarding flexibility, the orchestration process is rigid as to its requirements because the single point of management disallows external influence, and a singular set of management policies or rules is applied to the whole.

Regarding complexity, as task complexity increases and system size grows, management becomes increasingly complex and requires extensive definition of the system. This complexity makes any applied changes to the system complex as well.

Regarding resource utilization, orchestration has specific limitations and drawbacks when optimizing resources across many nodes leading to poorly managed resources. Visibility of individual node performance is limited and, in some cases, opaque, so the central master node or policy is relying on incomplete information. Scheduling is often static and based on preexisting logic, without extensive logic to handle every use case across a large system. Resource sharing can be inefficient as the central master node attempts to blend local resource balancing with global balancing.

Modern orchestration, like Kubernetes, attempts to address these issues with automatic load balancing, dynamic scheduling, and resource sharing. However, these are tools based on a generic centralized policy with the same disadvantages of managing a centralized complex policy across disparate devices, tasks, and environments (e.g., a dynamic infrastructure). Orchestration is used for specific automation using centralized control and is inherently inflexible to managing dynamic changes and complexity throughout a distribution compute system.

To manage centralized policy distribution, resource sharing, scheduling, etc., orchestration typically uses a central coordinator node, often called a Master Node. Additionally, the Master Node can be an Instruction server, commonly called an (Application Programming Interface) API server. This is a critical centralized API endpoint for communication between the Master Node and the worker nodes. It may also receive and process requests from various clients, other API servers, or custom applications and send appropriate commands to the worker nodes. This centralized node often contains some functionality to manage the state of resources. It may do this via the creation, modification, or deletion of nodes according to some predetermined policy. It may include some element of authentication and authorization to verify requests and determined if an operation is authorized. This centralized node contains some element of management of the overall state of the system, monitoring health of other nodes, and performing recovery and failover.

As systems become increasingly complex, these challenges with orchestration, generic centralized policies, and traditional management strategies become increasingly overwhelming. Orchestration requires some version of this centralized authority (the Master Node) to manage these challenges. For example, the central authority must maintain a ledger of addresses and list of logical rules to define interactions that endlessly grows. Maintainers of policy and functions must uniquely develop (and manage) these to address the communication and interaction between nodes, which, again, grows as the systems grows creating a cycle of increasingly complex management tasks and derived strategies. Further, a bottleneck is created when a generalized policy is applied to a large system, as different portions may require different policies or functions. This means policies for authorization, management, resource management, and communication may grow in extreme complexity as they attempt to define the outcome of every interaction between different policies. This results in inherent fragility in the system as the addition of new resources with new policies must be accounted for across the entire system. Orchestration excels in conditions with static behavior with predefined criteria to account for increasing complexity of management. However, dynamic behavior at lower levels is made even more difficult as the central system is forced to handle these interactions with limited visibility. Attempts to distribute the master node only function as multiple nodes that are still inherently multiple master nodes. A technological solution as disclosed herein is needed to truly address the problems with Orchestration with respect to complex, distributed systems. Choreography is a component of the present disclosure that supports an alternative framework for system management.

Choreography is part of the technological solution as disclosed herein that pushes management of nodes to the local compute nodes to self-organize and execute. Orchestration has no concept of self-governance within each individual node and only provides it the ability to execute and return results. Embodiments according to the present disclosure include software methodologies that not only distribute execution functionality but also provides fine-grained management of every node self-management capability and an intent, the ability to understand and define tasks. Additionally, choreography gives every node the ability to schedule their own tasks, to dispatch the tasks, to execute them, to monitor their states and progress, to act based on task feedback, and to complete and end the tasks. This is fundamentally different from orchestration because it decentralizes and decouples management of complex solutions by moving the features into the individual nodes.

Figure 6A:
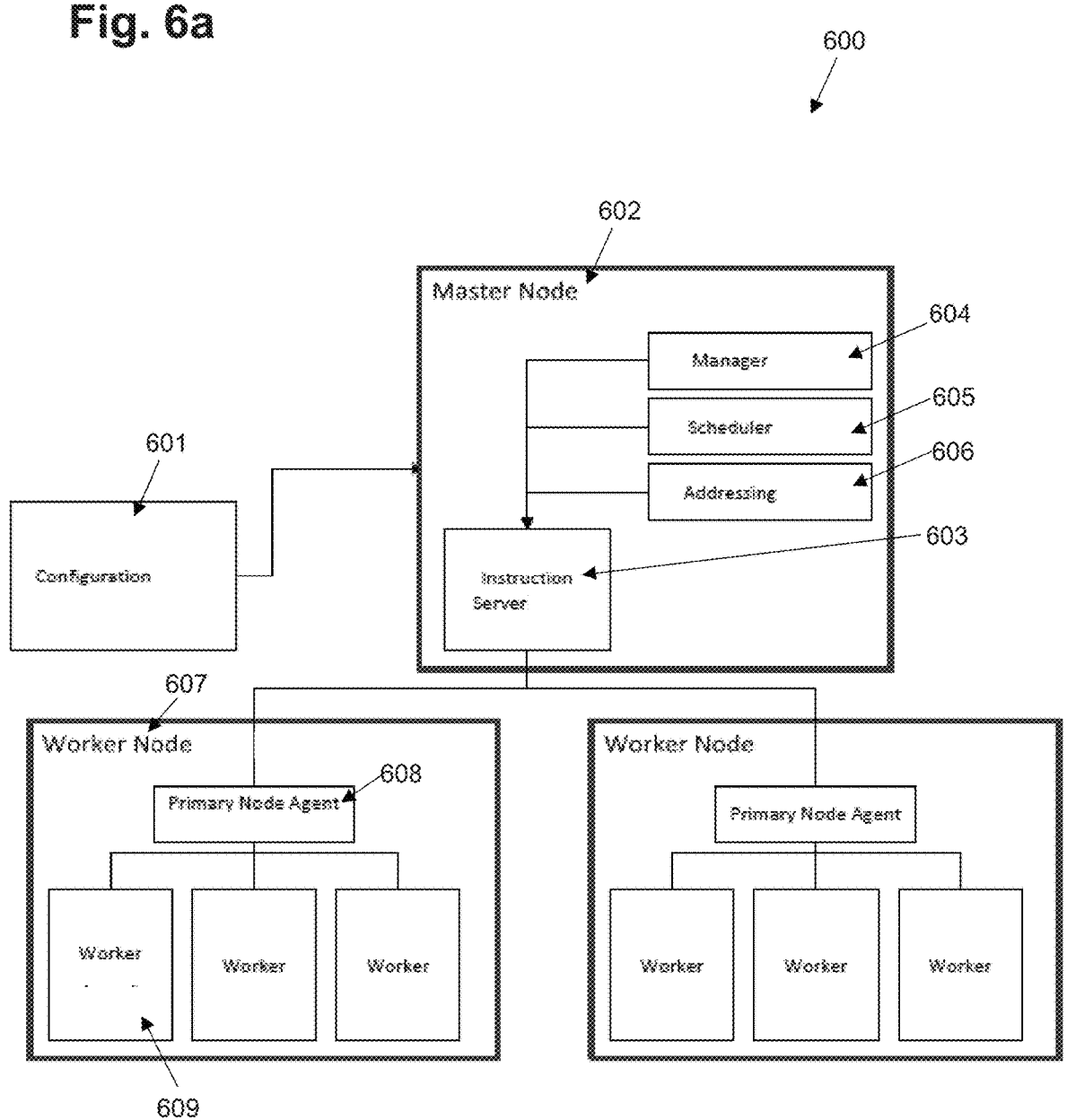
FIG. 6a is an exemplary graphical depiction of the organization and structure of an orchestrated system in accordance with embodiments of the present disclosure.

FIG. 6a shows a generalized and simplified organizational layout of an orchestrated system. As shown therein, configuration 601 is passed to a master node 602, which serves the configuration parameters to a variety of systems. The master node gives those parameters to whatever the relevant internal system is, whether the manager 604, which manages the core control loops that regulate the cluster resources and ensures they are in desired states, the scheduler 605, or the addressing and routing 606. The instruction server 603 takes outcomes from the manager 604, scheduler 605, and addressing 606 and may distribute Instructions to one of the individual worker nodes 607 within the system, where it will be received by a node agent 608. That node agent 608 will then instantiate, control, and command individual workers 609 to complete some needed tasks.

Figure 6B:
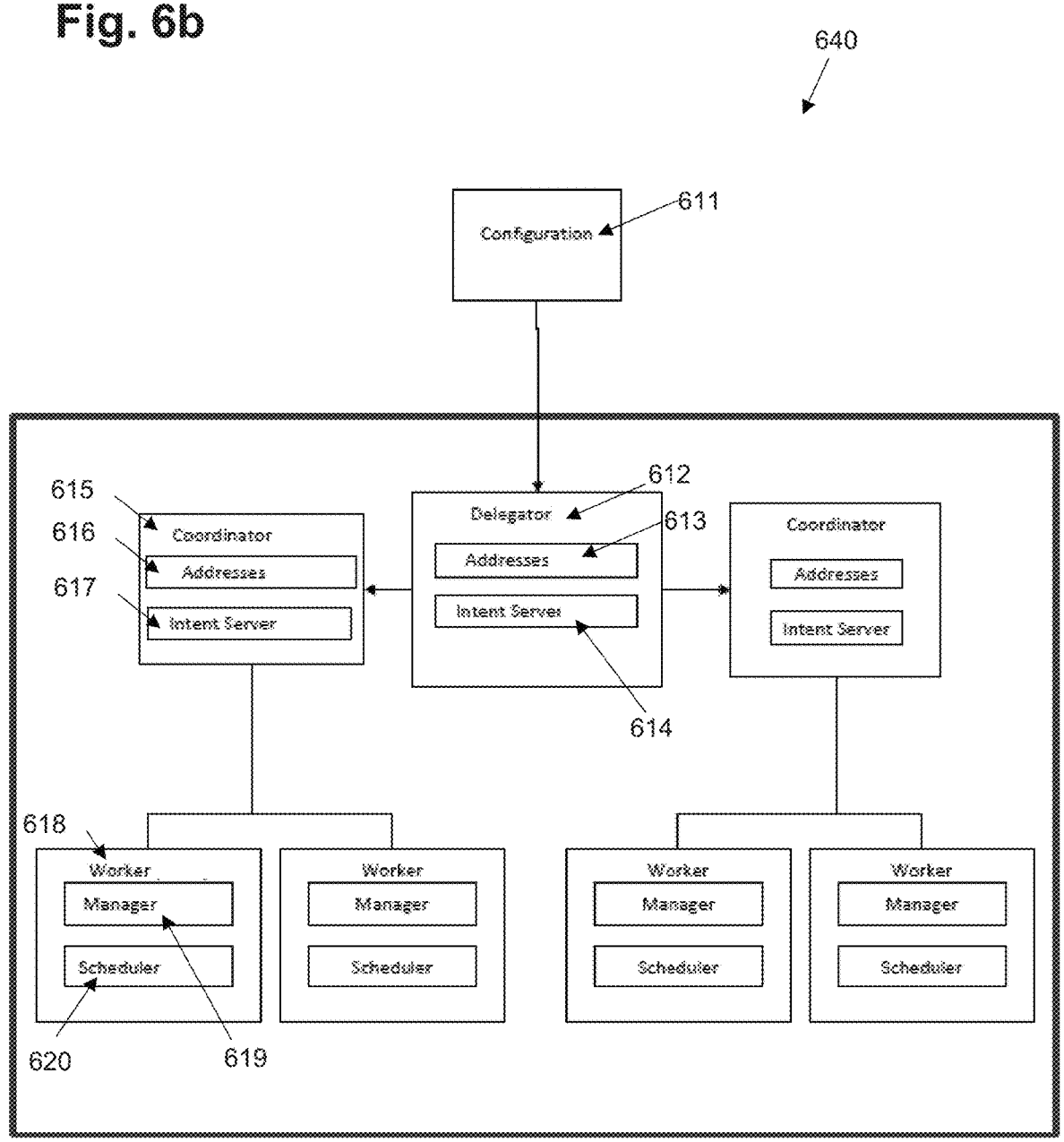
FIG. 6b is an exemplary graphical depiction of the organization and structure of a choreographed system contextualized with the traditional components of an orchestrated system for comparison in accordance with embodiments of the present disclosure.

In comparison, FIG. 6b denotes a simplified version of the layout of embodiments of the present disclosure. As shown therein, Configuration 611 is passed to a delegator vertex 612 (either directly or passed along from another vertex). Delegator vertex 612 stores the addresses of additional nodes 613 and contains an intent server 614 to distribute portions of any intent contained within the received configuration. It may distribute some portion of the intent to a local coordinator vertex 615 that also contains some list of addresses 616 and its own intent server 617. Coordinator vertex 615 then distributes a subset of its intent to individual worker vertex 618. Worker vertex 618 contains a running manager 619 and scheduler 620 supporting the function contained in the intent.

It will be appreciated that there is fundamentally no master node in this implementation of choreography. Instead, each node has the functions of the master node including scheduling and handling security distributed across the vertices operating on the node. The responsibilities of the instruction server, proxying, and the DNS service are distributed to delegator vertices, coordinator vertices, and even worker vertices. The advantages of this are many. For example, each individual node can modify its own behavior, whether adapting to fulfill requests locally, or adapting the environmental changes to scale and perform more efficiently. This is handled via the inclusion of the event driven state machine in every vertex in the system. Local modification abilities reduce the complexity and specificity needed to define how the system changes. Self-management allows robustness as there is no individual point of failure and increases the ability to respond to failures from additional nodes and to adapt to local failures. Users also gain new capabilities that are unrealistic in traditional orchestration. In the event of a system becoming fractured, the workers that make up subsets of the system can continue to work and manage without some needed central connection. Systems owned and managed by multiple entities can interact and utilize each other more readily instead of through tightly managed APIs. This inherent resiliency of the approach to distributed systems also allows for many other advantages. Local problems remain local with a decreased likelihood to affect the entire system. System changes can be more easily tolerated including both unintentional changes, such as environment change, or changes requested by a user. Changes do not necessarily need to be validated against the whole of the management system, which means that time complexity for rule validation goes from $O(!n)$ to $O(n \log(n))$ or $O(n)$.

In this instantiation, the framework is comprised of separate pieces of software components that are known as vertices deployed on physical or virtual hardware known as nodes. Each vertex is comprised of two separate layers of functionality: the foundational, which supports framework functionality to maintain itself within its environment and connect to each other and handles lower-level operations; and the functional, which includes messaging and user defined functionality to execute tasks. In this instantiation, the embodiment consists of three separate entities, each a different type of vertex, functioning as specific collaborative vertices: workers, which are individually performing high level functional capability, coordinators, which manage a group of workers and their communications, called a collection, and delegators, which manage peer to peer communications protocol, maintain knowledge of connections across the physical hardware space, manage and monitor local coordinators, communication between coordinators, and management/decision making between delegators. Each of these vertices is built upon an inherited framework foundation. This foundation provides core level functionality such as messaging, monitoring, management capabilities, and a baseline state-engine. This foundation maintains the structure and components of framework. On top of the foundation, the functional pieces run. These functional pieces support the software solution via processing, accessing, storing, messaging, managing, or any other software function a user may want to implement operating through an extended state-engine.

Self-Management

Self-management also contributes to improvements in accordance with embodiments of the present disclosure. Self-management is the autonomous, multi-faceted approach to decision making within each node in the infrastructure. A framework in accordance with the present disclosure pushes decision making to each individual node spread across the various vertices instantiated on the node at any moment. Self-management is represented by a user defined set of logical rules defined in a structure that drives this decision making of each vertex. The fundamental decision-making space is set within the event-driven state engine. Each vertex may change states based on external or internal events to manage changes to the system. These states are not static and can be modified by the user. Common states include but are not limited to "start", "stop", and "execute". The flow between states is event driven and somewhat resembles a user defined decision flow chart.

Embodiments according to the present disclosure include a baseline state-engine for each vertex that is built upon the software stack. This state engine transitions between states based on the results of handling events that influence the vertex. Event processing may result in no transition thus the state engine remains in its current state and continues to process events according to its configuration. Each state contains a set of events that it will process, and the handling of each event defines a transition state for successful and for erroneous processing of the event. The sets of events are independent but may be shared or referenced by other states. Events that occur within a state that are not handled by the state are silently ignored, however, a catchall event handler could be added to the sets to log the event occurrence for later processing, for example. Therefore, the event processors define behaviors that occur in the event handling that may include but is not limited to communication messaging, resilience and recovery of the vertex, node and/or system, elasticity, load balancing, discovery, migration, error handling, etc. An event is a meaningful element of application information relevant to the vertex, which continues to remain or transition between states as it handles events. Self-management is also used to fulfill authentication or "trust". Each vertex applies policies and protocols governed by state engine event handlers to authenticate external request events.

In various embodiments, self-management operates to provide autonomy, stability, resilience, and robustness to the vertex. The vertex, as shown in the diagram 700 of layers of a vertex in FIG. 7, has two independent, yet loosely coupled state engines: a state engine 705 for the foundational layer and a state engine 706 for the functional layer. Additionally, the upper three layers 707, 708 and 709 encompass the possible execution service the vertex is fulfilling. The state engine layers 705, 706 operate asynchronously and independently to support the executing service layer(s) 707, 708 and 709. The functional layer state engine 706 directly supports the executing service through capturing operating system resource interrupt and introspection events. The foundational layer state engine 705 indirectly supports the executing service through capturing and processing framework message events, routing functional layer message events, and capturing its share of operating system resource interrupt events. For example, a worker vertex has finished processing the available data of the set of files established by the current intent and has paused executing its service. The foundational layer state engine 705 of the vertex is operating in the executing state and processing events from its coordinator vertex. The functional layer state engine 706 of the vertex is operating in the idle state processing events from the foundational layer. The worker vertex receives a request from the coordinator vertex to process another set of files. This set is of a different but related data type that the worker vertex has capability to process and provide results to other subscribing worker vertices. Because each of the worker vertices self-manage, they do not need to be directed in how to fulfill this request. The worker vertex foundational state engine 705 receiving the request issues a request containing the information from the coordinator vertex (location of files if not already known, list of files, expected data type, etc.) to the functional state engine 706 to initialize the execution environment to process the files. The functional state engine 706 initializes the execution environment to fulfill the request and transitions to executing state on success or remains in idle state on failure. In both cases, the functional state engine 706 issues a response to the foundational state engine 705 with the success or failure information, and the foundational state engine 705 issues a response base on the functional state engine 706 response to coordinator vertex either accepting or rejecting the request. The foundational state engine 705 continues operating in the executing state processing additional event. Assuming successful establishment of a new execution environment for the service, the functional state engine 706 transitions to executing and shifts to a new set of events to handle. The execution environment, in this example, maintains its connections to worker vertices subscribing to its data processing results, but informs the subscribers of the new data type as it publishes each chunk or frame or unit of data. This triggers the downstream subscriber worker vertices to self-manage and adjust to the new data type.

Figure 8A:
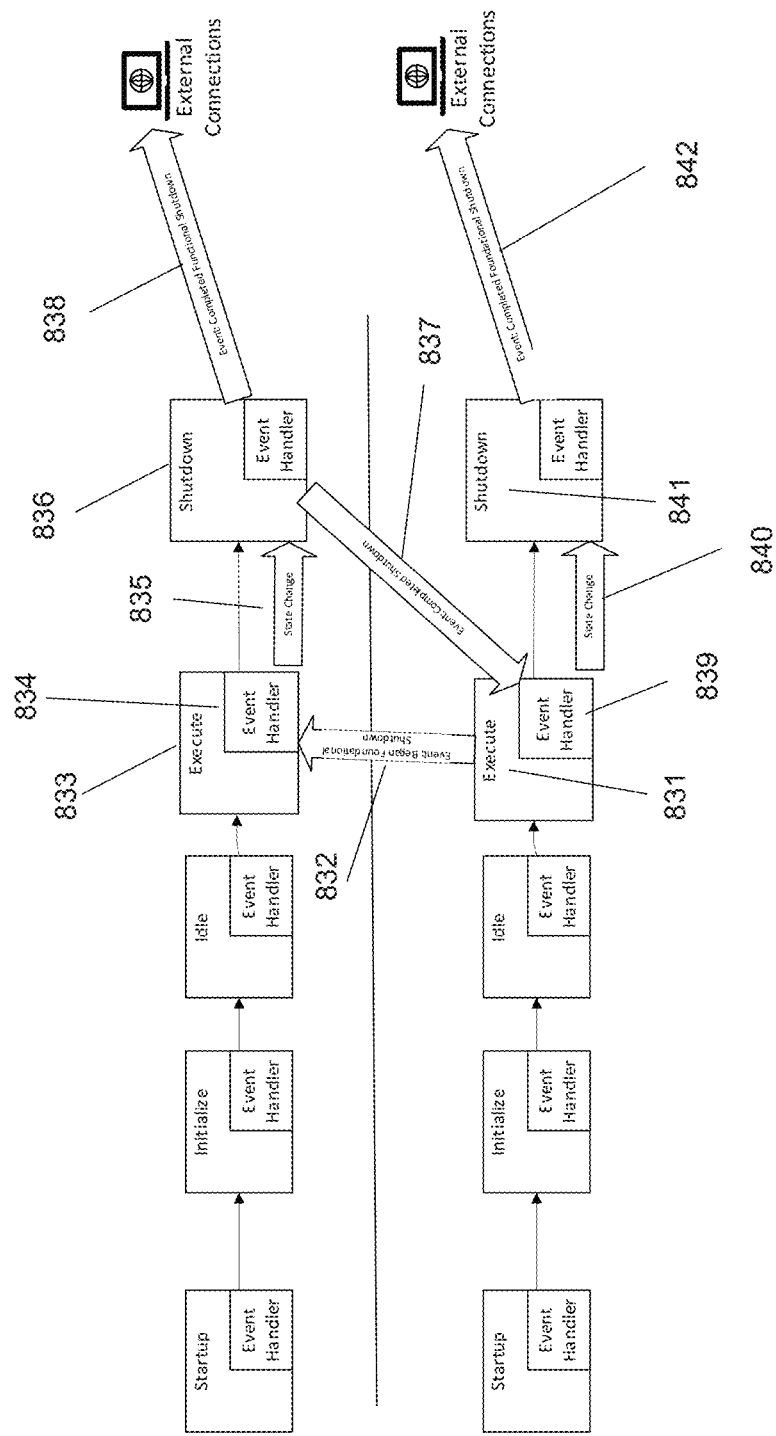
FIG. 8a is an exemplary graphical depiction of the coupled interaction of functional and foundational state engines illustrating inter-spatial event passing during vertex shutdown in accordance with embodiments of the present disclosure.

A simple visual example of the two state engines working in tandem is expressed in FIG. 8a. The figure depicts limited subsets of both an example functional space state engine and foundational space state engine. In this example, both state engines are in the "Execute" state 831, 833. The foundational space attempts to gracefully shutdown, for example in response to an external event, it sends an event to the functional state engine requesting it to shutdown 832. The functional state engine in execute state 833 receives this event in its event handier 834. It handles this event by terminating its execution thread and changes its state 835 to shutdown state 836. It sends events both internally to the foundational state engine 837 and externally 838 to inform other vertices who may require that information. The foundational space is still in execute state 831, upon receiving the response event that functional space has shut down successfully 837, it then changes state 840 to shutdown state 841 and sends its own event notifying other vertices it has shutdown 842.

These event-driven, state engines 705, 706 dictate how an individual vertex reacts and is not governed by a single authority. Self-management through the state engines gives the individual vertex authority over itself, where it can accept or reject external requests based on defined logic. This provides several advantages. First, each vertex is essentially self-sufficient and can continue to function intelligently even when external guidance is missing. The node manages itself by extension because nodes are made up of plurality of vertices that manage themselves independently but coupled to one or more services fulfilling one or more intents. Therefore, orphaned nodes that lose contact with the rest of the infrastructure can either continue to complete their services then shut themselves down if appropriate to save resources or connect to and function for different deployment of the framework on other infrastructure. Second, each vertex can function within multiple different functional spaces simultaneously. Vertices can cross connect between multiple systems or functional spaces based on authentication, access levels, environment, priority, proximity, etc. Since self-management is pushed to each vertex, event responses stabilize and reduce or eliminate but always manage conflict with different policies across these multiple functional spaces or systems. This is observed in the example above where the downstream worker vertices may be operating in different functional spaces yet subscribing to the files provided by the central worker vertex of the example. These downstream worker vertices will react to the data changes according to their local self-management instructions. The reactions may include disconnection from subscribing because the data source is not of interest to its overall intent; morphing the functional shape of the intent to include new worker vertices to process interesting features of the new data; or even ignore the data change completely.

Self-management through the state engine extends autonomy of vertices to respond to events. The state engine consists of a set of states and a set of transitions between those states. The state engine may trigger output events or actions because of the state transition. Event handler is the term used to refer to the functions that respond to input events by initiating state transitions or triggering output events. The advantage of state engines is that they allow for a clear definition of the logic of each vertex within the individual vertex. This means that the vertex behavior can not only be understood, but also modified and inherited as needed. The asynchronous event driven nature of the state engines gives the vertex the ability to self-schedule instead of relying on traditional external scheduling, and the vertex responds to incoming data or work according to its schedule. The two separate state engines in the foundational layer and the functional layer work together but separately. While the foundational state engine drives things like maintaining worker-to-coordinator or coordinator-to-delegator connections and status messaging, the functional state engine drives components like process execution, functional messages, and data flow connections. Each of these state engines has some influence on the other through events or information passed between them. Each state contains an event handler defining what set of events will be processed, how the individual events are handled, and what if any new state changes are driven by the event. Users may include custom event handlers to define new or extended logic for the events processed by the vertex.

Figure 8B:
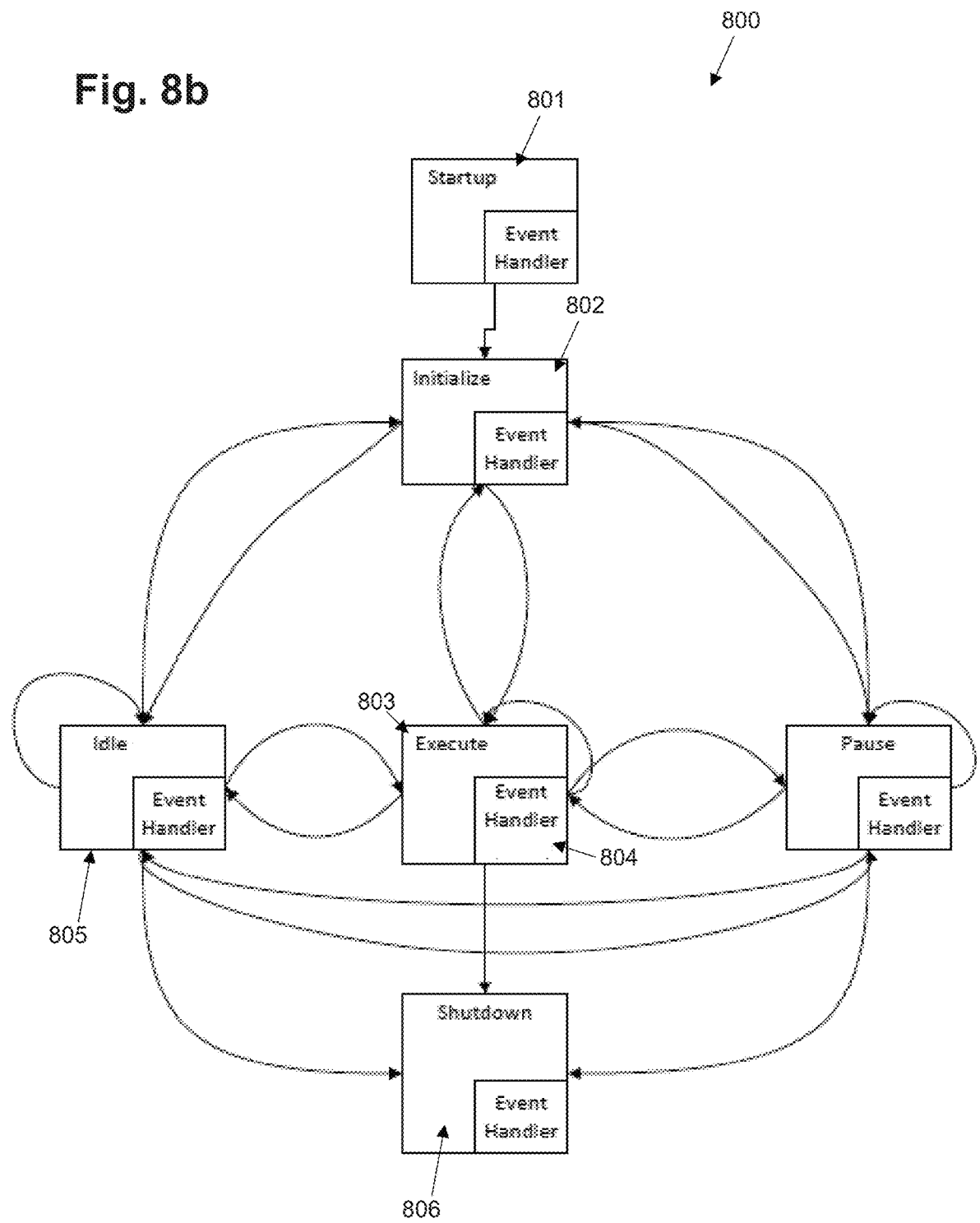
FIG. 8b is an exemplary graphical depiction of state machine running on a worker in functional space with a simplified subset of potential state changes and event handling in accordance with embodiments of the present disclosure.

FIG. 8b is a diagram 800 depicting a simplified subset of a possible state machine running on a worker in the functional space within the framework in accordance with embodiments of the present disclosure. In this example, the functional state engine exists on a generic worker doing some amount of processing. The structure and content as well as the programmatic logic that make up the state engine define its decision making and drive the resiliency of the worker itself. In this figure, we can see how a worker may progress from a startup state 801 where underlying functionality and the worker is provisioned, then to initialization state 802, where the vertex connects to endpoints on the foundational level and registers with the coordinator. When initialization is complete, the vertex transitions to the execute state 803, where it sends an event to the functional state engine in startup state. The functional state engine transitions to initialization state, where the functional layer creates and/or connects to functional endpoints, initializes its functional level process, responds to any foundational request events it receives, and transitions to executing. The foundational state engine, upon receiving the response from the functional state engine, updates its coordinator vertex with its. Note that each worker has an individual event handler driving these changes. If the worker, while in the execute state 803, were to lose connection with its subscription endpoint, this would generate an Event that is received by the event handler for that state 804. The event handler 804 controls the logic for any state transitions. In this example, the state attempts to recover from the error by reconnecting to the subscription endpoint, and if unsuccessful, may change to idle 805 after stopping the execution process. If successful, it generates a status event and remains in the execute state 803. Certain error events may transition the vertex to initialize state 802 again or to the shutdown state 806.

Embodiments of the framework according to the present disclosure use asynchronous, event-driven execution within and between the foundation and the Function of a vertex. When events occur and are sensed by the vertex, it may act upon or ignore the event depending upon its setup. Both the foundation and the Function operate independently with state engines brokering and managing the asynchronous response to events and behavior of vertex functions. Events occurring while the vertex is operating within a state will trigger either a state change to handle the event, processing of the event within the state, or ignoring the event within the state. Each state independently handles or ignores events from any other state, but this does not preclude states from sharing event handlers when appropriate.

Embodiments of the framework according to the present disclosure support event-driven execution for both externally requested events to a vertex, such as requests for changes by a user, or internally to a vertex. A vertex may spawn events internally based on its conditions, and thus change state in response to its own event. It can then pass on that event or event handler to neighboring vertices. Subsequently, neighboring vertices may or may not change state based on that external event, as discussed previously. This enables emergence of new behavior as vertices create their own events and triggering effects within the system.

Initial Discovery of delegators

Figure 9A:
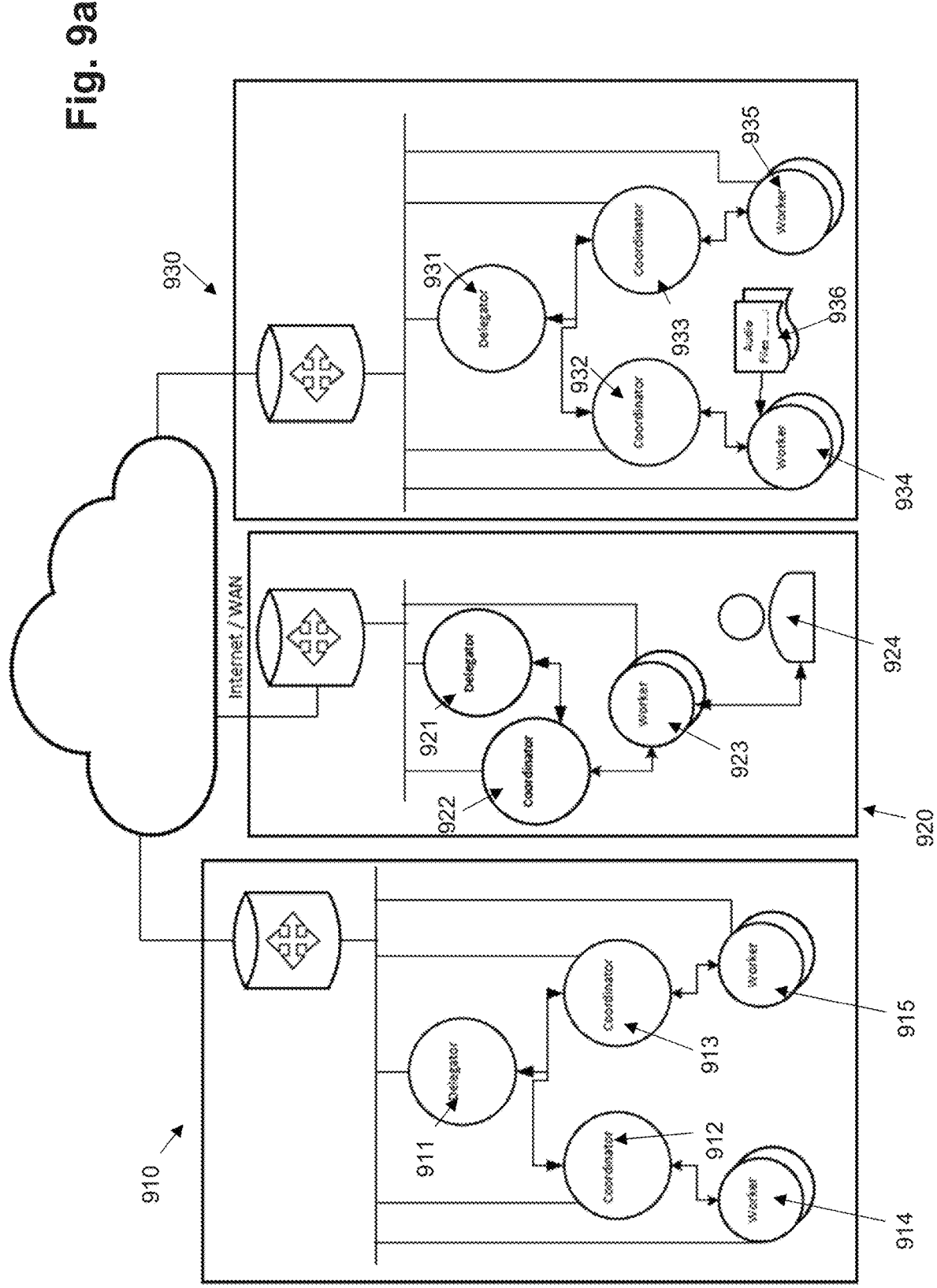
FIG. 9a is a graphical diagram illustrating a partial representation of a deployment of the framework across a typical traditional distributed infrastructure in accordance with embodiments of the present disclosure.

FIG. 9a is a graphical diagram illustrating a partial representation of a deployment of the framework across a typical traditional distributed infrastructure in accordance with embodiments of the present disclosure. The infrastructure includes connected servers (via internet or WAN) with each server loaded with a delegator, coordinator(s), and workers. The user representation illustrates the interactions and intent construction from a user-request as it propagates through adjacent delegators (and subsequent coordinators and workers). FIG. 9a can be used to explain a trivial example for initialization of the framework in accordance with embodiments of the present disclosure, which starts with a single delegator 911 installed on a node and connected to a network 910. Delegator 911 may or may not have initial conditions that may include one or more locations of near neighbors, credentials, intent, and self-management policy. A second delegator 921 is installed on another node and initialized with the location of the delegator 911. Delegator 921 will attempt to connect to delegator 911 and request additional data from delegator 911 including any known neighbors within the physical space. Delegator 911, according to self-management policy, can accept the credentials and assign delegator 921 a level of "trust", or ignore the connection attempt. If delegator 911 accepts the connection, it responds with a message containing its own credentials for delegator 921 and will include some level of capability information about its functional space executing on its node. Each delegator shares information according to local self-management policy with other neighbors. This is a trivial example of the discovery process of the framework in accordance with embodiments as described herein.

In this example, delegators generally only connect and maintain connections to other delegators determined to be nearest neighbors, and those with which they are actively exchanging messages. A delegator can receive an intent in one of several ways: 1) supplied with an intent at inception, 2) passed an intent by a user, or 3) passed an intent (or part of one) from its neighbors. The self-management policy, again, dictates when a given intent is accepted or rejected. Upon receipt of an intent, the delegator checks for an existing coordinator vertex to fulfill that intent, and if one does not exist, instantiates a coordinator to process that intent. The coordinator is generally local to the node where the delegator executes. Delegators perform the process of discovery across the infrastructure. Each delegator, when installed on the "physical" node (bare metal, virtual machine, container, etc.), begins with an initial configuration and inspects the system resources that are shareable with other delegators. The delegator maintains the health and status of the resulting list and constructs discovery messages to pass to one or two other delegators with minimal information. Each delegator, when installed, contains some configuration items supporting its execution life cycle. The discovery endpoint of a near neighbor is one item of this configuration. When a delegator discovers a new neighbor, it will attempt to measure latency in communication exchanges to determine if this new neighbor is nearer than one of its current nearest neighbors. The delegator attempts to maintain connections with two nearest neighbors and will automatically adjust based on the comings and goings of delegators. Additionally, the delegator will maintain a list of delegators with connection endpoints even though it may never connect to these. In this way, each delegator keeps an eventually consistent representation of the physical infrastructure. This process of finding, maintaining, and interacting with and between delegators is a significant enhancement because it does not require human interaction after the initial installation. Each delegator is designed to operate independently of each other and of human care and yet be able to discover shared needs to collaborate together to fulfill one or more intents.

Figure 10A:
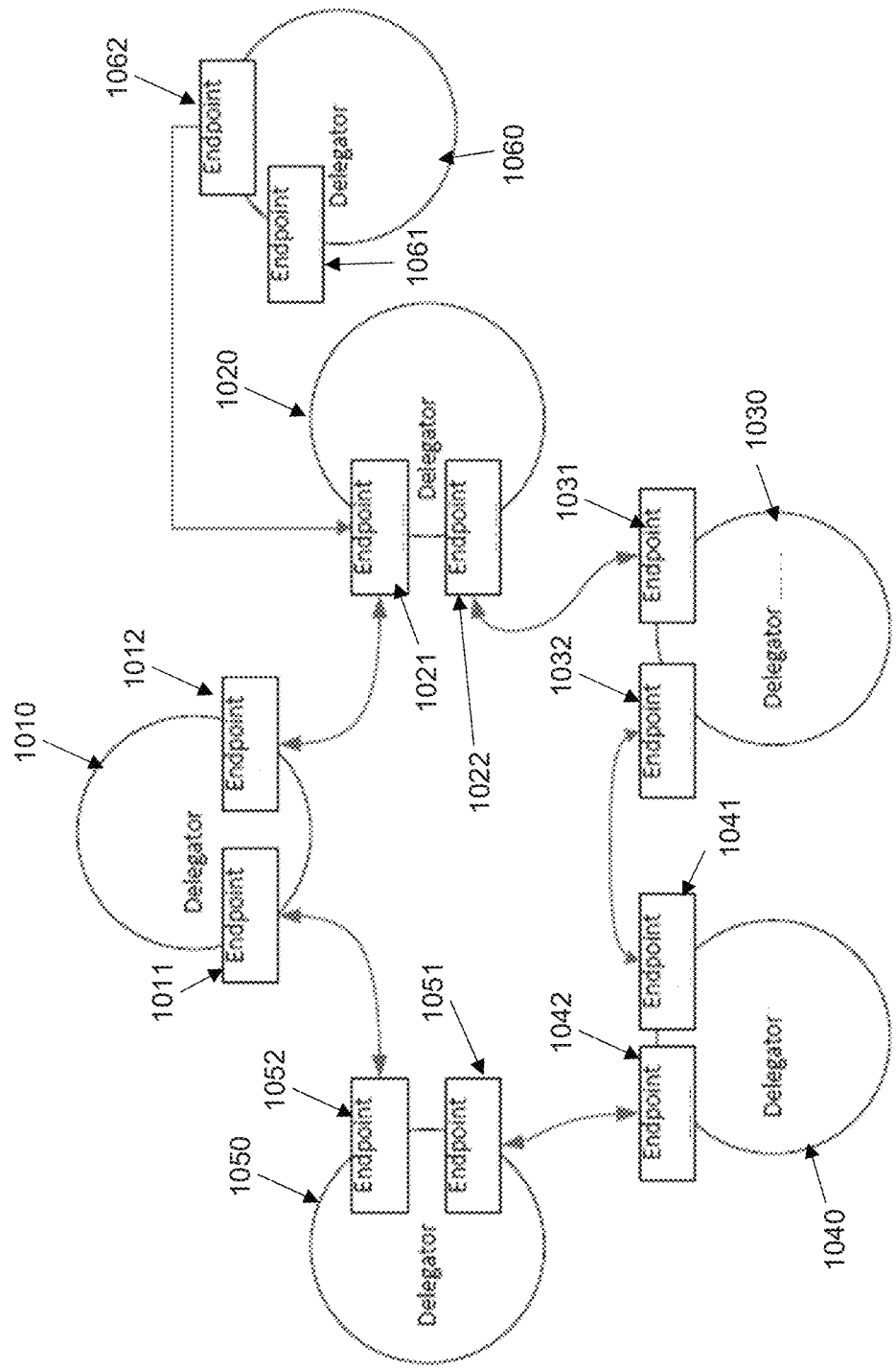
FIG. 10a is a graph illustrating a delegator discovery process and information exchange in physical space including the discovery of a neighboring delegator in accordance with embodiments of the present disclosure.

FIG. 10a depicts a discovery process in accordance with embodiments of the present disclosure, where a delegator installed with a configuration joins the existing physical space of connected delegators and exchanges discovery information. When a delegator begins execution, it initializes a client connection and a server connection bound to an available random ephemeral port. The server endpoint is the combination of the protocol type, the IP address, and the random port. Other delegators need to either discover the endpoint or have it provided in the configuration. The delegator provides this server endpoint in its health and status information; thus, a new installation of a delegator can be configured with this endpoint. The delegator determines the ephemeral port for itself so that it does not run into any port conflicts with established services. The server endpoint becomes part of the configuration that survives restarts. In the unlikely case where the previously established endpoint is no longer available upon restart, the delegator establishes a new endpoint with an available ephemeral port. The delegator will then attempt to reestablish connection to its nearest neighbors, whereby it will inform them of the endpoint change with a capability delta request message. The neighbor delegators will update their lists of delegator endpoints and connect to the new endpoint provided in the capability delta request message. In the highly unlikely and extreme case where all delegators restart coincidentally and experience an endpoint conflict, whereby each establishes a new server endpoint, then each will use unicast discovery on a modified version of the previous endpoint. This protocol is only used in cases where one or more delegators do not have any viable configured or established neighbor server endpoints and no established physical neighborhood list. Discovery server endpoints, therefore, are not well known nor predefined and provide a first level minimum security challenge by hiding the endpoint. The server endpoint also follows a distributed, decentralized, zero knowledge proof protocol to establish trust and signs messages with its private key. delegator public keys can be shared through the discovery process or through pre-configuration. Zero knowledge proofs enhance the protocol with an ability to generate a computational result while keeping all the inputs to the function private.

As shown in FIG. 10a, delegator 1060 begins the discovery process by first connecting to the server endpoint 1021 of its configuration neighbor delegator 1020. Delegator 1060 initiates the trust protocol exchange by sending a message containing its universally unique identifier (UUID) and the result of a computation signed by its private key. Delegator 1020 may not know the private key of delegator 1060 so it cannot validate the key. Therefore, delegator 1020 challenges delegator 1060 with a message asking for another result and its public key signed with its private key. delegator 1020 queries its neighbors, delegator 1010 and delegator 1030 for the public key of the UUID of delegator 1020. Delegator 1010 or delegator 1030 may respond in the negative or the positive. If one responds in the positive the public key is included in the response and delegator 1020 may validate the digital signature from this key. Additionally, delegator 1020 validates the first computational result. If the digital signature or first computational result is invalid delegator 1060 is not trusted. If both are valid and delegator 1060 returns another valid computational result signed with a valid private key, then delegator 1060 is trusted for a minimal time period. delegator 1020 will continue to challenge delegator 1060 with periodic requests for zero knowledge proof results for as long as delegator 1060 is connected to its server endpoint. Once trust is established, delegator 1020 and delegator 1060 exchange encrypted collection of secret seed values for follow-on challenges. These are used for the current connection session of challenge-proof cycles between the two delegators. Delegator 1020 has already established the same protocol with challenge-proof cycles with delegator 1010 and delegator 1030.

During the public key search phase, delegator 1010 or delegator 1030 could query its other nearest neighbor for the public key of the UUID of delegator 1060 if it had a negative response. The process could continue until all delegators were queried if their configuration items provided for the queries. This configuration item acts like transmission control protocol (TCP) time-to-live (TTL) values, where the value is decremented on each successive query and stops when the value drops to zero (0). A value of negative one (−1) ensures the queries continue to all connected delegators. Because the protocol is asynchronous, no delegator is waiting for a response, and each will respond in the positive or negative. A delegator that extends the query through the TTL value will act on the responses when they arrive. Therefore, when delegator 1010 queries delegator 1050, it does not respond to delegator 1020 until it gets a response from delegator 1050. In the case where delegator 1030 also extends the query to delegator 1040, which in turn extends the query to delegator 1050, delegator 1050 will respond to both queries according to its knowledge and will stop extending the query because it received the same query from both of its nearest neighbors.

Figure 10B:
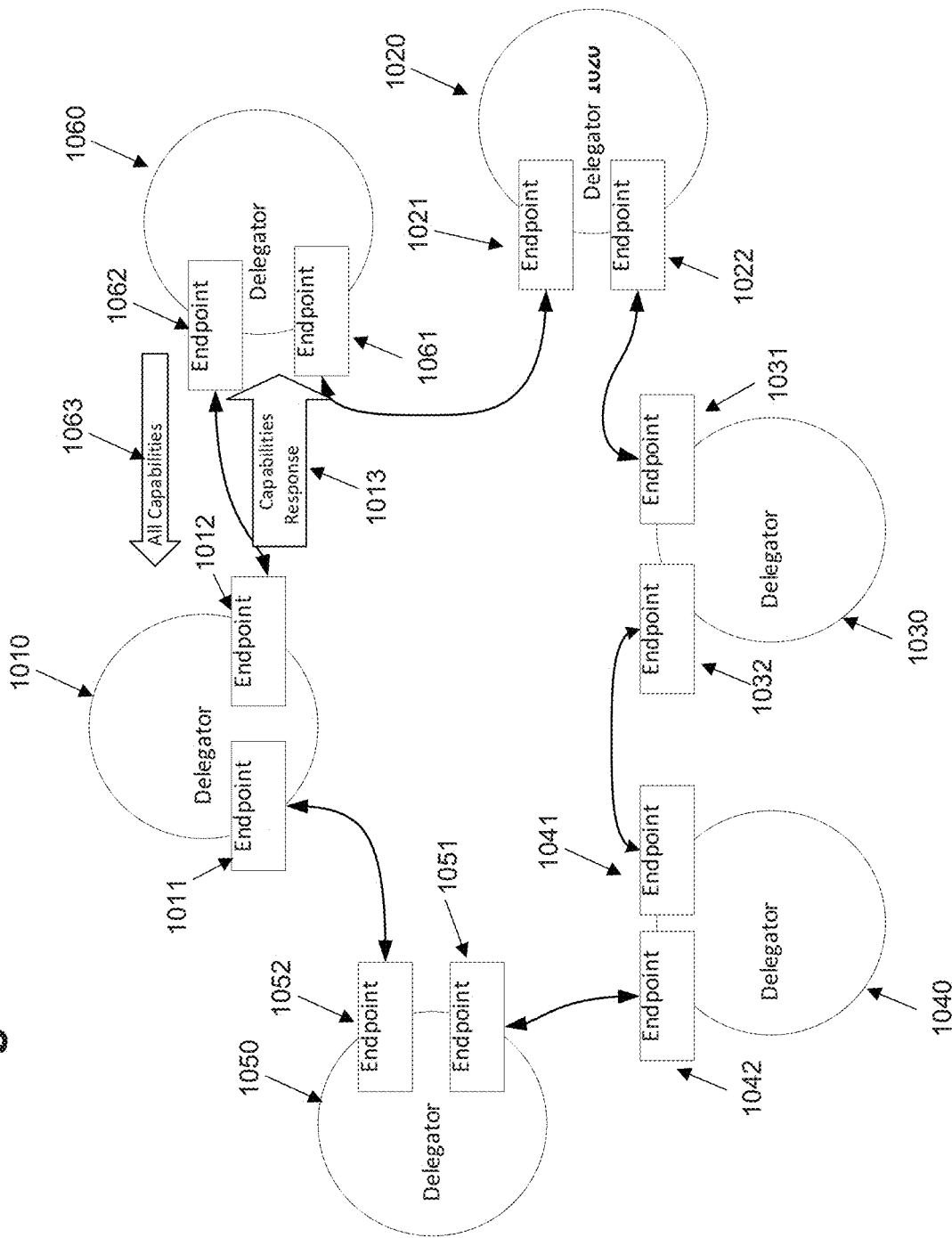
FIG. 10b is a graph illustrating a delegator discovery process and information exchange in the physical space including the neighborhood being updated by the recent discovery of a delegator and requesting the neighborhood's registered capabilities in accordance with embodiments of the present disclosure.

Delegator 1020 challenges delegator 1060 to prove it is a member of the neighborhood. Delegator 1060 responds with proof that delegator 1020 validates before sharing any information with delegator 1060. Both delegator 1020 and delegator 1060 compute latency values for communication exchange. Delegator 1020 determines that the latency of delegator 1060 is either less than or equal to a threshold or above the threshold. If above the threshold, delegator 1020 will reject the join and supply a list of known delegators within a request of delegator 1060 to perform discovery ping latency checks. Delegator 1060 will ping the delegators on the list and choose the first one where the latency is less than or equal to the configuration threshold or choose the lowest if all are greater than the threshold. When the latency check is adequate, delegator 1020 accepts the join request by dropping one of its two nearest neighbors and joining with delegator 1060. This is accomplished through a shifting protocol. Delegator 1020 sends a connection request containing the server endpoint 1012 of delegator 1010 to delegator 1060. Delegator 1060 connects to the server endpoint of delegator 1010 and proves it belongs to the neighborhood with an abbreviated trust protocol exchange. The trust exchange leverages the established trust between delegator 1020 and delegator 1010 and results in a much quicker exchange without involving any other delegators outside the trio. Once trust is established, delegator 1010 and delegator 1060 exchange encrypted collection of secret seed values for follow-on challenges. Delegator 1060 responds to the connection request from delegator 1020 in the affirmative and delegator 1020 terminates its connection to delegator 1010. FIG. 10*b* shows the resulting shape in physical space once delegator 1060 has completely joined the neighborhood.

Delegator 1060 begins the configuration update phase of the discovery process by sending a request to one of its nearest neighbors for a full list of known configuration capabilities of the neighborhood. Because delegator 1060 is now part of the neighborhood it will begin to receive configuration capabilities 1013 delta requests containing information concerning changes in the neighborhood. The content of these requests and the response to the full list request follow the same structure that is a key-value pairing of capabilities. The key is a UUID indicating the type of capability and the value is a collection of one or more capability structures associated with the type. This provides an extensible capability message protocol allowing new capabilities to establish a UUID key and a type structure for the capability. Additionally, delegators that do not recognize the UUID key may ignore the capability provided. This provides interoperability between delegators of various versions within the neighborhood. Software updates to delegators will provide the latest UUID-to-capability pairings and processing. However, the neighborhood can continue to operate without enforcing version compliance.

Figure 10C:
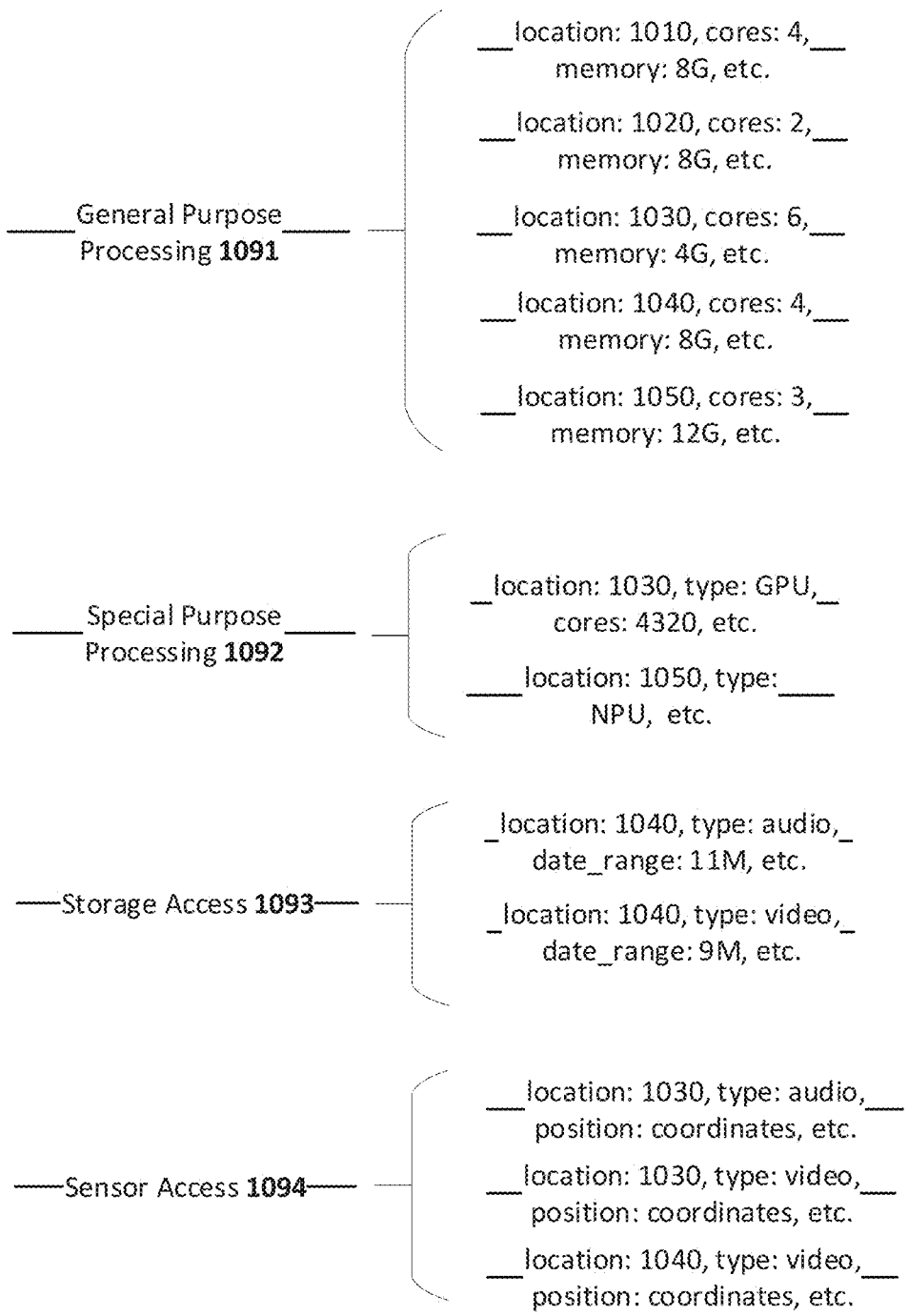
FIG. 10c is a diagram illustrating an exemplary response structure and details of the discovery process between delegators of FIGS. 10a and 10b in accordance with embodiments of the present disclosure.

FIG. 10*b* shows delegator 1060 sending a request 1063 for a full list of know configuration capabilities of the neighborhood from delegator 1010. Delegator 1010 sends a response 1013 with its current knowledge of the capabilities of the neighborhood. FIG. 10*c* depicts the contents of the response with key type identifiers (UID) for General Purpose Processing, Special Purpose Processing, Storage Access, and Sensor Access. General Purpose Processing 1091 contains five entries providing some minimal attributes of each processor. Special Purpose Processing 1092 contains two entries providing some minimal attributes of a graphical processing unit (GPU) and some minimal attributes of a neural processing unit (NPU). Storage Access 1093 contains two entries providing some minimal attributes of audio files and some minimal attributes of video files. Sensor Access 1094 contains three entries providing some minimal attributes of one video source, some minimal attributes of another video source, and some minimal attributes of one audio source.

Unicast Discovery

Unicast discovery is possible because each delegator establishes an asynchronous service listening for discovery introduction messages. Unicast discovery is triggered by a delegator when it has no viable neighbor server endpoints in its configuration, an empty neighborhood list, and no established neighbor server endpoints that are viable. A nonempty neighborhood list could exist from a previous execution cycle of the delegator. In this case, the delegator will iterate through the list attempting to establish connection with at least one other delegator in the neighborhood. Any successful connection will populate a new neighborhood list. However, when the delegator exhausts the list without finding another delegator in the neighborhood, the new neighborhood list remains empty. When these three conditions occur—empty neighbor server endpoint configuration, empty neighborhood list, empty established neighbor server endpoints—then the delegator initiates the unicast discovery.

The unicast discovery leverages both an asynchronous user datagram protocol (UDP) server bound to an ephemeral port and an asynchronous UDP client that will probe the list of configured or previously known network addresses of possible delegators in the neighborhood. The client methodically sends discovery introduction request messages to the endpoint addresses starting with the highest ephemeral port. All discovery introduction response messages return to the source endpoint of the request, which is the network address and port of the delegator's UDP server. The discovery introduction response content can easily be checked to determine its validity. When the UDP server receives valid discovery introduction responses, the neighborhood delegator endpoints are appended to the neighborhood list, which triggers self-management event processing of the delegator to begin the standard discovery process to connect to nearest neighbors.

Intent and Shape

Intent is the purpose (or intention) of a vertex or collection; intentions are defined, contextually bounded, compute resource group representations supporting solving a problem (or part of one). intent can be represented in a programmatic structure for deployment across the infrastructure. It is an object representation structure that can be serialized into JavaScript Object Notation (JSON) or Yet Another Markup Language (YAML) format. The processes of breaking down requirements or solution descriptions into one or more intent representations or constructing one or more intent representations from known functional components results in one or more object representation structures. Therefore, deployment of intent across the infrastructure is a matter of distributing serialized versions of the object representation structures to the coordinator vertices managing and monitoring worker vertices executing their part of the structure. These structures are lightweight packages detailing minimum information for a coordinator vertex to instantiate the structure across a finite set of worker vertices (collection). The structure typically is less than 256 bytes and easily fits in a single layer 3 TCP/IP packet.

Figure 9B:
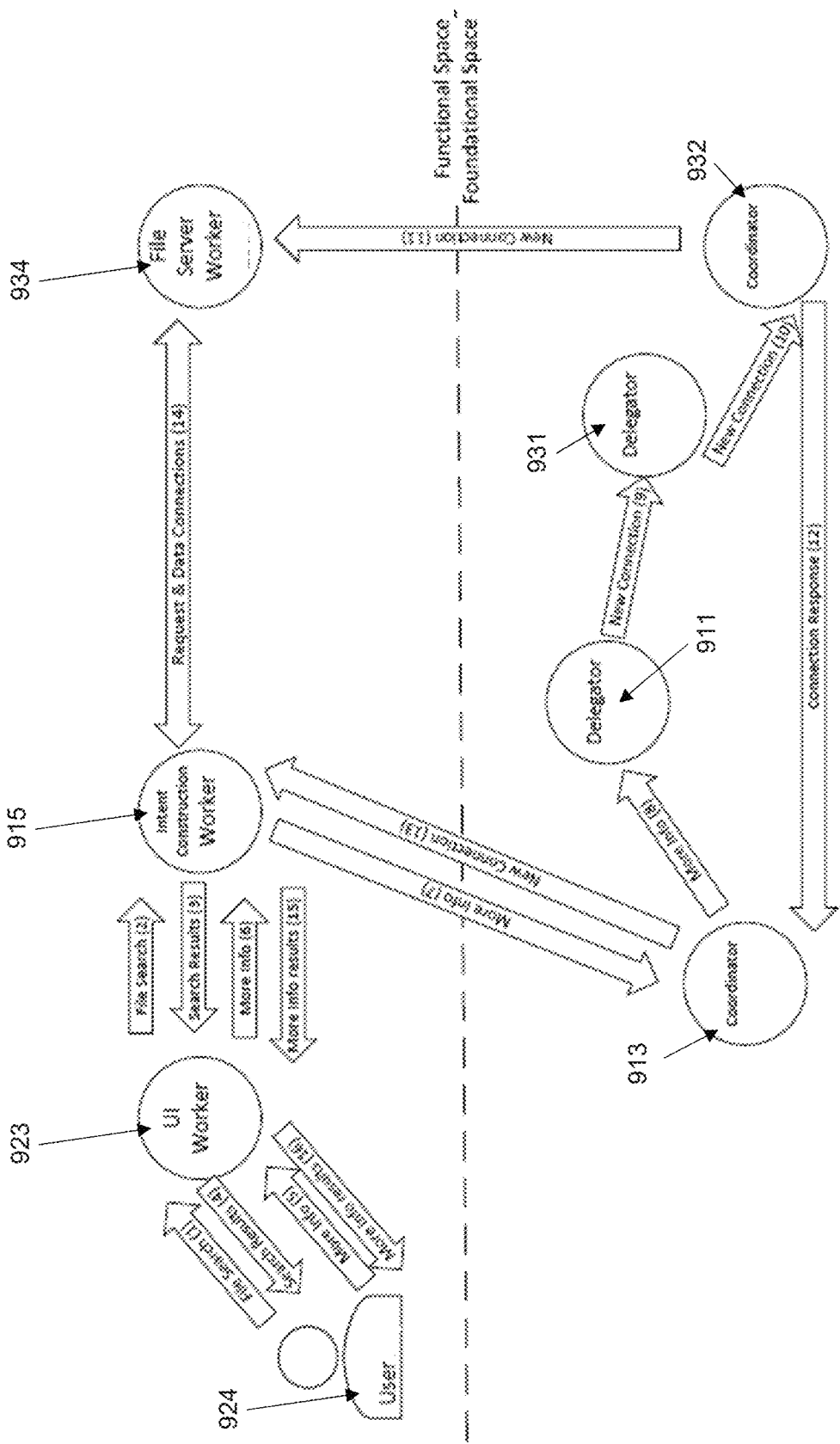
FIG. 9b is a graphical diagram illustrating interactions and messages involved in file discovery when a user makes a request within the framework in accordance with embodiments of the present disclosure.
Figure 9C:
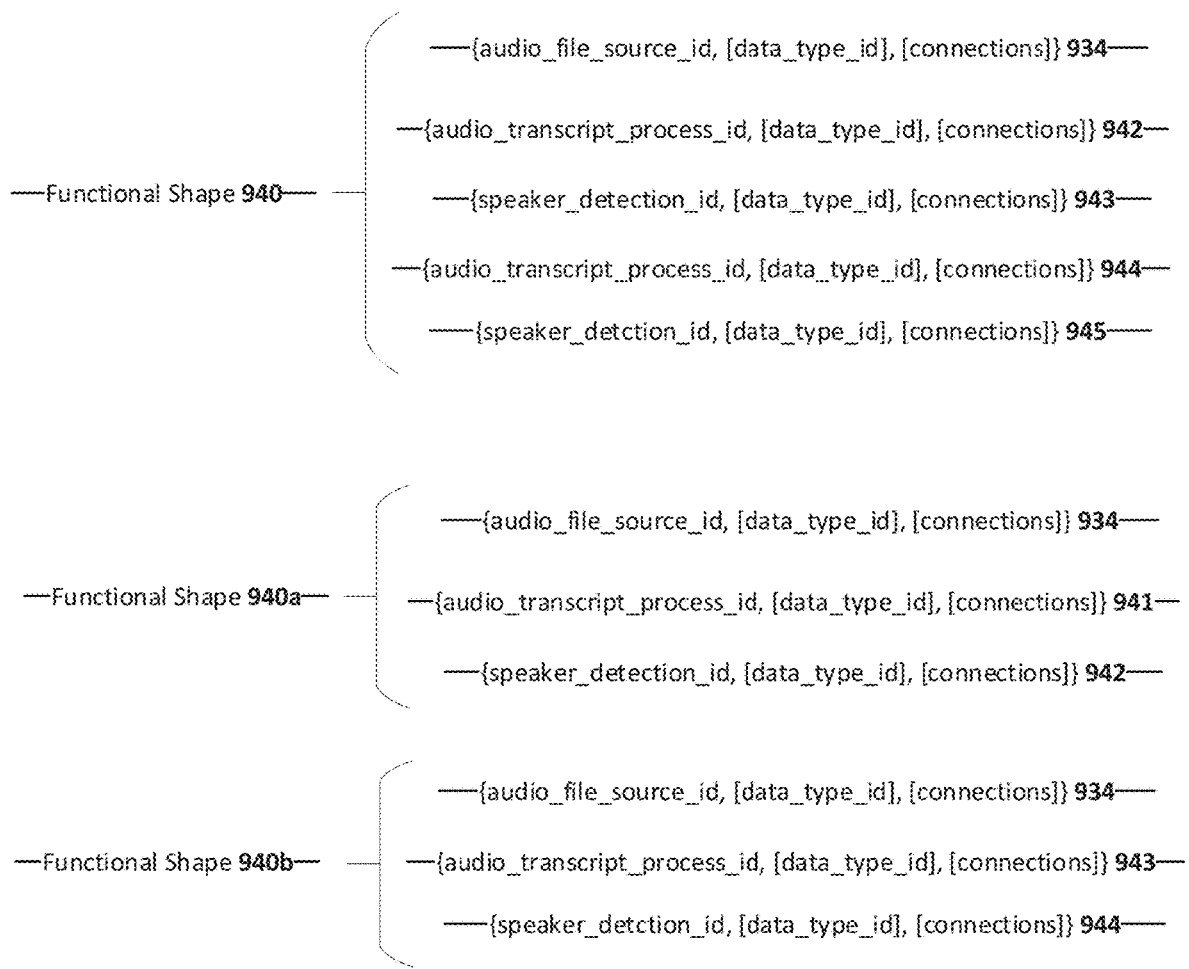
FIG. 9c is an exemplary diagram showing a resulting functional shape from intent Construction based on a sample user request in FIG. 9b in accordance with embodiments of the present disclosure.
Figure 9D:
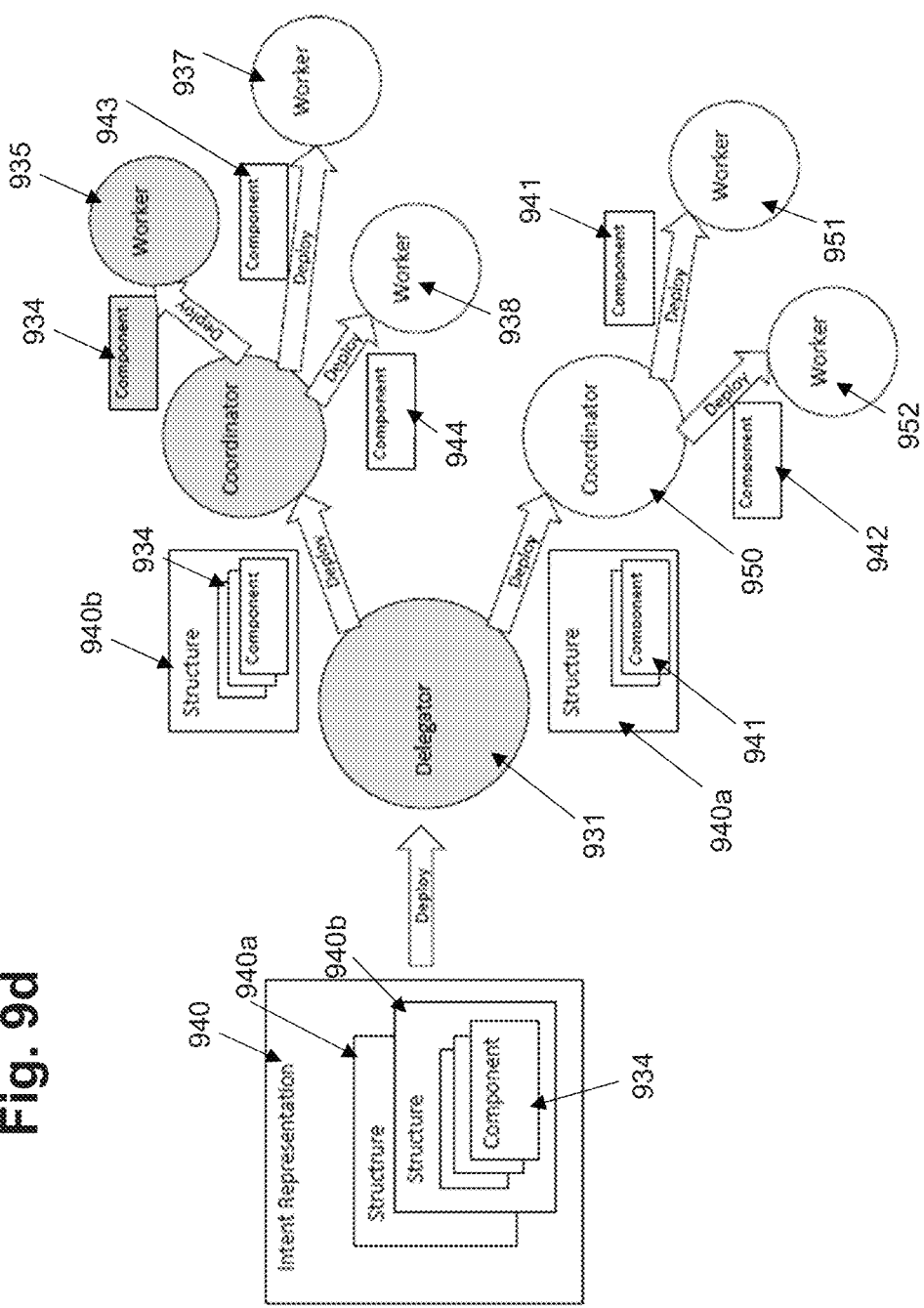
FIG. 9d is a graphical diagram illustrating deployment of the functional shape from FIG. 9c in accordance with embodiments of the present disclosure.

FIG. 9d depicts a typical deployment of intent in accordance with the present disclosure. This is an illustration of intent deployment and outlines the relationship between the structural groups and functional components as deployed across a pair of coordinators managed by a single delegator. Note the specific relationship between structural groups and coordinators and functional components and workers are one to one, respectively. The intent representation 940 consists of two structural groups 940a, 940b for deployment by a delegator vertex to two coordinator vertices, one for each structural group. The number of coordinator vertices is directly proportional to the number of structural groups. Each structure consists of one or more functional component representations. Structure 940b has three functional components 934, 943, 944 and structure 940a has two functional components 941, 942. Delegator 931 accepts a request to deploy intent representation 940. Because intent representation 940 contains two structures 940a, 940b, delegator 931 instantiates coordinator 950 and leverages existing coordinator 932 (preexisting vertices are noted in FIG. 9d by the grey shading). Delegator 931 deploys structure 940b to coordinator 932 and structure 940a to coordinator 950. Structure 940b contains three functional components 934, 943, 944, so coordinator 932 instantiates two workers 937, 938 and leverages existing worker 935. Structure 940a contains two functional components 941, 942, so coordinator 950 instantiates two workers 951, 952. Each worker instantiates its functional component to begin executing upon data flowing as defined in intent representation 940. Shape is the geometry of the interconnections of functional components executing on workers, processing data flow, and supporting requirements that are driving intent.

Intent drives shape directly in functional space and indirectly in physical space by encapsulating the purpose of the solution's resources sourcing, processing, and storing of data in a deployable representation. Each node in physical space operating on the solution plays a role to fulfill the intent, including sourcing data, inferring metadata, processing data or metadata, storing data, sharing data, and analyzing data. More generally, intent is the response to a user's solution description, need or requirement, or exploratory request, and the resulting intent representation with one or more sets of functional components becomes ubiquitous and sharable, reducing the time spent developing new or repeated capabilities. While intent is more of an attribute of functional space, it impacts foundational space through the required supporting resources in the collection of foundational vertices. Therefore, intent is best understood in the context of functional space, where it encapsulates the functional purpose of the collection of vertices and the compute nodes that fulfill various roles within the larger deployed framework in accordance with embodiments of the present disclosure. Intent representation within the framework is the result of either defining and combining functional components (tasks) together into sets describing a functional shape that is based on available resources, or it is the result of breaking down requirements or solution descriptions into sets of declarative statements that translate into sets of functional components (tasks) describing a functional shape. In both cases, the resulting representational structure becomes available to deploy across the infrastructure.

Constructing intent from known functional components for deployment may be done manually or automatically and provides a consistent solution structure giving a user the ability to quickly experiment and iterate over the design, implement, deploy, test aspects of the system development life cycle (SDLC). Once the user has the first iteration, he/she will tweak the intent and modify any initial conditions. Intent construction begins after the framework is deployed across an infrastructure. A user begins developing an intent structure using the available resources reported through the discovery process. Intent construction is a special function available as part of the framework executing in functional space on a worker vertex that is set aside for this purpose. For example, an intent construction function that is executing on a worker vertex subscribes to the discovery information from its local delegator vertex. It uses this information to bound the scope of what a user can request from the system. Thus, processing audio or video from sensors or files requires the input to be available and discoverable. Therefore, a user cannot ask anything of the system that is not already "known" across the distributed system. Because the framework provides eventual consistency, the delegator vertex publishes deltas as changes occur thus keeping the intent construction worker vertex updated with current available resources from the discovery information. In this way, the initial conditions readily emerge, and a user could automatically obtain more specific information from the framework in accordance with embodiments of the present disclosure.

FIG. 9a shows a framework deployment across distributed infrastructure of three physical space nodes 910, 920, and 930, where each node contains a delegator vertex, a set of coordinator vertices associated with the respective delegator vertices, and each coordinator manages respective collections of worker vertices. This figure depicts the foundational space of the deployment environment with worker vertices operating in functional space to illustrate intent construction of the functional space described above. A user 924 constructs an intent via a user interface (UI) executing on worker 923 interacting with intent construction worker 915 to access and process audio files 936 accessible to worker 935 stored within node 930. During a previous discovery process, delegator 931 indicated to delegators 911, 921 that its node has access to audio files 936; delegator 911 indicated to delegators 921, 931 that its node supports intent construction; and delegator 921 indicated to delegators 911, 931 that its node supported UI for intent construction. Additionally, worker 915 previously entered functional space and began executing the intent construction function, and worker 923 also entered functional space and began executing the intent construction UI to interface with users 924. During the previous framework deployment, physical and functional space establishment, and discovery process, the vertices involved follow framework choreography. The figure shows functional space initialization, where worker 915 registers with coordinator 913 its capability as an intent construction function. Coordinator 913 requests access to the discovery data on behalf of worker 915 from delegator 911. As part of the request, coordinator 913 provides delegator 911 with the UUID of worker 915. Delegator 911 responds with the local network data publish endpoint and an index into a computational one-time password (OTP) that worker 915 must use to compute the OTP result. However, delegator 911 does not start publishing discovery data until at least one worker connects to the endpoint and subscribes to the data using the OTP result. Coordinator 913 sends a registration response/update with the information delegator 911 provided to worker 915. Worker 915 computes the OTP result, connects to the endpoint indicated in the message from coordinator 913, and subscribes to the OTP result topic established by delegator 911. Worker 915 connection and subscription is the catalyst for delegator 911 to start publishing discovery data. Worker 915 also sends a status update message to coordinator 913 indicating that it is connected to the endpoint. This causes coordinator 913 to send a request to delegator 911 to publish once, on the OTP result topic, the complete set of discovery data, otherwise worker 915 will only receive delta events. A similar process occurs that registers the constructed functional shape and discovers the audio files 936 via coordinator 932 and delegator 931. At this point, all workers are registered, and the discovery protocol has resulted in each node instantiating functional shapes and sharing their capabilities.

Continuing with this example and FIG. 9a, per given requirements, User 924 begins to construct an intent to translate audio files into textual transcripts and identify each speaker using known functional capabilities. To create a new intent for deployment, User 924 connects to worker 915 through the framework intent construction UI executing on worker 923. User 924 selects, within the UI of worker 923, an audio source functional component designed to read files, a speech to text processor functional component, and a functional component inference model to separate text into each speaker. The worker vertices for audio translation and speaker identification are not yet instantiated in FIG. 9a because the intent change is not fully constructed and deployed.

FIG. 9b is a graphical diagram illustrating interactions and messages involved in file discovery when a user makes a request within the framework in accordance with embodiments of the present disclosure. In this scenario, the choreography protocol applies a morphology to the geometry of the functional shape in response to the user's request. FIG. 9b also shows the interactions between the functional space and the foundational space and the choreographed protocol to apply a morphological geometric change to functional shape per user requests. User 924 searches for audio files (1) through the UI of worker 923 causing worker 923 to send a request event (2) to worker (915) for this data. Worker 915 indicates there are audio files available on the framework infrastructure in a response event (3), which contains the relevant information of the files. The location of the files is not included in the response because data location is distributed and irrelevant in most cases. Worker 923 presents the search results (4) to User 924. User 924 selects a set of files and requests more information (5) on them through the UI of worker 923. Worker 923 sends a request event for more information (6) to worker 915, which requests (7) coordinator 913 to find out more information (dates, names, storage reason, content summary, etc.) about the files. This request event (8) is forwarded to delegator 911 to establish a connection (14) between worker 915 and worker 935 (the worker with access to the audio files). This request is forwarded through a request event (9) to delegator 931, which forwards it (10) to coordinator 932. Coordinator 932 informs worker 935 with a request event (11) of the impending connection request from worker 915 and sends a response (12) to coordinator 913 based on the endpoint information contained in (10). Coordinator 913 sends an update registration request (13) to worker 915 with the endpoint information to connect to worker 935. Worker 915 connects to worker 935 and sends the information (15) to worker 923 once it has the information from worker 935. Worker 923 presents the information (16) from worker 935 to User 924. From this information, user 924 can establish and initialize the intent with a set of files to process. As part of choreography and self-management, the connection (14) between worker 915 and worker 935 persists until one or both determine the connection is no longer required.

User 924 now has constructed a representation of intent that can be deployed and instantiated as a new functional shape that will translate audio files into textual data and identify the speakers within the files. This representation is shown in FIG. 9c, where functional shape 940 is the resulting representation provided by the UI on worker 923. FIG. 9d shows the deployment of functional shape 940 to delegator 931. Delegator 931, during the deployment cycle, reorganizes the functional shape into two functional shapes 940a, 940b. Delegator 931 deploys functional shape 940b to coordinator 932 and starts a new coordinator 950 with functional shape 940a. Coordinator 950 does not start a new audio file source worker vertex 935 because it already exists (preexisting vertices are noted in FIG. 9d with grey shading). Coordinator 950 instead ensures that worker vertex 951 knows how to subscribe to the files provided by 935. Coordinator 950 starts worker vertex 951 and deploys functional component 941, and it starts worker vertex 952 and deploys functional component 942. Coordinator 932 starts two new worker vertices 937, 938 and deploys functional components 943, 944 respectively. The connections defined in functional shapes 940a, 940b provide the configuration parameters that each worker vertex will need to establish the data flow to fulfill the constructed intent.

Figure 11:
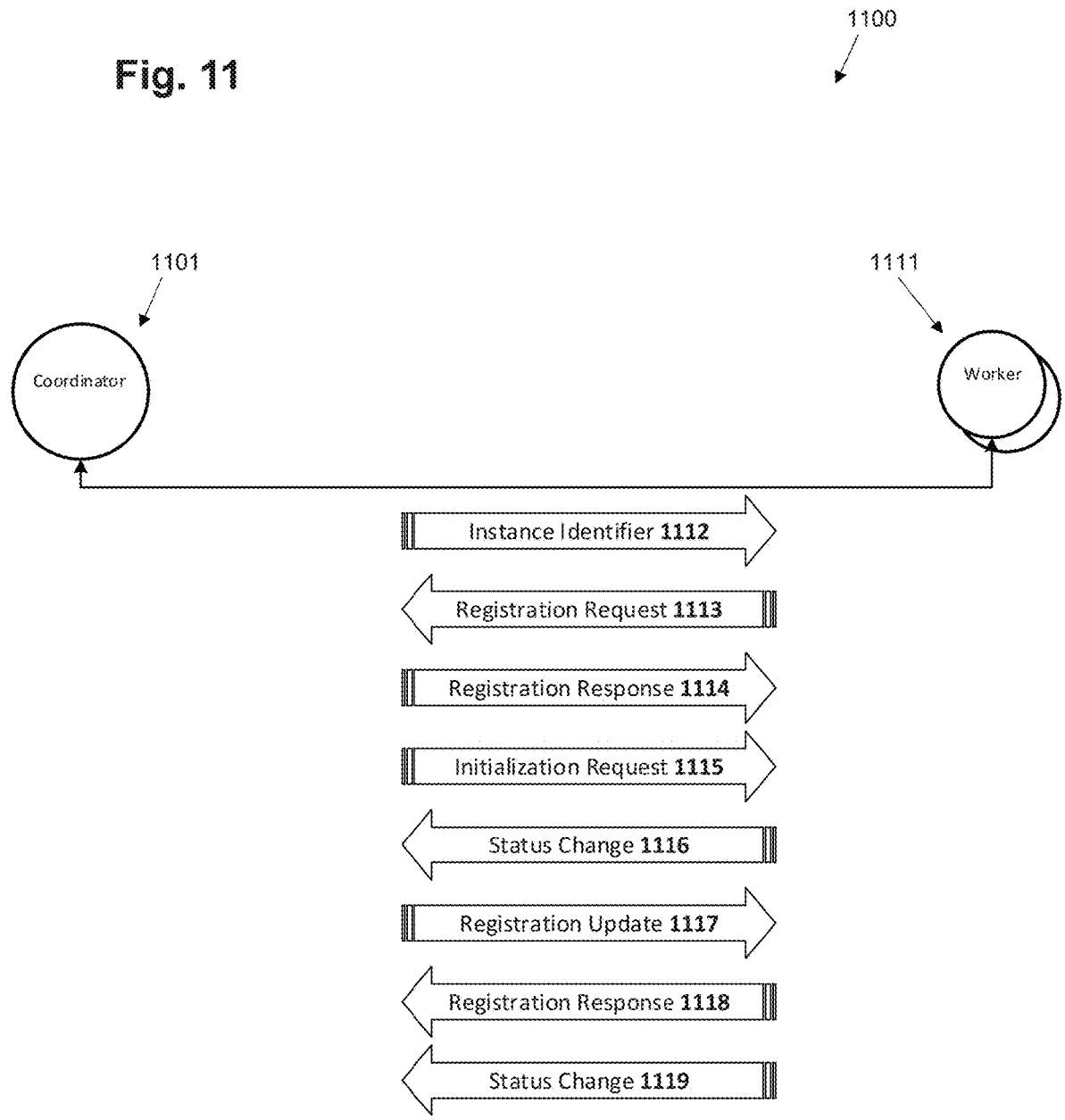
FIG. 11 is a graphical illustration of an intent construction for a specific function in accordance with embodiments of the present disclosure.

As described above, deployment of a constructed intent requires function instantiation, function initialization, and data flow connections. FIG. 11 depicts this process in diagram 1100 wherein the flow of messaging for creating and registering a functional worker with its associated coordinator is outlined. Function instantiation begins with worker 1111 receiving a function identifier message 1112 referring to object library instance that worker 1111 will instantiate and schedule its execution. Once worker 1111 has instantiated the identified function, it sends a registration request event 1113 to register its capabilities with its coordinator 1101 then waits for a registration response event 1114 and a function initialization request event 1115. Coordinator 1101 sends a function initialization request event 1115 with the function initialization information that is consumed by the instantiated function. Worker 1111 sends a status change event 1116 to coordinator 1101 indicating the function is initialized. The resulting intent construction structure representing the deployed intent is saved by worker 923 and becomes part of the distributed storage available across the infrastructure. The knowledge of this new intent structure can now be discovered by other users operating within the infrastructure. Therefore, user 924 may query and filter for other intent structures through the UI operating on worker 923 and incorporate them into the larger intent he/she is creating.

Because events and event processing are asynchronous and data flow endpoints are not necessarily known at time of registration or initialization, registration update request events are used to provide this required data flow information. Coordinator 1101 consumes registration request events 1113 from each worker and responds with registration response events 1114 to each worker. The response may contain updated information that the worker needs to complete its functional instantiation by connecting to any requested endpoints to consume data for processing. When worker 1111 needs more information from coordinator 1101 or when a data flow endpoint changes, coordinator 1101 sends a registration update request event 1117 to worker 1111. Worker 1111 consumes the event and responds with a registration response event 1118. When worker 1111 has established connections to all endpoints requested, it sends a status change event 1119 to coordinator 1101 indicating it is ready to process data on the subscription endpoints. Once all workers have achieved this state, the intent is deployed and is declared ready for processing data. Overtime, the endpoints may change as new workers start or some workers stop. Coordinator 1101 maintains the status of each worker, so when a new worker starts or a worker stops, coordinator 1101 updates any affected workers with new data connection endpoints using registration update request events 1117.

Figure 12:
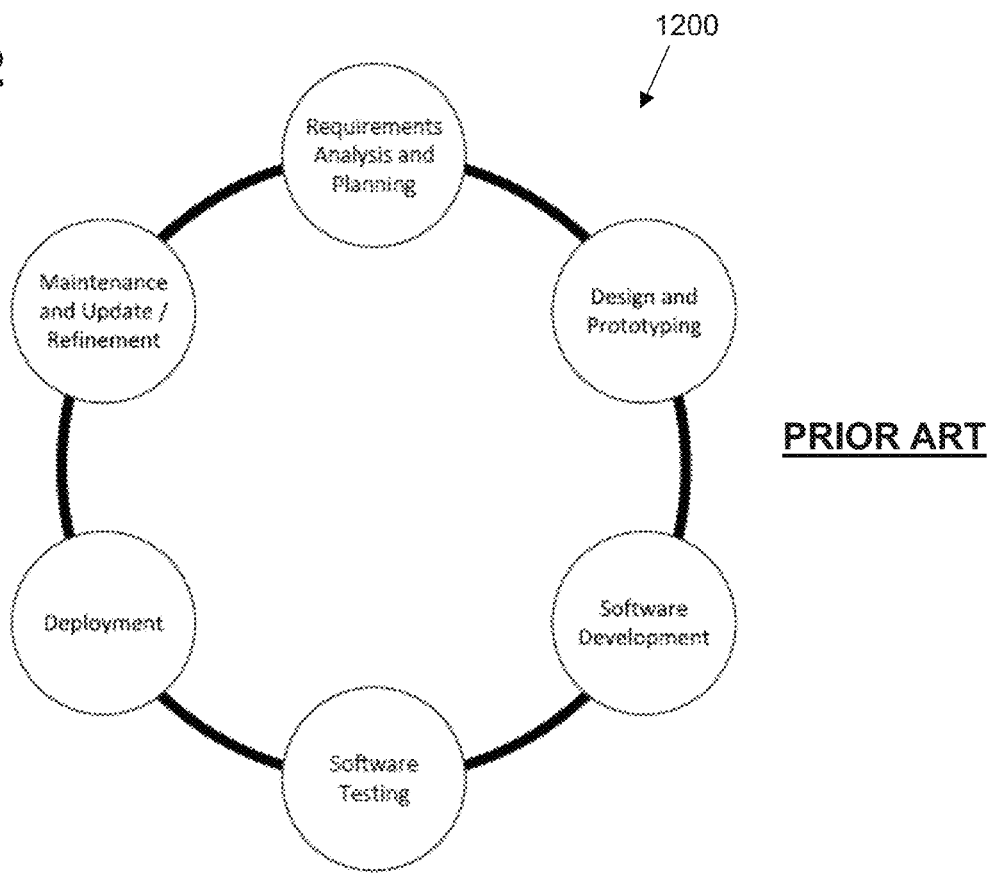
FIG. 12 is a diagram illustrating the traditional solution construction process in the prior art following the standard system development lifecycle.
Figure 13:
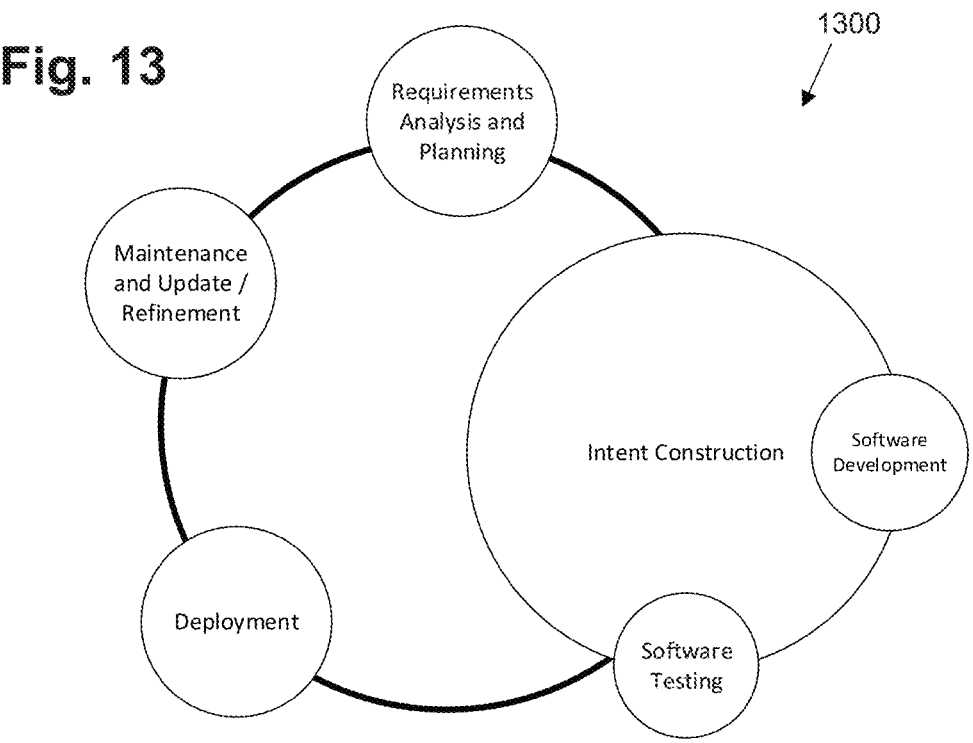
FIG. 13 is a diagram showing the phases of the standard system development lifecycle where intent construction adds automation in accordance with embodiments of the present disclosure.

Automatic intent construction is a novel approach to breaking down a proposed solution to a problem and deploying it across distributed computational instances. The approach process takes the problem described in English declarative text, intent description, as input and produces the same structure representing the deployment mapping across a computational infrastructure as described above. This is materially different from traditional solution construction following standard system development life cycle (SDLC), where requirements are turned into a design and prototype then developed into software implementation, tested and deployed on infrastructure, and finally updated based on execution feedback (see diagram 1200 in FIG. 12). Intent deconstruction in accordance with the present disclosure automates the design, implementation, and testing phases of SDLC (see diagram 1300 in FIG. 13). Our intent processor breaks down the declarative text distilled from the requirements process or solution description into succinct portions and then transforms these into a representation of one or more sets of one or more functional components. Choreography uses the resulting structure representing functional shape to deploy the solution in functional space as execution layers across one or more vertices. Thus, the process translates natural language solution and/or requirement description into intent representations for deployment across one or more execution instances creating a computational representation of the proposed solution. The output of the process defines the relationship between the functional layers of each vertex and the collection of vertices with which it operates including all data flow specifics. This essentially automates the design and prototyping phase, reduces, or eliminates the software development and testing phases, and reduces the time to deployment, where more effort can be focused on improving the solution through iterations of improving requirements or solution description.

Automatic intent construction cannot start the process of solution creation, provision, and iteration without first knowing what is available to propose. The intent description uses elements from the information discovered by choreography as a list of possibilities. A user turns requirements or solution descriptions into a series of statements that follow a triple structure: (1) a declaration or implication of one or more data inputs, (2) a declaration or implication of one or more data outputs, and (3) an action to perform. The intent processor uses these to search across delegators and a catalog of known functional components for possible components matching the requirements. The construction process gathers candidate functional components that match the search and constructs one or more possible representations of the requirements or solution description. In the case where gaps exist because no specific functional components could be found to match the search, the process defaults to a generic functional component. These generic functional components for each of the three worker types (data source, data processor, data sink) each have a generic implementation that supports passing data from upstream functional components to downstream functional components. In this way, the intent representation can be deployed and iterated over. Additionally, the generic functional components provide software application programming interfaces (APIs) to add custom functionality. This feature supports the iterative nature of refining the solution through SDLC. Ultimately, the user may be presented with several representations resulting from the construction process and may select one or more of them to produce the intent structures of functional components for choreography to deploy across the distributed infrastructure.

A functional component is the portion of the intent that has been divided out and translated into known functions to be distributed to a vertex. The intent processor decomposes one or more complete declarative sentences with possible modifiers describing a solution for execution with inputs and outputs into one or more collections of executable objects operating to fulfill the solution. For example, consider a solution description of, "Create a transcript of the conversation and process it to estimate the sentiment of the individuals and produce a report of likely negotiation points." This statement describes the "what" to do, while the intent processor provides for the underlying assumptions of the description to turn it into an intent representation, e.g., 'conversation' is audio input from a file or a stream; 'process' [the transcript] assumes a method of work that is suitable for producing outputs related to sentiment for negotiation. The outputs in this case, are a transcript, a report, sentiment calculations per individual and intermediaries of individuals involved, and collected negotiation areas. Additionally, the resulting intent representation may be one part of an even larger intent representation supporting contract negotiations between competing entities.

Figure 14:
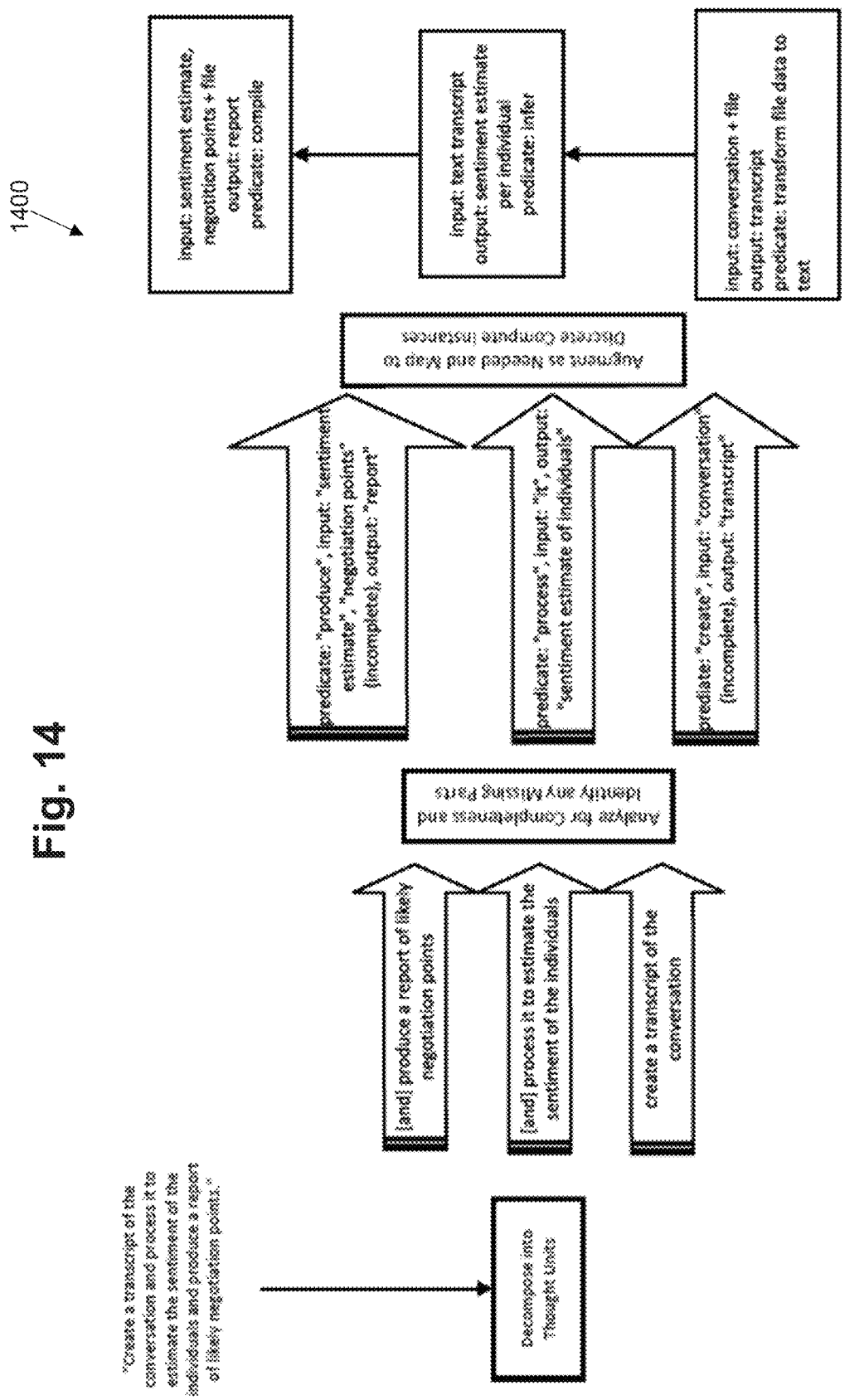
FIG. 14 is an exemplary flow diagram showing a breakdown of the intent construction and solution breakdown using declarative text, analysis, and augmentation in accordance with embodiments of the present disclosure.

Flow diagram 1400 in FIG. 14 depicts this process of creating intent representations from solution descriptions. The process outlines for intent Breakdown as decomposed thought units and analyzed for discovery of functional components (that meet the intent) for deployment. intent is first decomposed into thought units, analyzed for completeness, and augmented as needed. Each thought unit is divided into known and unknown functional components, the interconnections between functional components, and the abstract deployment layout structure. Continuing the example above, a possible decomposition and distribution across vertices may look something like the following.

1. Decomposition into thought units:
   1. create a transcript of the conversation
   2. and process it to estimate sentiment of the individuals
   3. and produce report of likely negotiation points
2. Analyze for completeness and identify any missing parts:
   1. Predicate: "create", Output: "transcript", Input: "conversation" (incomplete)
   2. Predicate: "process", Output: "estimate sentiment of individuals", Input: "it"
   3. Predicate: "produce", Output: "report", Input: "sentiment estimate", "negotiation points" (incomplete)
3. Augment as needed and map to discrete compute instances:
   1. Input: conversation+[from audio source contained in file], Output: transcript, Predicate: transform file data to text+[identifying speakers [more than one]]
   2. Input: text transcript, Output: sentiment estimate per individual, Predicate: infer+[using available model(s)]
   3. Input: sentiment estimate per individual, negotiation points+file, Output: report, Predicate: compile+[correlated by speaker]+[identify extracted speaker touch points]

From here, each processed thought unit maps to a known functional execution component ready for deployment. In the case where a processed thought unit does not directly map to known functional components, the intent processor highlights these and any ambiguous components that will need to be further identified, broken down, or implemented and uses the generic functional components as placeholders. The intent statements may be modified to include more specific information that the intent processor would translate into known functional components. Specific functional components may remain unknown or ambiguous, so the intent processor constructs the output following the structure choreography uses for deployment using suggested generic functional components for them.

Decomposition of a solution description into thought unit maps as described above is an application of the framework deployed functional component using semantic parsing of the description input to achieve the resulting intent structure in accordance with the present disclosure. This is a practical instance where an intent ("decompose solution descriptions into thought units for the intent processor") can be applied in such a way to augment the capabilities of it. This use of intent deployment becomes part of the framework as a ubiquitous, available instantiation ready to support users' desire to simplify the process of constructing intent. The use of the framework according to embodiments of the present disclosure to create and share new ideas that assist and lighten the system development burden and become part of the catalog of functional components and intents ready for near real-time deployment is unique to the system especially because the deployment package is a functional shape structure similar to FIG. 9c rather than a binary representation in the form of compiled image, virtual container, bytecode file, etc. Beyond semantic parsing, the present disclosure provides a technical solution by providing the ability to apply available software techniques using the framework of the present disclosure to augment and improve the use of the system to further support users' needs. Because the system is lightweight in nature, any emergent augmentation created and applied to it executes and consumes resources for as long as it is necessary. The deployment of sematic parsing as a type of user applied augmentation comes in the form of deployment of intent and not in software updates to the system itself.

Now that semantic parsing is available for users to discover and use or deploy, it readily supports solution description decomposition into intent construction. Semantic parsing is one or more functional components deployed to worker vertices to interface with the user provided content. For example, the one worker vertex uses shallow semantic parsing to assign labels to the tokenized words or phrases within the solution description or requirements provided by the user through the user interface executing on another worker. These labels turn into predicates, outputs, or inputs that include information from the description to classify into specific arguments of the labels. The semantic parsing worker also identifies descriptors, which describe initial conditions within functions (e.g., 1080p video) included in the solution description. The semantic labeling uses one or more processor workers applying a recurrent neural network, convolutional neural network, or other modern language model. The framework model deployment supporting semantic parsing models simplifies comparison and selection of new and emerging open source and proprietary language models. As with all framework functional components, the semantic parser will self-manage and take advantage of other techniques such as deep semantic parsing increases accuracy with reduced language specific input requirements from the user.

Continuing with the example breakdown above, the user provided descriptions, "create a transcript of the conversation and process it to estimate sentiment of the individuals and produce report of likely negotiation points" a language model finds the predicate role "create transcript". The input for this predicate is "conversation", which is generic and would need other input to be better specified. The output role for this thought unit would be "transcript". The worker continues through the text and identifies another predicate "process it," where the "it" refers to the previous output "conversation." Thus, worker begins to connect the two together. The processor identifies "estimate sentiment" as a possible output. As the parser continues it finds modifier of the input and/or output, "of the individuals" that it will use apply to each. The worker identifies "produce report" from the next group processed by the parser as the predicate and output. The output is modified by, "likely negotiation points", so the parser worker establishes a possible functional component to infer negotiation aspects from the input. In this case, the input to the inference functional component is the transcript and the sentiment estimate. The solution description does not include any storage but does imply that the report will end up somewhere. Therefore, the semantic parser supplements the resulting structure with a predicate to store the report. The resulting intent description representation produced by the semantic parser worker now contains four parts made up of key-value pairings of predicate, input, and output.

Figure 15:
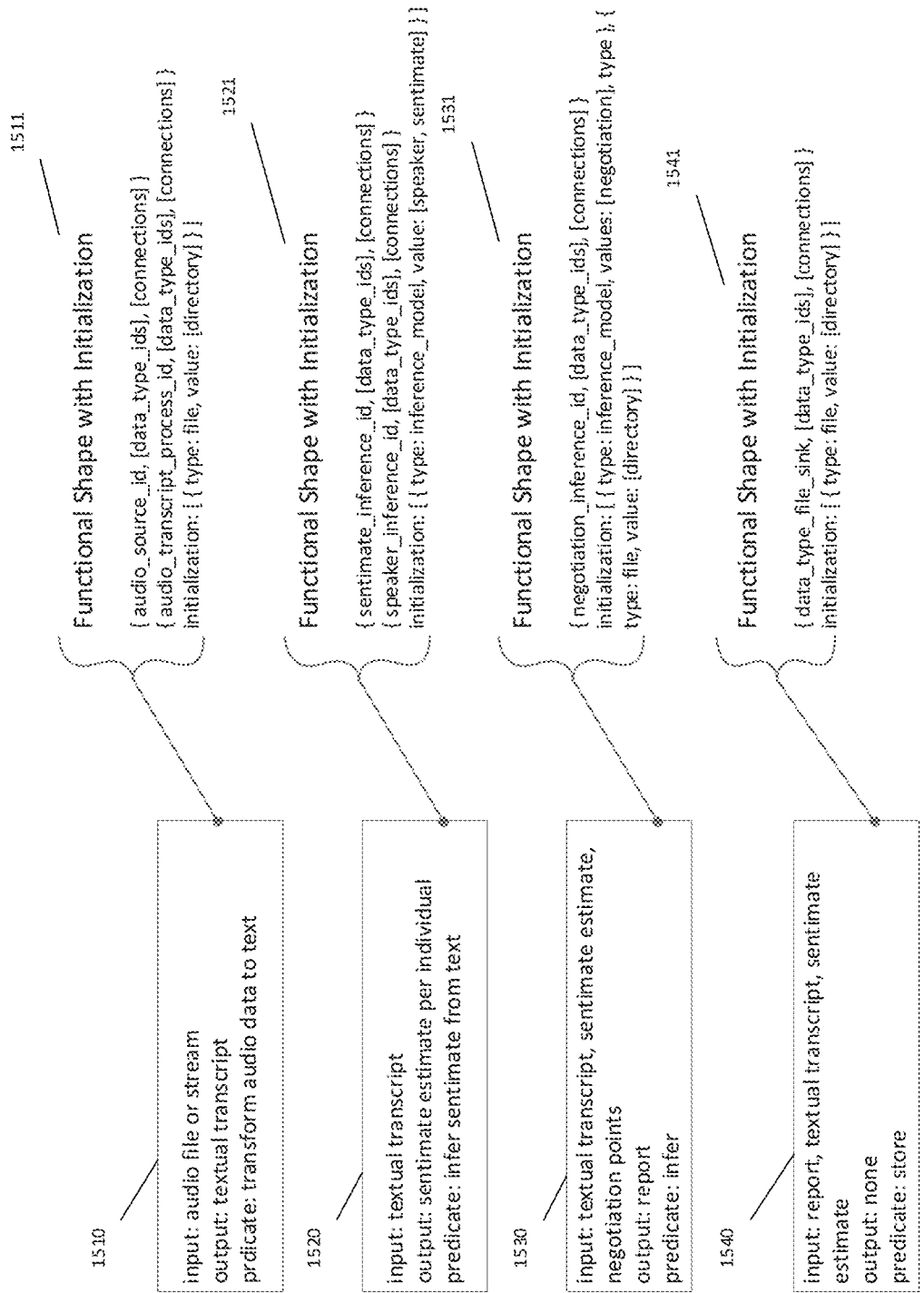
FIG. 15 is a diagram showing the results of intent processing in accordance with the present disclosure, where the input to the processor is intent description structure and the output is sets of functional shape structures ready for deployment.

The intent description input to the intent processor follows a grammar or language describing requirements or solutions produced by the semantic parser worker. This intent description representation fits within the bounds of cataloged and discovered resources by the intent processor. The intent description produced manually or by the semantic parser worker does not have visibility into the available functional component resources contained in the framework catalog or deployed and discovered across infrastructure. This visibility is part of the intent processor. The intent processor worker takes the input provided by the semantic parser worker and maps predicates, outputs, and inputs to known or inferred functional components and produces one or more intent representation structures that can be deployed across the available infrastructure. The resulting structure produces by the intent processor (FIG. 15) follows the same structure of the functional shape as shown in FIG. 9c.

Notation

Within a framework in accordance with the present disclosure, mathematical description of intent and the resulting shape provides the systematic process of aggregating both and is used to verify the intent representation produces the equivalent shape. Additionally, the reverse is true, yet it is to be proven mathematically. Therefore, a mathematical description of the deployment of intent onto a framework infrastructure in accordance with the present disclosure as shown in FIG. 9d follows.

Single intent representation 940 is deployed to delegator 931 and a portion 940b is deployed to coordinator 932. Coordinator 932 deploys the portion 934 to worker 935 and it is represented using Framework component notation, where foundational space vertex, V 935, is modified by a set of one or more inputs, I, and a set of one or more outputs, O, and a set of one or more behaviors, β, that influence its work. The typical functional vertex is written as:

$$F = {}_O^I V_\beta, \tag{1}$$

where F is the functional space vertex resulting from the application of I, O, and β. Additionally, Capability of vertex, C, encompasses the relationship between I, O, and β, such that there exists a function, $f$ of β, for all elements of β, operating on I and producing O.

$$o_i = f_\beta(i_i), \quad (2)$$

$$C = f\beta_{l=1}^n, \quad (3)$$

where C defines the processing capability of vertex, F (1334), in functional space.

For example, if I={$i_1$}, O={$o_1$}, and β={$\alpha_1, \alpha_2$}, where $a_1$=read data $i_1$ from file: and $a_2$=format data as digital audio stream $o_1$, then C=$f(a_1(i_1), a_2(o_1))$.

The collection 935, 937, 938, 951, 952, then, is best represented as a product, $\theta_K$, of capabilities.

$$\theta_K = \Pi_{l=1}^n C_l, \quad (4)$$

Where $\theta_K$ is the product of object capabilities governing each functional vertex, F, in the collection. Thus, the collection as defined represents potential fulfillment of intent (1340). To fulfill the intent, $\theta_K$ requires connections between individual vertices known as edges.

The collection intent, $\gamma_K$, specifies edge connections defining the data flow, thus producing the collection shape, $\sigma_K$. Data flow in $\sigma_K$ use graph notation, $$\sigma_K = (F_K, E_K), \quad (5)$$

where the shape is the set $F_K$ of collection vertices paired with the set $E_K$ of collection edges. $E_K$ is the set of edges constructed per $\gamma_K$ and is defined as the set of functional vertex pairs, $$(F_o, F_i) \in F_K, \quad (6)$$

$$x_{oi} = (F_o, F_i), \quad (7)$$

$$x_{oi} \in E_K, \quad (8)$$

where $F_o$ is the data producing functional vertex (output), $F_i$ is the data consuming functional vertex (input), and $x_{oi}$ is the resulting edge in $E_K$.

Therefore, $E_K$ is the set of zero or more edges connecting output and input functional vertices.

$$E_K = \{x_{oi}\}_{p=0}^n, \quad (9)$$

where the trivial case contains the empty set.

$\gamma_K$ specifies the output and input pairing of elements of $F_K$ and the quantity n $$\varepsilon_p = x_{oi}^p, \quad (10)$$

where $\varepsilon_p$ is the p-th edge element of $E_K$ given output vertex $F_o$ and input vertex $F_i$ in $F_K$.

Therefore, $\gamma_K$ maps the elements of $F_K$ into $E_K$ $$\gamma_K : F_K \to E_K \quad (11)$$

Equations 4 and 5 define the structure that fulfills collection intent, $\gamma_K$ $$\gamma_K \leftrightarrow \theta_K \leftrightarrow \sigma_K, \quad (12)$$

where an approximate fulfillment of collection intent is the joining of collection with its shape.

Exemplary Capabilities, Features, Decisions

Figure 7:
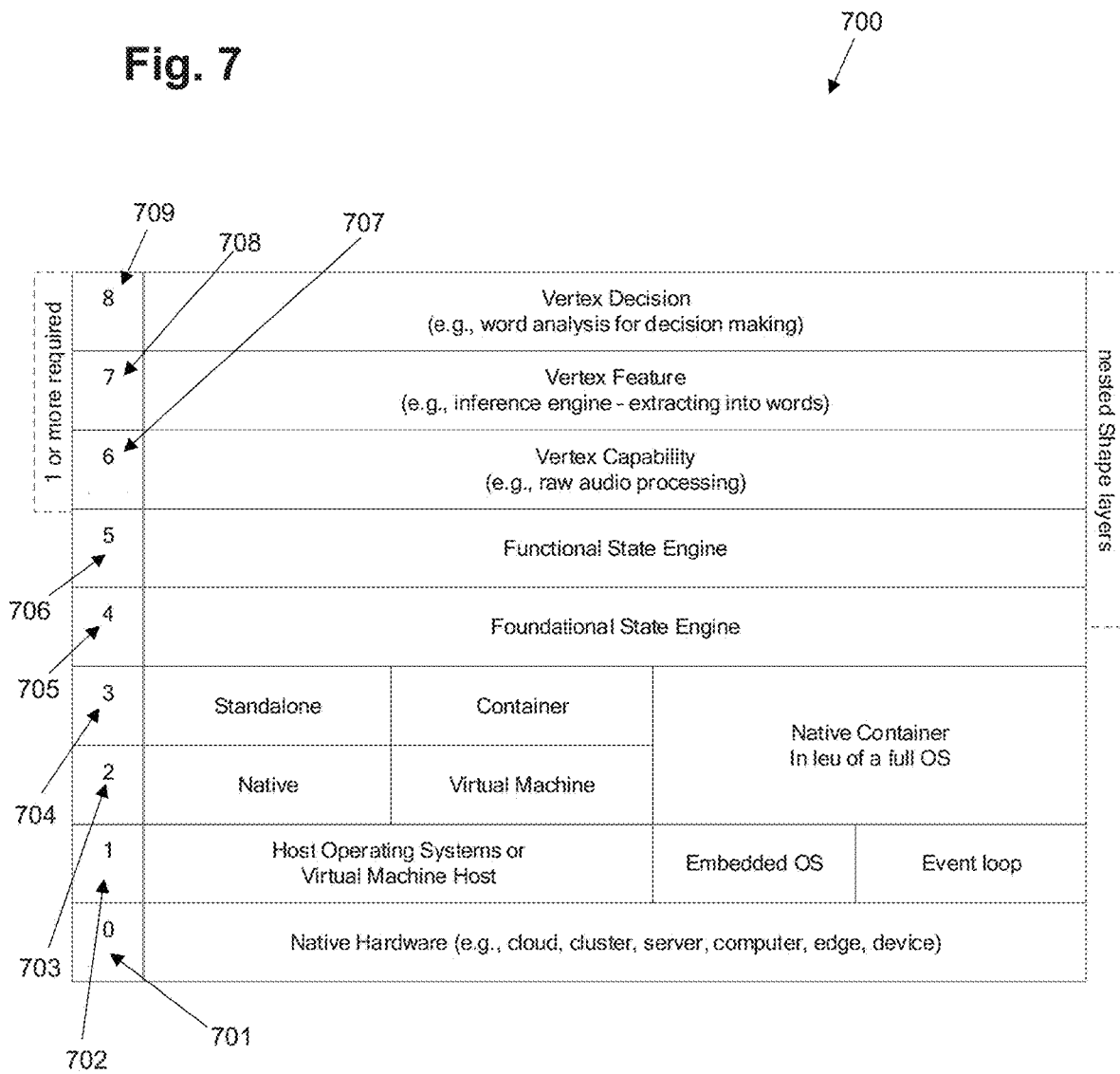
FIG. 7 is a diagram of layers and/or the "Stack" of functions and capabilities of embodiments of the present disclosure.

The three extended layers (6 through 8) of FIG. 7 (indicated at 707-709) can be described in terms of the notation presented above. Equation (3) defines vertex Capabilities, C, based on the set of vertex behaviors, β. Features, φ, then are defined as the subset of C that are employed during execution, and Decisions, D, within a vertex, are defined as the set of dynamic modifiers applied to φ.

$$\varphi \subseteq C, \quad (13)$$

$$D: \varphi \to C', \quad (14)$$

where, φ, is a subset of C, and D when applied to ep modifies C producing C'.

FIG. 1 depicts shape in foundational space and is well defined, such that it contains m vertices and 2(m−1) edges, where m−1 are bidirectional and m−1 are directed. One popular shape representation is in the form of a hub with spokes.

Shape in functional space is not well defined and is understood to be more fluid by design as shown in FIG. 9c. However, the general shape can be described as a flow from source to sink with possible tributaries. The trivial shape in this space contains two vertices (source and sink) and one directed edge. The minimal productive shape generally contains three vertices with two directed edges. This pattern continues for simple functional shapes that follow a singular path from source through processing to sink.

Generally, through self-management, shape, S, dynamically applies a morphology based upon an event, E, and this morphology, μ, has a lifespan, τ, and is described by the equation $S_\varepsilon = \mu(\tau)$. In most physical space instantiations, μ modifies the circuit to include a temporal edge bisecting the circuit. The temporal edge impacts S for the timespan, τ. Likewise, an event, ε, in functional space causes the shape to apply a similar morphology, where a new vertex and/or edge is added. Applying morphology to foundational space essentially increases or decreases the number of vertices and therefore, edges attached to the hub.

At any one instant, the shape in any space generally follows the equation, $S_i = S(0) + \Sigma_{j=0}^k S_{\varepsilon(j)}$, where k is the number of events still active on S, $S_{\varepsilon(j)}$ is the morphology caused by event ε(j), and i is the instant of examination.

Expanded Example of the System, Method, and Framework

As noted elsewhere herein, the framework is an exemplar of the present disclosure supports decentralized, distributed deployment with instantiations of the system, solution, or product described by intent representation having a wide range of iterations, capacities, topologies, etc. FIG. 7 represents one instantiation of the present disclosure and a description and optional development of each layer within FIG. 7 is provided herein.

[Layer 0] Native Hardware 701

In one instantiation, a solution is deployed in a cloud, across cloud providers, or distributed datacenters: generally deployed on traditional hardware and operating systems. A solution may or may not utilize specialized hardware for computation acceleration.

In another instantiation, a solution consists of hardware distributed across an infrastructure, like a manufacturing facility, a smart-building, a smart-city, a military base; and native hardware may include traditional server, embedded system, or miniaturized solutions.

In solutions, a specific physical network transport, type, or location is not assumed; and a mixture of distributed and interconnected network technologies may be deployed. Further, a particular solution, system, or product has no restriction on hardware; and any mixture of edge, mobile, cloud, FPGA, ASIC, embedded, stand-alone, or any other hardware that executes software or firmware may be deployed.

[Layer 1] Operating System (OS)—Host OS or Virtual Machine (VM) Host/Embedded OS/Event Loop 702

In one solution in accordance with the present disclosure, traditional commercially available or open-source operating systems, e.g., Microsoft Windows or Linux, may be used as element 702 in FIG. 7. In another, a program may run natively on the hardware. Yet another may use embedded OS or microkernel. The foundational space is effectively operating system neutral.

[Layer 2] Native to OS, or 1 or more VMs 703

In one instantiation, the foundation is deployed standalone on the native operating system. In another, it is deployed in a virtual machine or other containerized or microservice solution.

[Layer 3] Container or Standalone 704

In one instantiation, it is possible to deploy with layers of virtual machines combined with layers of deployed containers. In another, it is deployed within or across the native virtual machine(s). And another, it is deployed natively on the host OS and stand-alone hardware.

[Layer 4] Foundational State Engine 705

In accordance with embodiments as described elsewhere herein, this layer 705 is the low-level "stack" that provides plumbing, basic capability infrastructure for Layers 706 through 709. All solutions and any extended functionality (software functions and capabilities) are built on top of Layer 705. Layers 701-705 nominally describe the foundation or a basic infrastructure of a vertex (e.g., worker), providing messaging, communication, and capability infrastructure for Layers 706-709.

In one instantiation, an implementation might have three vertices such as a delegator, coordinator, and worker, as in FIG. 1. At this layer, the three categories are generic to their work in the foundational space and not in the functional space.

In another instantiation, the foundation is implemented as standard operating systems process or threads running a single worker function. In another instantiation using coroutines, where coroutines promote concurrency while minimizing overhead.

In another instantiation, multiple vertices are deployed across multiple virtual machines including multiple vertices within a single virtual machine. Further, each instance (vertex or set of vertices) can be containerized within the virtual machine.

[Layer 5] Functional State Engine 706

In accordance with embodiments as described elsewhere herein, this layer 706 is the first layer where extended functions emerge from the foundation in response to an intent. More specifically, functional layers of delegator, coordinator, and worker are the first extended functions that builds upon the foundational Behavior of any vertex. Additional Extended Behaviors then further define and specialize each into their support of the intent. At this layer 706, the three categories are specific self-management instantiations designed to support their work and manifest in the functional and physical space, as in FIG. 4.

In one instantiation, a delegator that provides a gateway for external communications, coordinators that provide oversight to a collection of workers through monitoring and communication routing for the workers that are organized into a "black-box" greater than the sum of the parts capability.

In one installation, a vertex may be a specific infrastructure based on the category of vertex type, in short, inherited from another type or class of vertex.

An instantiation containing only a delegator is essentially a solution without any working intentions, i.e., a lazy vertex. An instantiation containing a delegator and one coordinator without a collection of workers is essentially a sleeping member because it is lazy and is not working toward an intent. An instantiation with all three is a working member of the solutions.

One instantiation is a single process in idle state waiting for requests or other interactions defined in its foundational state engine (a delegator). Upon receiving request for data, processing, decision support, etc., delegator instantiates a coordinator as a new process, a new thread, a new container, or whatever makes the most sense to its 'understanding' of the solution and delegates the work to the coordinator for instantiating a shape of workers that will provide answers to the request or intent. coordinator processes the delegator's request and instantiates some number of workers as a shape to fulfill the intent described by the functional shape representation. These can be new processes, threads, containers, or whatever makes the most sense to its 'understanding' of the solution.

A delegator vertex is constructed with basic vertex functionality, Layer 4, as well as, external messaging and logging communications, ability to read and make decisions based on intent and shape, and internal messaging/logging behavior to local coordinators.

A coordinator vertex is constructed with basic vertex functionality behavior, Layer 4, as well as additional behavior for internal messaging to both delegators and local workers, ability to read and make decisions based on intent and shape.

A worker is constructed with basic functionality, layer 4, as well as prepackaged or custom extended behavior (functions or capabilities).

[Layer 6] Vertex Capability 707

Layers 707-709 add granularity to the functional layers used to describe a particular solution, system, or product. These layers are relative and not all strictly required. Software functions that are added to a worker as possible functionality (or a capability) are described as Layer 6 by default. This includes the libraries or access added to a vertex that allow it to perform some function.

In one instantiation, the workers inherit a set of abilities targeted to a task i.e., ability to read/process audio or video, or to store data in a file as a sink. Generic contextually defined functional behavior that each category of layer 706 inherits e.g., log retrieval for a delegator, or ability to write files for a worker.

[Layer 7] Vertex Feature 708

Features that expand upon and use functions of vertex capability Layer 6 as in 707—usually set by the user but not custom applications, i.e., namespace, source/sink, parameters set by an application of intent. These would make up a completely functional instantiation of a vertex. This layer 708 describes the function that the vertex executes by using the functionality provided by layer 6 as in 707. This is referred to as its feature. Layer 7 (referenced as 708 in FIG. 7) can be thought as the part that actually does the work and fulfills the goals or intent of the vertex, using the functionality provided by Layer 6 (referenced as 707 in FIG. 7).

In one instantiation, the Layer 7 as in 708 of a worker may be executing an inference engine provided by Layer 6 as in 707 used to extract words from a processed audio stream or a stored/extracted file. Layer 6 as in 707 may provide the capability to access a stream or file and the capability to implement an inference engine, while layer 7 as in 708 uses that functionality to perform the desired function, in this example, applying the inference engine to the audio stream.

Users may set or configure features, or they may occur through choreography based on contextual category, or appropriated as needed and could be custom functions.

[Layer 8] vertex intent 709

Layer 8 (referenced as 709 in FIG. 7) is defined as the intent of the vertex and can be thought as the localized decision-making element of the vertex. This layer may not be present in every vertex. Layer 8 may contain a smaller subset of the larger system intent which may modify functionality of lower Layers.

In one instantiation, an inference engine that uses the output from a custom model and applies user-specified analysis behavior (such as word analysis for decision making), or a sink that applies user-specified behavior to store a custom defined data type. Additional extended functions applied to a vertex: typically, are custom functions(s) built on top of previous layers.

Figure 16:
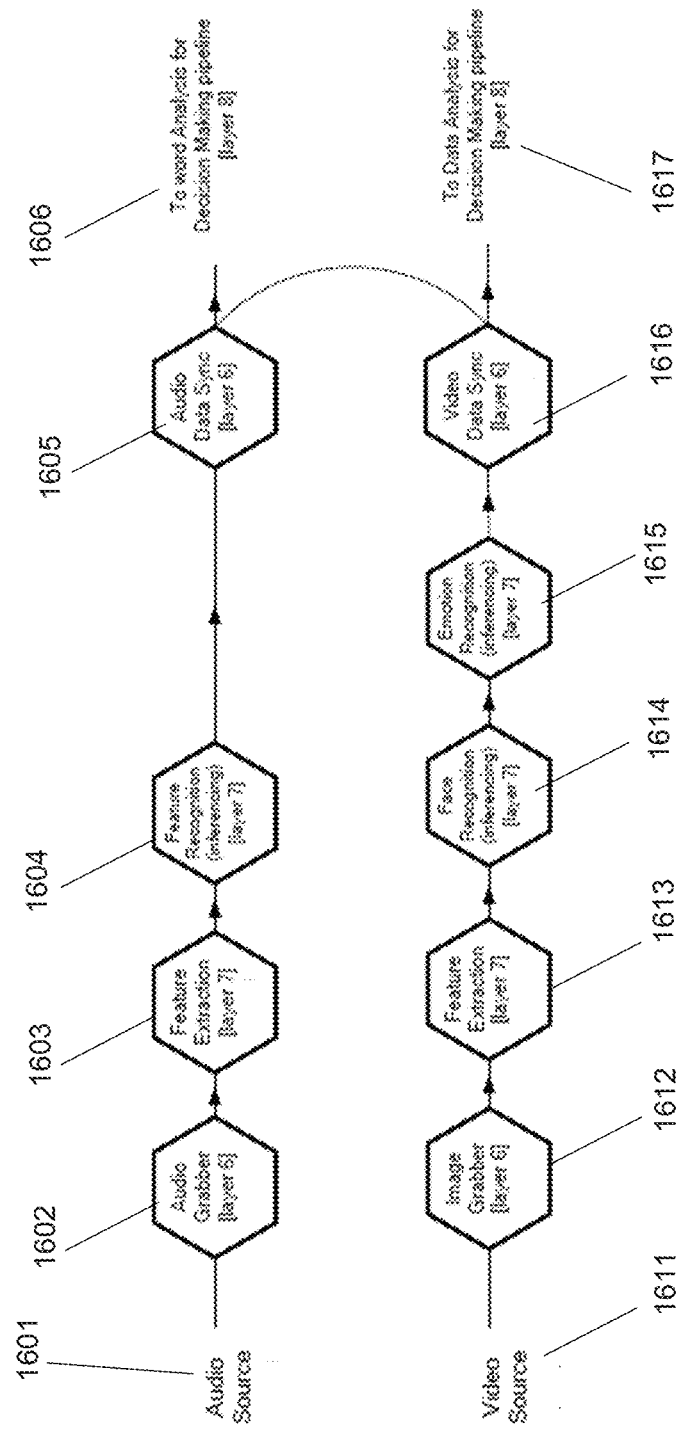
FIG. 16 is an exemplary flow diagram of a data pipeline in the functional space exemplifying how data flows through worker vertices using different layers in accordance with embodiments of the present disclosure.

FIG. 16 shows an example (partial) solution using the layers in FIG. 7. This simple example illustrates blocks of code that are pieced together to deliver an intent. The intent, layer 8, in this example is an analyst request to analyze text (words) that were extracted from a streaming audio source, as at 1605. Embodiments of the framework according to the present disclosure posit an audio worker to process the raw data and prep for transport, this is the first extended function (layer 6), as at 1602. The next block is another worker converting the audio into usable chunk (or feature extraction), as at 1603. Blocks 1603 and 1604 are separate to adhere to the "minimally functional" philosophy. Next, yet another worker runs an inferencing engine to extract specific words or potentially converting all audio into words, as at 1604. The next block could be an audio worker to synchronize the extracted words to the relative position in the audio stream useful for an analyst to gain context of the extracted features, as at 1605.

Figure 17:
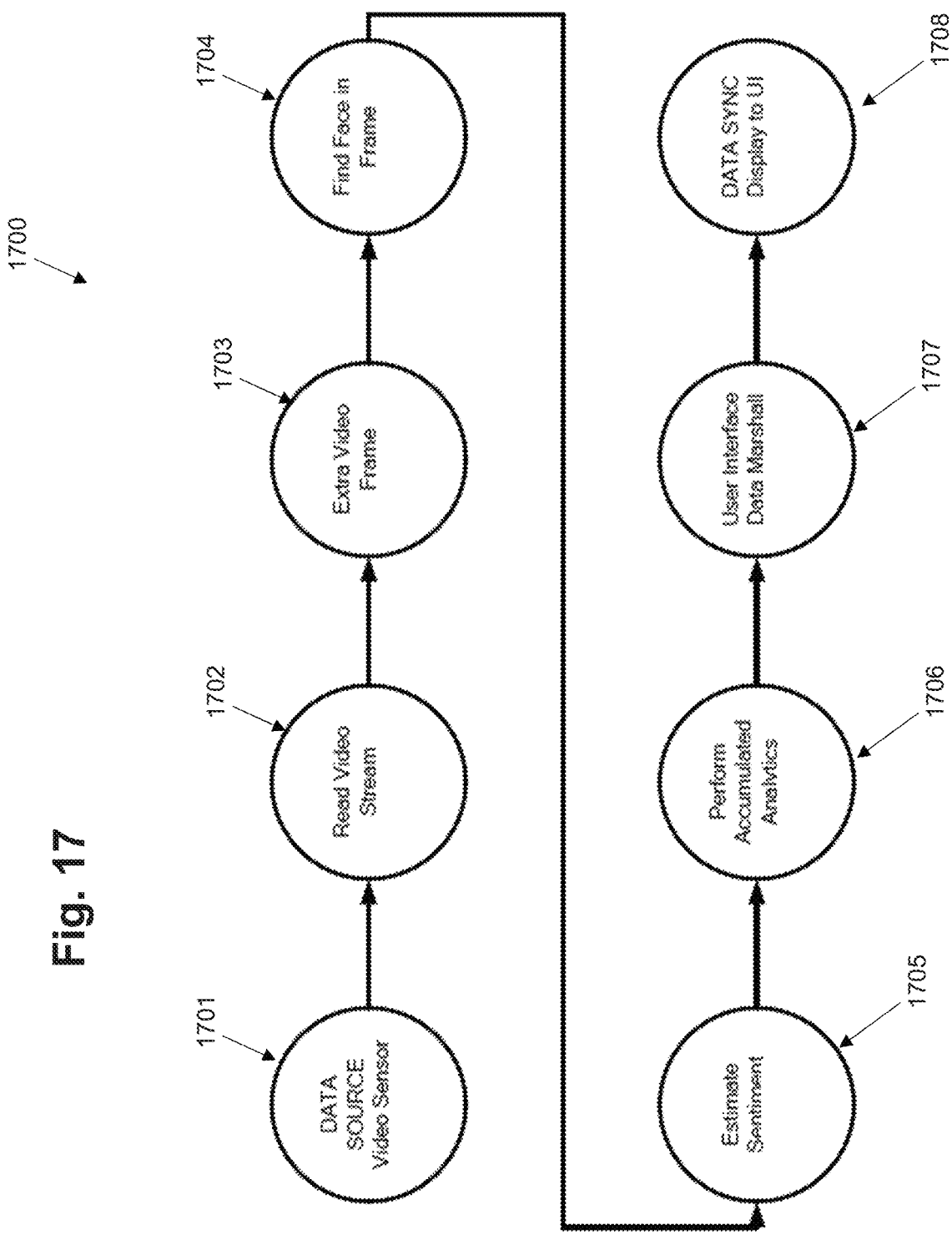
FIG. 17 is a flow diagram of an exemplary data pipeline in the functional space in accordance with embodiments of the present disclosure.

FIG. 17 is an exemplary diagram 1700 of a single function linear pipeline, where data passes via messages to the next phase of processing. Note that this behavior is not restricted to the single Extended vertex but could be instantiated as distributions of layer 8 beginning with a Video Sensor vertex with only the initial (read sensor stream) Extended Behavior. In the distributed instantiation, once the Extended vertex publishes a video frame, it passes data (the data fans out) into several sub-pipelines of Extended vertices, where various AI models process specific data and perform other operations required by other Extended vertex workers operating in functional space. At this point, this pipeline is no longer linear or even tree-looking, it is a hyper-graph with a sensor on one end, lots of nodes and branching in the middle, a fan-in stage, and a Web-based UI for output.

In one instantiation as shown in FIG. 17, the shape is extended with new function 1705 (estimate sentiment) based on autonomous data sampling as a worker 1703 blob detector detects a face within the video frame; furthermore, the worker 1704 is autonomously spawned to perform further analysis functionally, in this example estimate sentiment 1705.

This representation of applying multiples of Layer 8 to a Video Sensor vertex and is read thus: "Apply the ordered set of extended functions (read sensor stream), (extract video frame), (find face), (estimate sentiment), (prep for UI), and (display in UI) to the Video Sensor vertex".

Example Use Cases

Example use cases follow, with references to embodiments of the framework, system and methods.

AI is an example of complex systems and for the next few decades will be characterized by rapid technology advancements and applications; and therefore, traditional static and monolithic development and deployment of operational solutions must dramatically change so businesses can rapidly apply and update to keep pace with State-of-the-Art (SOTA) and ultimately to remain competitive. Agility will be a major strategic and competitive advantage in all business and solutions systems; and investing in traditional solutions architecting will rapidly fall behind since model training, updates, integrating advancements, and similar will become a major business cost in both time (delay to market) and increased implementation cost.

The embodiment of the present disclosure provides a system, framework, and method to form tangible decompositions of problem sets with goals and requirements into iterative developmental solutions using available and emerging software components. These components form the building blocks upon which the goals and requirements can be met throughout the lifetime of the problem including as it evolves over time, adapting to pressures from the environment. By decomposing descriptions of capabilities into smaller self-contained, minimized, complete units of code built upon the framework, developers can rapidly build, update, and replace without impacting or at least minimizing the impact to the overall solution. For example, a data pipeline solution contains several AI components (models) all working in tandem to analyze some data and feedback decisions into an environment. As AI techniques improve, an updated, newly trained, or newly invented version of individual components can be dynamically swapped with an existing component with little to no operational impact; thereby facilitating continuous operation, endless upgrades within the lifecycle, and rapid agility. This contrasts with current frameworks and development techniques that are based on greater synchronization of software components, which leads to increased cost, delays in implementing and deploying new innovations, as well as the high potential for operational disruption. These all are a cost to business and impact competitive advantage.

Because components are minimized and complete, component reuse is high, development cycles short, and cost of ownership is predictable: many traditional risks are mitigated. In effect, the system delivers on many of the promises that software-factories have been making for decades. This payoff is highest in areas of emerging technology trends where a priori knowledge of how a solution will evolve, especially in large-scale systems of systems solutions is missing. For example, smart-anything: smart-cities, smart-cars, smart-highways, Internet of Things and similar are growing faster than understanding of their complexity and interconnectedness. This is especially true in environments where centralized decisions are infeasible: smart-cars in conjunction with smart-cars and smart highways.

Component discovery is built into the framework to adapt to changing conditions, communications environments, knowledge expression, decision making, and the like, even as framework-enabled solution senses and interacts within its local and connected world. Problem sets seek solutions which contain goals that can be broken down into tasks and/or requirements. When then the method(s) is applied to this top-down process, it exposes areas that can be fulfilled with existing components or need new or updated components, thus providing a quicker-time-to-prototype of the solution.

The system, framework and methods form the bedrock of the new paradigm in developing software solutions. These include, at a minimum, component discovery, autonomy, self-organization, self-management, shape, environmental adaptation), intention, in situ experimentation, iterative evolution, and emergence. Each concept enables the process of turning problem sets into solutions across a broad spectrum of users, while providing the way to focus on developing and supporting solutions without the minutia of managing and interconnecting functioning components (i.e., micro-services).

The system fully realizes the potential and need for continuous integration/continuous development (CI/CD). And enables delivering/deploying changes as they are made: "micro-release". Further, the framework adds continuous developments and improvements for the entire lifecycle and supports ongoing development processes from "the cradle to the grave". The framework eliminates the transition from prototype to production and, the production solution emerges from the prototype with no need to re-write code. The framework provides the same environment through all phases: prototype, alpha, beta, testing, release, deploy, maintain, and repeat.

The system puts the domain experts directly in the loop of the development process. The system is built with a 'domain-driven' design methodology for the solution development process that empowers the domain experts along with the development experts. The system incorporates the domain experts (not just developers/coders) through the framework, and through the method they can directly add to the solution without developer intervention or assistance.

The system and framework creates useable, shareable, and customizable software chunks that are nearly impossible with current monolithic development. Traditional (i.e., monolithic) development becomes overburdened with attempting to design in modularity and flexibility as we press into areas beyond the current paradigm (e.g., complex AI systems). The investment to accommodate the speed of technology changes (model development, model feedback, etc.) is wasted with little or no potential for returns, which is why most settle for something less. Those on the bleeding-edge employ smarter, incremental development processes using smaller groups with focused development responsibilities. The system extends this mentality and operationalizes the development paradigm shift. With the framework, solutions can scale quickly, react to market changes, and address the unknown unknowns.

For example, if a company wants to tests how a new AI innovation might benefit its distributed solution, the framework provides for rapid shape duplication where the data flow is forked (one going toward the existing operational environment and the second to the test environment) and the innovation can be evaluated in an operational context without impacting operations and with real data flows; this is essential for solutions where test and simulation environments are insufficient operational analogues.

The system publishes code with established communication paths and open, shareable, and defined standards. The framework-enabled code can respond and learn from other framework agents and subscribe and integrate automatically. The framework components can capitalize on available edge computing resources and distribute decision making nearest the edge through the method. Even an out-of-date agent, if allowed and trusted, can respond to agent neighbors with new content and request an update. To borrow an anecdote from the Matrix movie, Trinity can't fly a helicopter . . . yet. But she is aware of the helicopter (connected) and requests (subscribes) the Operator to 'upload' the code to know and fly the helicopter.

Video Telephony—Example Telemedicine

Description: Providing the foundation for a multi-modal, AI-augmented video-telephony human-to-human (2 or more) or machine-to-human (2 or more) communications platform. For example, telemedicine between patient and doctor (i.e., health or insurance provider) potentially including simulated patient training for medical students. Long-term goal is use AI to augment both the doctor and patient experience to improve the standard of patient care and increase positive medical outcomes.

Current State-of-the-Art (SOTA): There exists little to no AI augmentation for human-to-human interaction, and nominal augmentation with machine-to-human interfaces. Current solutions rely on siloed AI solutions with monolithic models and static plumbing without ease of updating/training/comparing/swapping/assessing models and model-chains (i.e., AI assistants like Amazon Alexa). SOTA is truly early days considering the rapid advancement in AI and human augmentation horizon.

Need. Support 'Tele'-anything services to provide domain-specific AI (e.g., medical, insurance, legal, consulting, and similar) with real-time feedback for the provider and customer to gauge the interaction (feedback, sentiment, understanding, etc.) based on multi-modal video (e.g., head-pose, body-pose, sentiment, and similar) and audio (e.g., utterance, jargon, summary, and similar); and provide dynamic real-time metrics of the quality of communication (e.g., medical school based Master Interview Rating Scale (MIRS) manual) with summarization of the interaction.

Approach: Embodiments of an approach as described herein decouple the decision space and develop general and domain-specific, multi-modal model-chains. This approach shifts away from current SOTA monolith models with a high cost of training and non-domain specific solutions and replaces it with a decomposed decision space consisting of smaller (quantized) models performing very narrow parts of the problem (micro-models) where each may be rapidly improved, replaced, updated, and trained without fork-lifting major upgrades. For Telemedicine, research has outlined various micro-models such as labeling, utterances, tokenization, domain labels, jargon, sentiment, verification, dialogue acts, summarization, etc. Each model operates as an autonomous software agent with advanced capabilities, such as privacy and ethics, which will emerge from local dynamics (e.g., individual model and decision neighbor dynamics). Solution computation will be distributed with a lean towards edge-computing (e.g., cellphone or laptop; potentially browser) with advanced or aggregated analysis in cooperation with the cloud. Dynamics may include emergent behaviors which will emanate and be autonomously learned and shared from localized sessions through all domain and/or supporting infrastructure. Where feasible, our approach optimizes models (quantization) and performs decisions as narrow parts (decomposed parts) of the problems processed nearest the edge.

Solution Benefit: Clarity of communications between parties, better outcomes, less confusion, overall wellness with reduced anxiety and frustration: essentially (in theory) better communications lead to better outcomes (in support of Outcomes Based Healthcare).

System, Framework, and Method Benefit: This afore described solution, nominally called human AI augmentation, is a rapidly evolving research and development area and is far from settled using commonly available technology. The system shifts away from monolithic development using the framework and method to add software and requirement agility. The framework focuses solutions and development on intention while leveraging reusable components. With the method, a company can rapidly develop/deploy a solution for multiple markets and integrate domain expertise for communication interactions with minimal additional development cost.

The method provides the conditions for natural emergence of complex capabilities and features where individual deployments learn and become more domain capable as solutions operate with the added potential for sharing lessons learned (e.g., refined models) between domain solutions.

In a broader sense, the system enables technical, accurate, and rapid prototyping, deployment, updating, and constructing AI models scaled across infrastructure with distributed, local processing (browser, endpoint, cloud, application layer). Using framework-enabled strategies, developers and experts can quickly assess and test new AI models in situ, rapidly performing comparative analysis and integrating the emerging SOTA technology into solutions. This allows for more organic and rapidly emerging requirements to be delivered continually, rather than long or spiral cycles.

This is especially important as edge-devices migrate to 5G and can better leverage the edge computational resources as part of a distributed solution: the end-to-end solution will be computationally involved in the decision space.

The system's competition is limited to existing traditional monolithic software development approaches and current microservice methodologies; both are less agile and less organic, with limited reusability, and unable to incorporate emerging technology without a priori knowledge, and without emergent behavior.

Networked Mobile Sensors—Example Smart Cars

Description: Smart Cars are the manifestation of the emergence of a new market of mobile, smart sensors and Smart Cities enabled by technologies like 5G/6G. Providing a foundation for managing connections and decision output for vehicle-borne (moving) sensors with their own network, inter-vehicle networking, autonomous needs, and unique edge processing outputs including extra-networking to smart-infrastructure. For example, an interconnected city of smart cars with numerous sensors per vehicle communicating simultaneously intra-vehicle, inter-vehicle, and with infrastructure sensors and the cloud. The goal is improving the safety and operation of smart cars while reducing environmental impact.

Current SOTA: Few, if any, cars have inter-vehicle network capabilities capable of truly autonomous enablement; emerging 5G/6G infrastructure would enable this at scale. Smart Cars with pseudo-self-driving capabilities that send and receive all data via direct connection (OTA) to cloud or post-processed via local download. Substantial on-board computing power is required to process sensor data for self-driving/following.

Need: There is no framework or infrastructure for handling the autonomy and ad hoc decision making for a network for cars within an existing infrastructure network. In general, a modernized, sophisticated framework is needed for handling the emerging capabilities of 5G/6G distributed sensors. The traditional paradigm cannot accommodate a multi-nodal viewpoint with each vehicle and sensor being nodes and sub-nodes, respectively, and again, with each vehicle yet another (sub)node in a larger network. These new, 'smarter' sensors need basic decision making to reduce sending all sensor data back to the cloud. More specifically, leverage residual computing resources to make better decisions, send data, manage policies, etc. Once in place, additional needs arise such as efficient distribution of disparate AI models for different sensors and combinatory analysis (i.e., from multiple sensors) with decision making. All of this collectively, describes an iteration of technology (networked mobile sensors) with unique challenges at which the system is aimed.

Approach: One approach starts with the vehicle as the platform node identified in framework physical space. However, each of its sensors that are part of some compute capability becomes a possible node in the on-vehicle physical space (sub-nodes of the vehicle node), and each node has one or more collections supporting various intentions that contextually make sense based on time, space, events, actions, proximity, etc. For example, travelling on a highway among other framework-enabled smart vehicles provides an expansion of communication sharing centered on safety intention that includes sub-intentions of safe merging, exiting, entering, and high-speed travel. This is a different context to travelling on back roads, two lane streets through small towns with sparse, bursts of traffic, and bursts of occasional pedestrians, bicycles, etc. Adding smart navigation intentions to both scenarios help with decision making when it includes increased data sources such as weather changes, road construction, obstacles, health of passengers, traffic patterns, traffic laws, etc. From the system perspective, the approach becomes a collection of intents and shapes with emergent behavior like responding to traffic patterns. The system nodes are self-contained and can discover neighboring vehicles and sensor nodes, as well as subscribe to traditional infrastructure nodes. The intentions are adaptive to respond (make decisions) to different driving conditions, environments, and scenarios such as speed limits, different state laws, congestions, etc.

Benefit: Improved safety for self-driving. Forensic analysis for traffic events (either good or bad) do not require sifting through large data lakes. Real-time traffic adaptations. Dynamically updating individual sensors with improved models: examples, pedestrian detection, construction, real-time traffic, weather, geo-specific considerations, etc. rather than a one-size-fits-all monolithic smart-car. Ability to respond to emergent growth of data with shifting priorities in changing environments in real-time.

System, Framework, and Method Benefit: A truly robust and scalable smart-car and smart-infrastructure (long-haul, city, and neighborhood) that interacts with smart-cities will require not only new science but innovation. The system brings a methodology and framework for a standardized low-level foundation, as well as the capability to adjust the systems of system architectures rapidly and organically as science becomes technology.

With shapes, the method rapidly deploys and reconfigures with little to no impact to critical operational infrastructure. Emergence allows for organic capabilities as cars and infrastructure interact, react, and sense unforeseen situations. The System nodes can request help for new circumstances, as well as continue to receive the wave after wave of model updates, training, and feedback needed to organically grow and deploy the overall "brain."

As will be understood by one of ordinary skill in the art, embodiments of the present disclosure may be an apparatus (including, for example, a system, a machine, a device, a computer program product, and/or the like), as a method (including, for example, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware according to the present disclosure is implemented the computer device and application-specific circuits associated therewith are deemed specialized computer devices capable of improving technology associated with collaborative machine learning and population reconfiguration.

It will be appreciated that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments according to the present disclosure, however, the computer-readable medium may be transitory, such as a propagation signal including computer-executable program code portions embodied therein.

It will also be appreciated that one or more computer-executable program code portions for carrying out the specialized operations of embodiments according to the present disclosure may be required on a specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for state-based learning and neural network reconfiguration, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

The invention claimed is:

1. A software system, comprising:
   a choreographic, distributed, and decentralized framework stored in one or more memories;
   a plurality of distributed self-deploying, self-managing, and self-organizing software vertices stored in one or more memories, wherein each of the plurality of software vertices comprises a respective self-management policy and is instantiated and deployable by the framework; and
   an intent representation structure stored in one or more memories operable to instantiate and modify a shape of one or more software vertices from the plurality of software vertices.

2. The software system of claim 1, wherein the self-management policy is comprised of a duality of event-driven, asynchronous, state engines wherein each of the state engines is independent yet loosely coupled, wherein a first state engine of the plurality of state engines is a foundational state engine, and wherein a second state engine of the plurality of state engines is a functional state engine.

3. The software system of claim 2, wherein the foundational state engine is inherited from the framework and comprises logging, monitoring, connection, sending data, distributed discovery, request/response to and between a subset of the plurality of software vertices, and management of the subset of the plurality of software vertices including initialization and termination.

4. The software system of claim 2, wherein the functional state engine comprises specialized functions to process one or more events to fulfill an intent, and support functions for managing and deploying the plurality of software vertices, coordinating actions between one or more local software vertices from the plurality of software vertices, and delegating the coordination and event processing at one or more appropriate levels or layers within the software system, data handing and request handling.

5. The software system of claim 2, wherein the first and second state engines are interconnected, dynamically configurable to handle one or more events or user-defined states, and inheritable to the plurality of software vertices.

6. The software system of claim 1, wherein at least a portion of the intent representation structure is deployed to one or more of the plurality of software vertices.

7. The software system of claim 6, wherein the intent representation structure defines one or more functional connections between the plurality of software vertices and the portion of the intent representation structure deployed to one or more of the plurality of software vertices.

8. The software system of claim 6, wherein the software vertices self-organize based on interaction of the respective self-management policy associated with the software vertices and the intent representation structure.

9. The software system of claim 1, wherein the plurality of software vertices exchange information and distribute all or a portion of the intent representation structure based on existing or discovered knowledge of other software vertices.

10. The software system of claim 1, wherein the plurality of software vertices inherits foundational functions from the framework comprising logging, monitoring, connection, sending data, request/response to and between a subset of the plurality of software vertices, management of vertices including initialization and termination.

11. The software system of claim 1, wherein each of the plurality of vertices inherits required functionality as extended functions to fulfill an intent.

12. A method for choreographically managing a software system, comprising:
receiving, initializing and deploying, by a decentralized, distributed framework, an intent without direct user management;
instantiating, by the decentralized, distributed framework, a plurality of self-managing, self-deploying, and self-organizing software vertices;
deploying, by the decentralized, distributed framework, said the plurality of software vertices;
distributing decision-making to the plurality of software vertices;
constructing intent representation to deploy to the plurality of software vertices; and
partitioning at least a first software element of the plurality of software vertices into encapsulated foundational and functional software spaces.

13. The method of claim 12, wherein each of the plurality of software vertices autonomously discovers available resources and peer or neighbor software vertices.

14. The method of claim 12, wherein each of the plurality of software vertices is deployed via delegating, coordinating, and executing one or more additional software vertices choreographically operating as self-managing, self-organizing software components.

15. The method of claim 12, wherein the distribution of decision-making is performed by one or more event handlers executing within dual state-engines and operating on internal and external events, combined with the intent of one or more of the plurality of software vertices.

16. A computer-implemented method, comprising:
providing an intent structure to instantiate and modify a shape of one or more software vertices from a plurality of independent connected software vertices, wherein the intent structure is operable to loosely describe software functions and connections of each of the one or more software vertices from the plurality of independent connected software vertices,
instantiating and modifying the shape of one or more software vertices from the plurality of independent connected software vertices based on decision-making, optimization, and adaptation of the one or more software vertices from the plurality of independent connected software vertices, and
distributing and deploying the intent structure to form a loosely coupled, asynchronous shape of the plurality of software vertices.

17. The method of claim 16, wherein instantiating and modifying the shape from the plurality of independent connected software vertices based on decision-making, optimization, and adaptation of the one or more software vertices from the plurality of independent connected software vertices comprises creating and handling of an internal or an external event.

18. The method of claim 16, wherein loosely describing the software functions and connections initiates the instantiation of one or more of the software vertices and further initiates execution of one or more functional software components.

19. A computer-implemented method of generating a functional shape using an intent structure, comprising:
processing an intent structure of loosely described software functions and connections independently by one or more software vertices from a plurality of independent connected software vertices,
wherein the one or more software vertices instantiate functional shape by independent decision-making, optimization, and adaptation from related software vertices from the plurality of independent connected software vertices, and modify functional shape by applying dynamic changes over time through at least one additional intent structure and at least one event-driven component.

* * * * *